United States Patent
Ikawa et al.

(10) Patent No.: US 11,334,727 B2
(45) Date of Patent: May 17, 2022

(54) ELECTRONIC TAG WRITING SYSTEM AND METHOD FOR SAME

(71) Applicants: Daio Paper Corporation, Ehime (JP); Daio Engineering Co., Ltd., Tokyo (JP)

(72) Inventors: Taro Ikawa, Tokyo (JP); Koki Beppu, Kanagawa (JP); Hirohide Ouchi, Kanagawa (JP); Eiji Nishiyama, Kanagawa (JP); Ryoto Takahashi, Kanagawa (JP); Shin Koyama, Kanagawa (JP); Shuntaro Noguchi, Kanagawa (JP)

(73) Assignees: Daio Paper Corporation, Ehime (JP); Daio Engineering Co., Ltd., Tokyo (JP)

( * ) Notice: Subject to any disclaimer, the term of this patent is extended or adjusted under 35 U.S.C. 154(b) by 0 days.

(21) Appl. No.: 17/041,318

(22) PCT Filed: Apr. 19, 2019

(86) PCT No.: PCT/JP2019/016758
§ 371 (c)(1),
(2) Date: Sep. 24, 2020

(87) PCT Pub. No.: WO2019/203337
PCT Pub. Date: Oct. 24, 2019

(65) Prior Publication Data
US 2021/0081621 A1    Mar. 18, 2021

(30) Foreign Application Priority Data

Apr. 19, 2018  (JP) .............................. JP2018-080994
Oct. 15, 2018  (JP) .............................. JP2018-194639
Mar. 11, 2019  (JP) .............................. JP2019-044000

(51) Int. Cl.
*G06K 7/10* (2006.01)
*G06K 19/077* (2006.01)
(Continued)

(52) U.S. Cl.
CPC .......... *G06K 7/10198* (2013.01); *B65C 1/021* (2013.01); *B65C 9/0015* (2013.01); *G06K 19/07758* (2013.01)

(58) Field of Classification Search
CPC .. G06K 19/07758; B65C 1/021; B65C 9/0015
(Continued)

(56) References Cited

U.S. PATENT DOCUMENTS

| 2007/0126578 A1* | 6/2007 | Broussard | G06Q 10/087 340/572.1 |
| 2010/0283584 A1* | 11/2010 | McAllister | B65C 11/006 340/10.1 |
| 2016/0263623 A1* | 9/2016 | Wojdyla | G06Q 10/083 |

FOREIGN PATENT DOCUMENTS

| JP | H11-245923 | 9/1999 |
| JP | 2001-175814 | 6/2001 |

(Continued)

OTHER PUBLICATIONS

International Search Report for PCT/JP2019/016758, dated Jun. 18, 2019.
(Continued)

*Primary Examiner* — Toan C Ly
(74) *Attorney, Agent, or Firm* — Andrus Intellectual Property Law, LLP

(57) ABSTRACT

A technology is for writing different information depending on an object into an electronic tag. The above problem is solved by an electronic tag writing system including a writing device that writes write information into an electronic tag, and an information acquisition section that
(Continued)

acquires write information related to an object associated with the electronic tag, in which the write information acquired by the information acquisition section is written into the electronic tag using the writing device.

9 Claims, 43 Drawing Sheets

(51) Int. Cl.
  *B65C 1/02* (2006.01)
  *B65C 9/00* (2006.01)

(58) Field of Classification Search
  USPC .......................................................... 235/451
  See application file for complete search history.

(56) References Cited

FOREIGN PATENT DOCUMENTS

| | | |
|---|---|---|
| JP | 2005-104521 | 4/2005 |
| JP | 2005-306490 | 11/2005 |
| JP | 2007-091246 | 4/2007 |
| JP | 2007-091298 | 4/2007 |
| JP | 2008-044661 | 2/2008 |
| JP | 2008-062965 | 3/2008 |
| JP | 2008-114904 | 5/2008 |
| JP | 2010-211479 | 9/2010 |
| JP | 2012-030891 | 2/2012 |

OTHER PUBLICATIONS

Japanese Office Action Issued in Corresponding Japanese Patent Application No. 2018-080994, dated Feb. 25, 2022.
Office Action issued in Corresponding Japanese Patent Application No. 2019-025750, dated Mar. 25, 2022.

\* cited by examiner

[FIG.1]
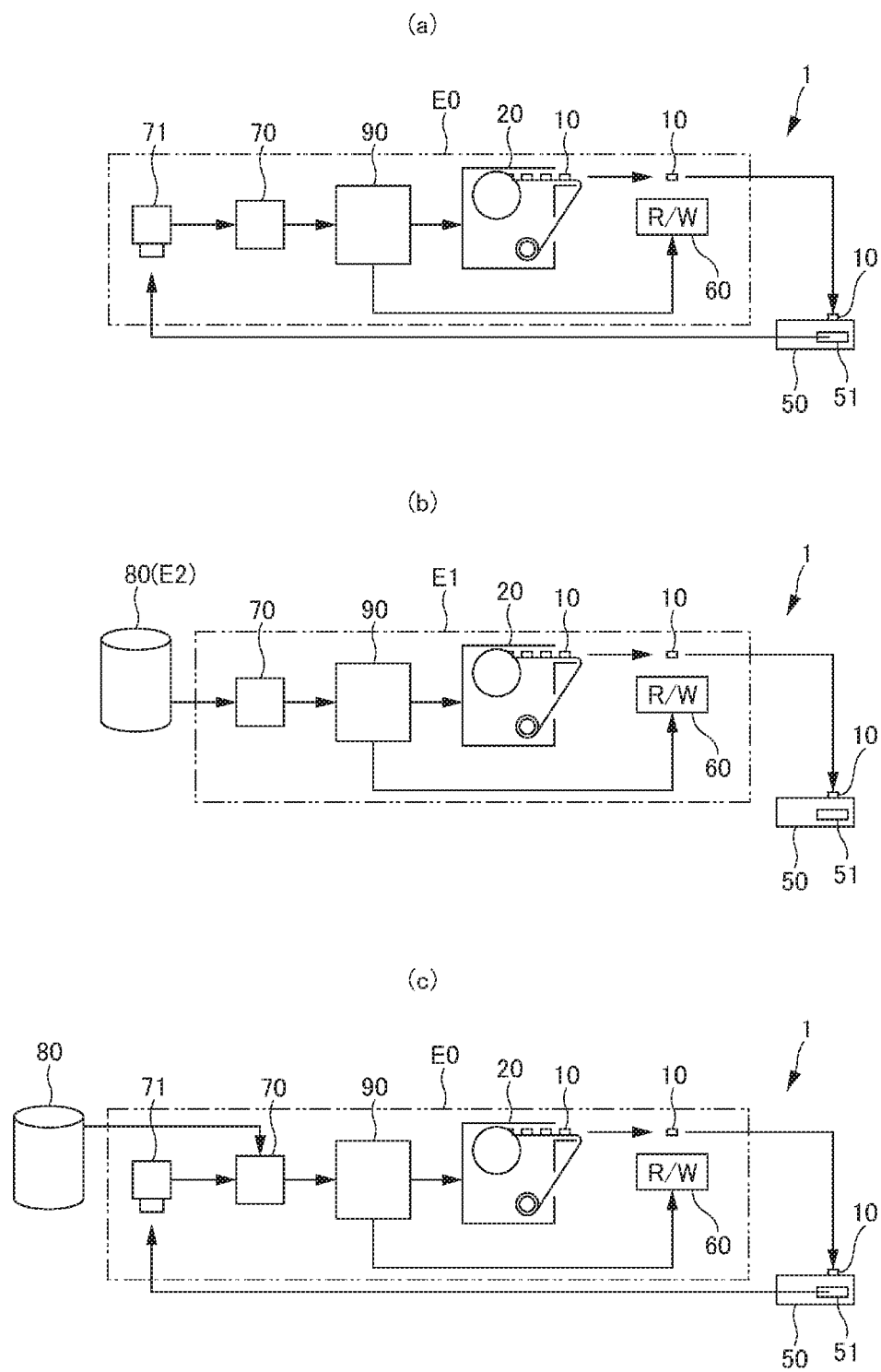

[FIG.2]
(a)
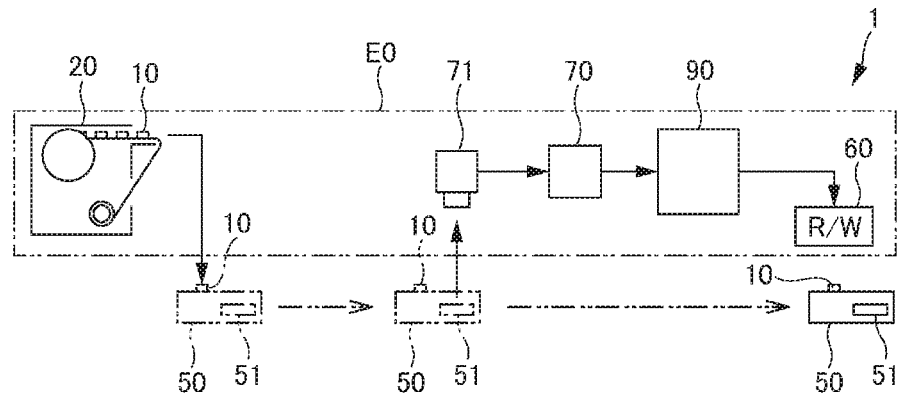
(b)
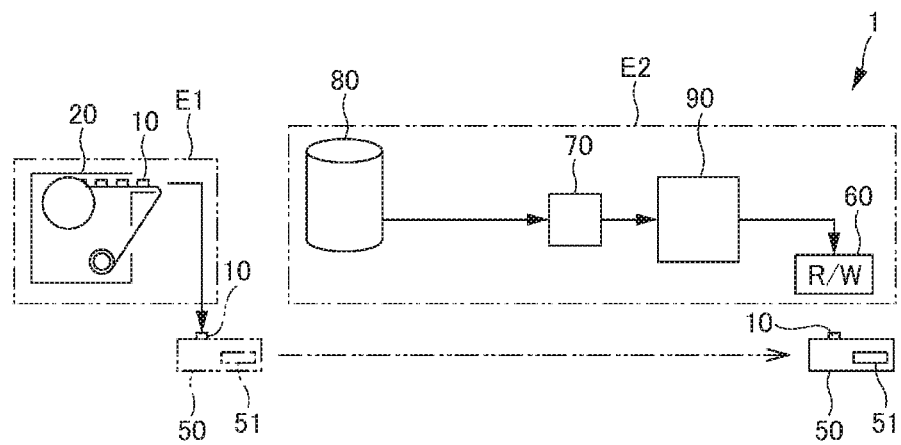
(c)
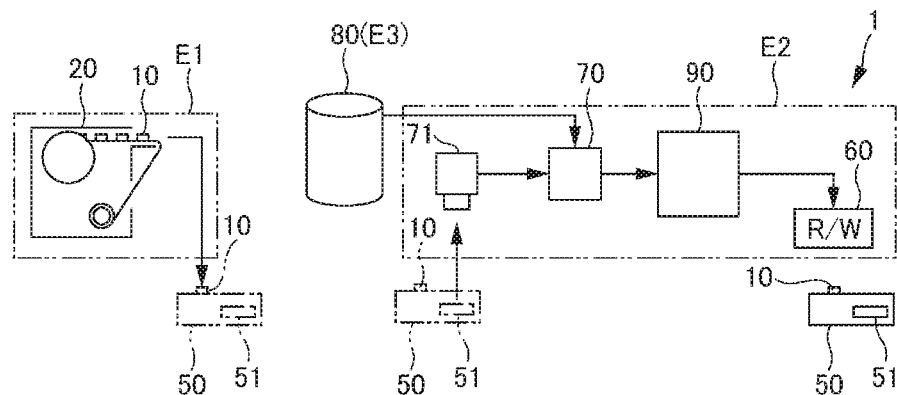

[FIG.3]
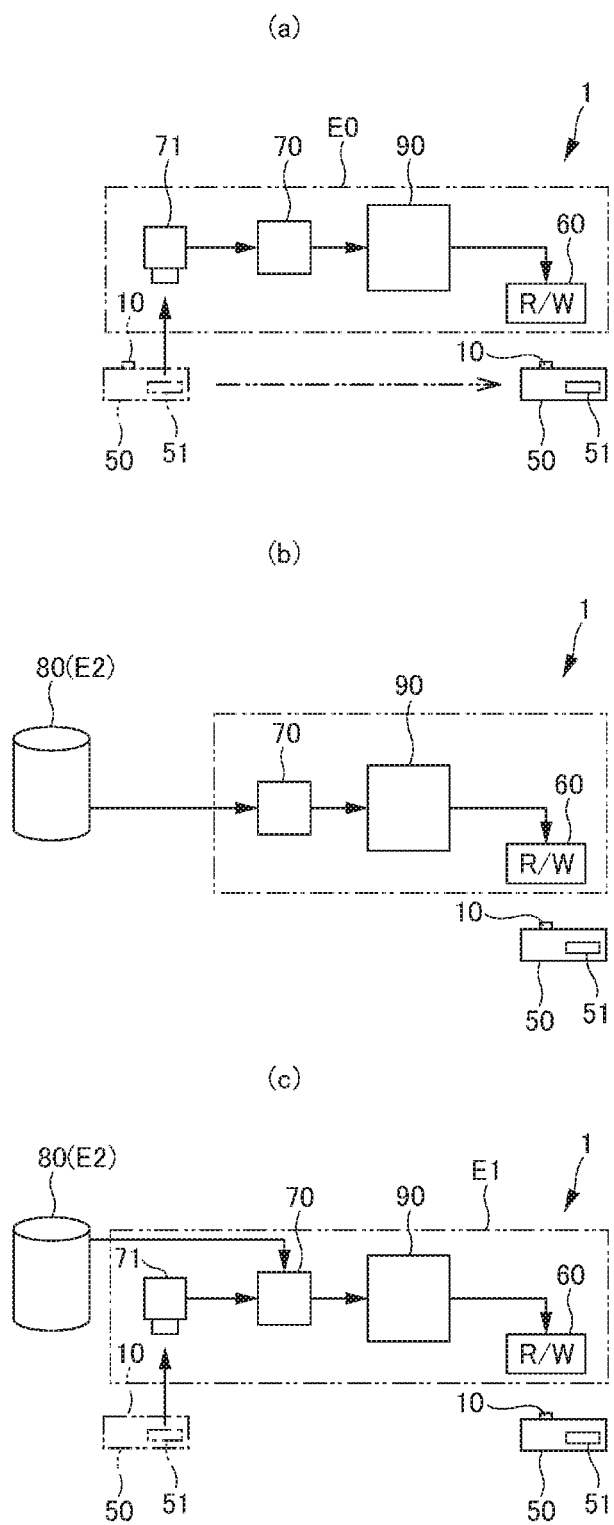

[FIG.4]
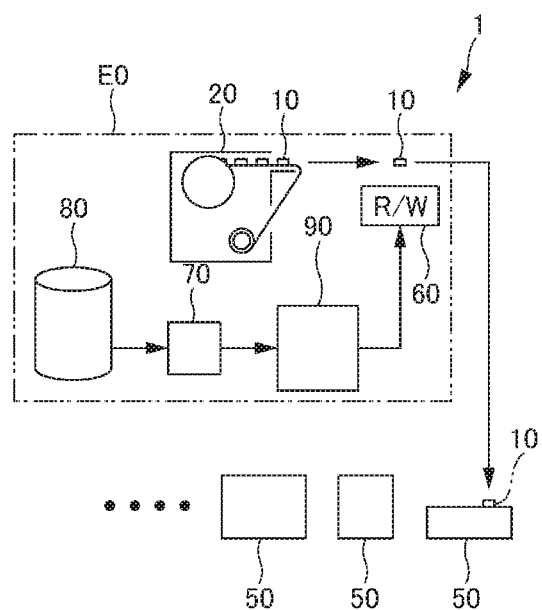

[FIG.5]
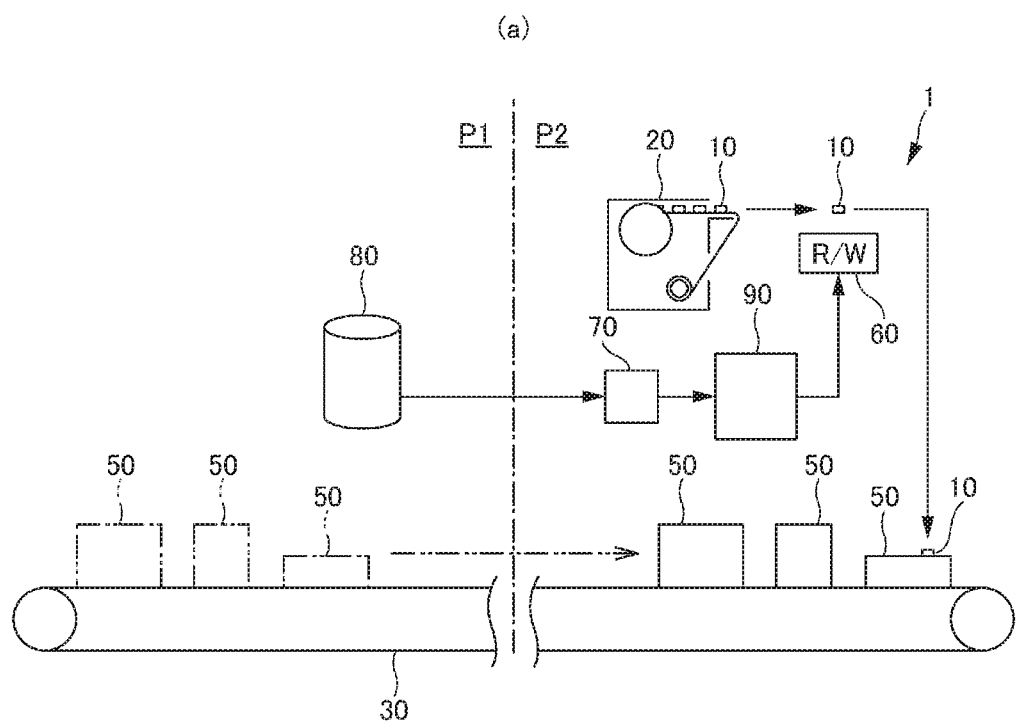
(a)
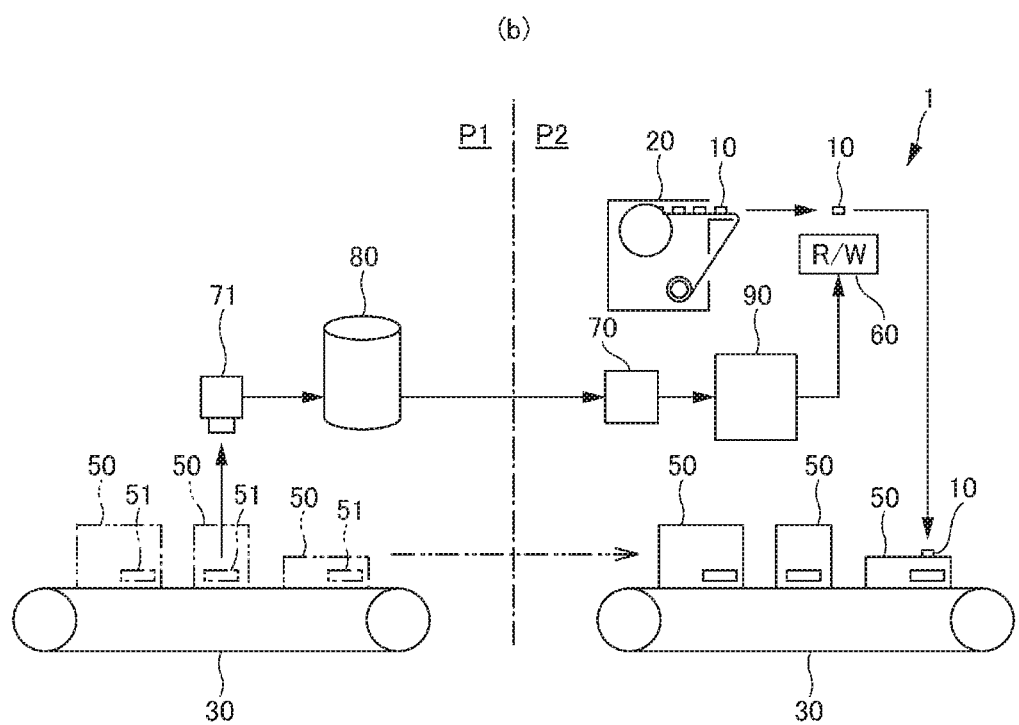
(b)

[FIG.6]
(a)
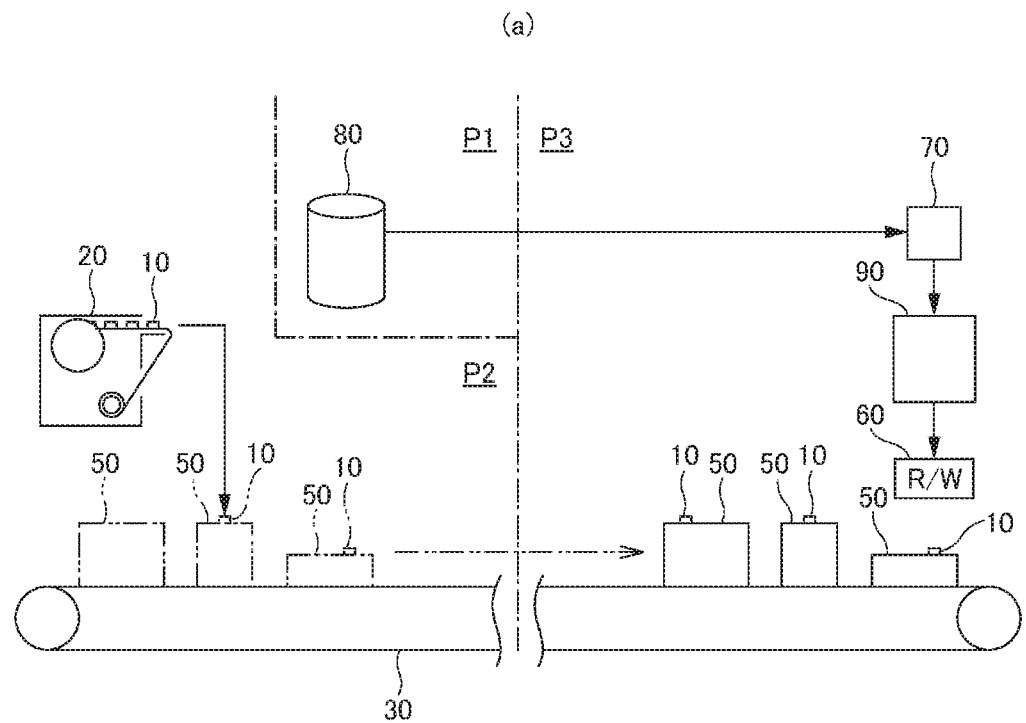
(b)
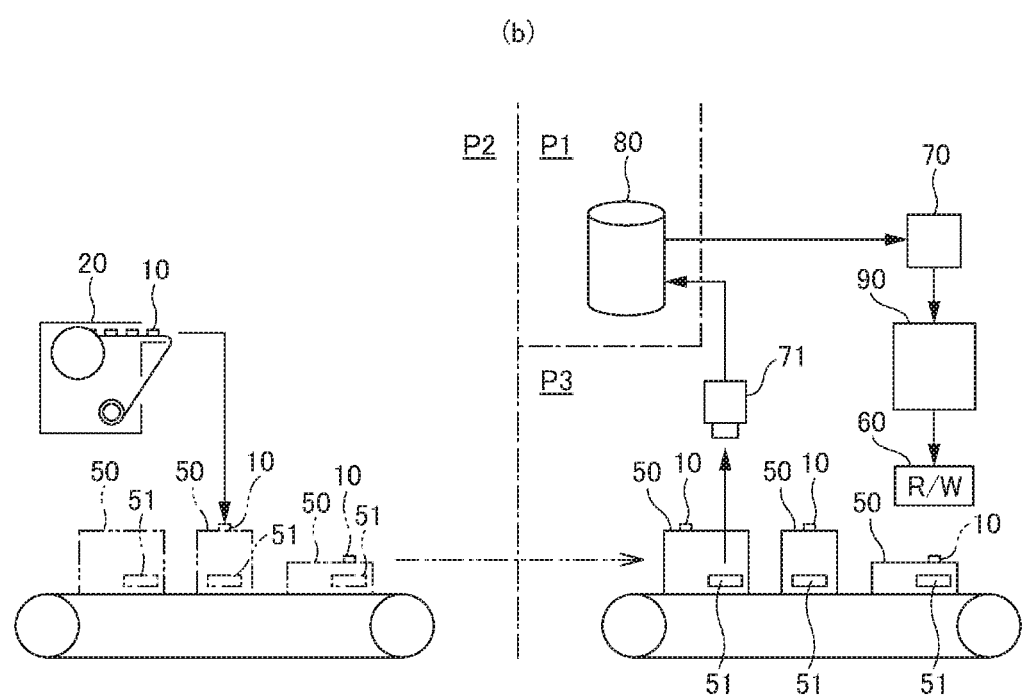

[FIG.7]
(a)
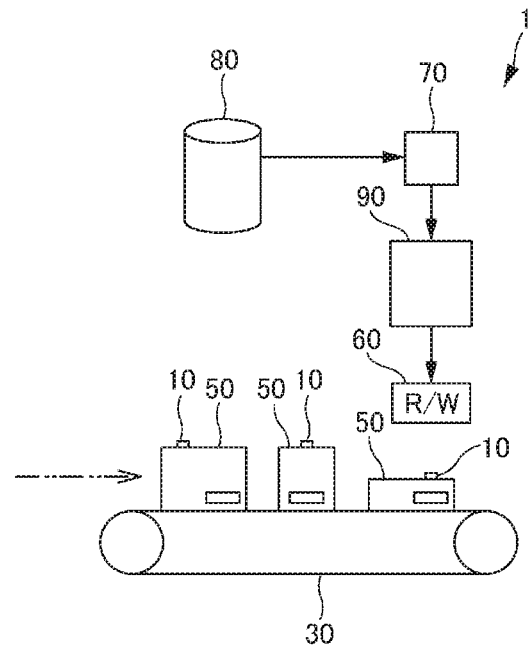
(b)
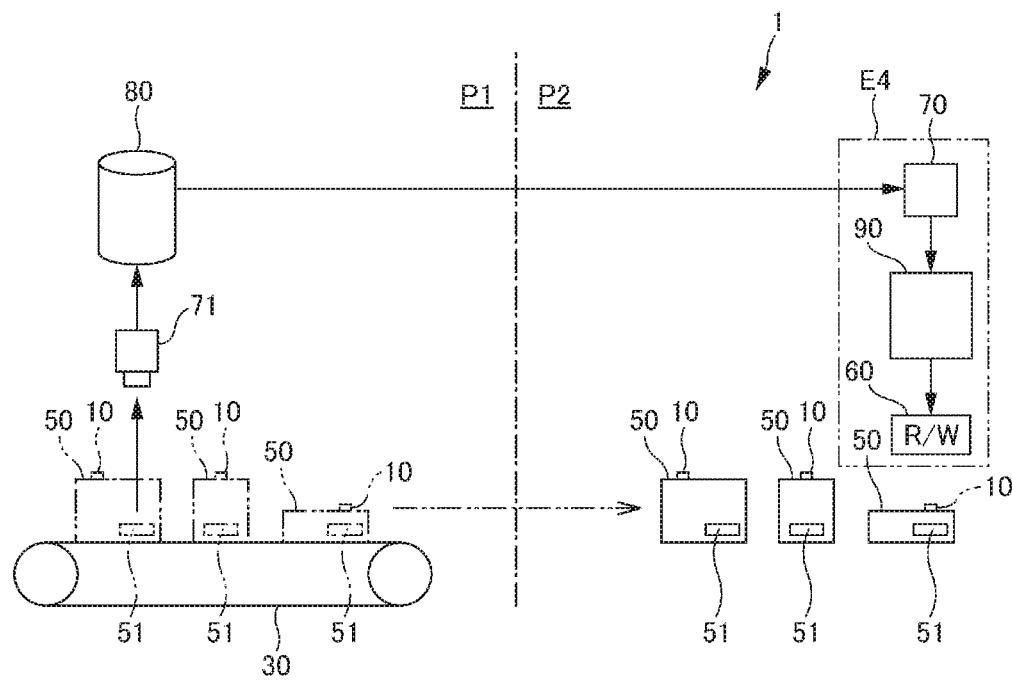

[FIG.8]
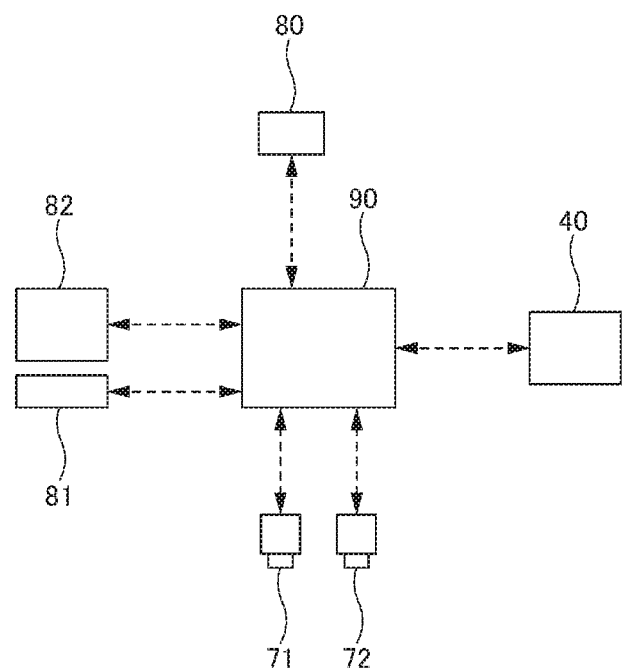

[FIG.9]
(a)
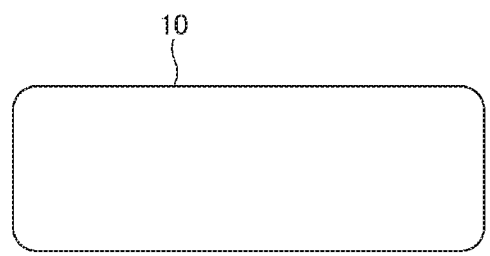
(b)
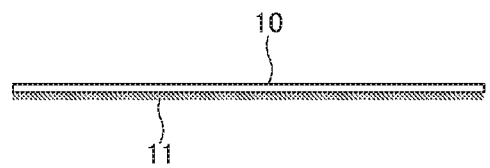
(c)
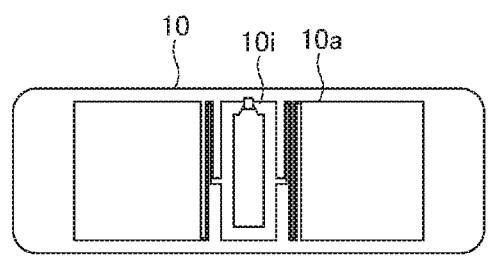

[FIG.10]
(a) 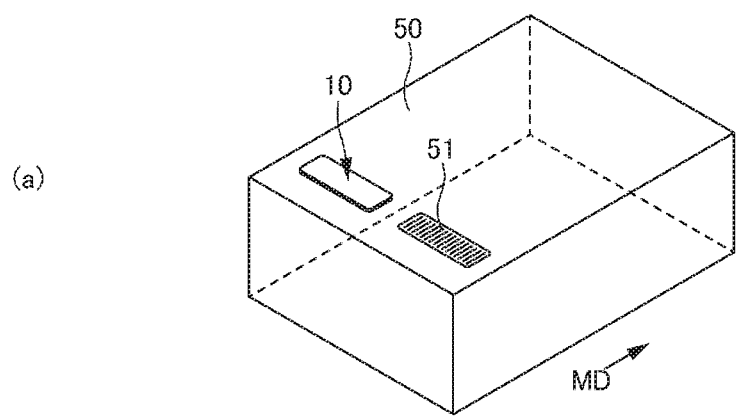
(b) 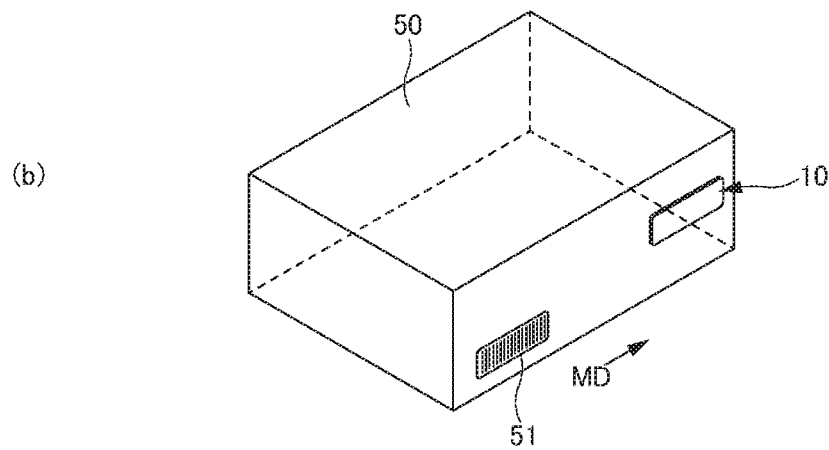
(c) 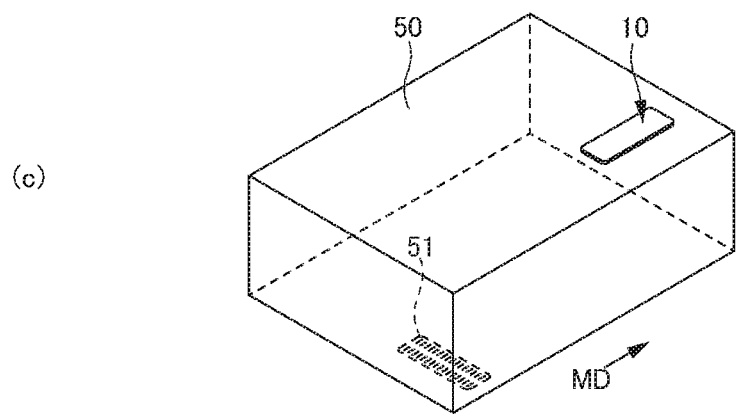

[FIG.11]
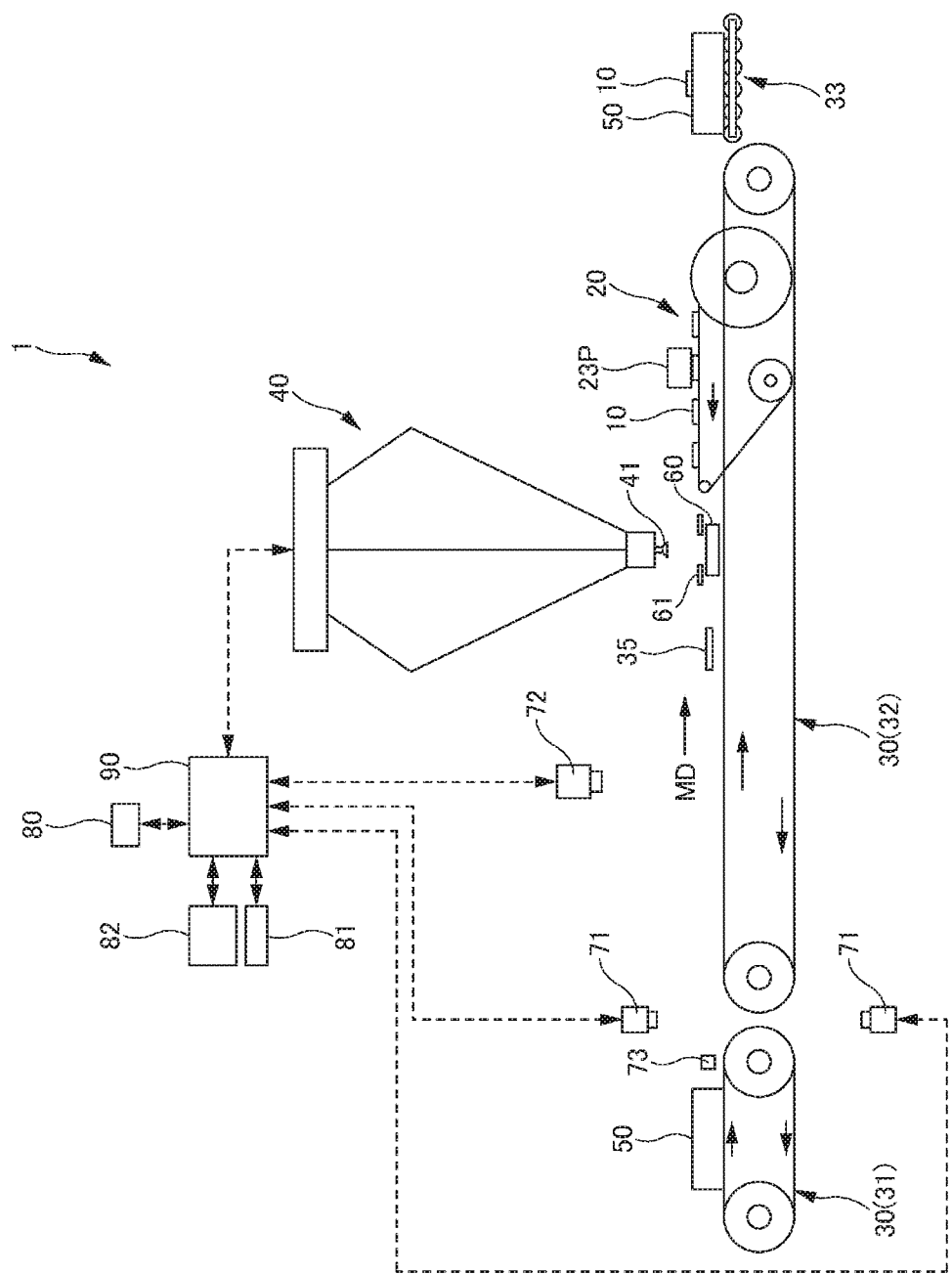

[FIG.12]
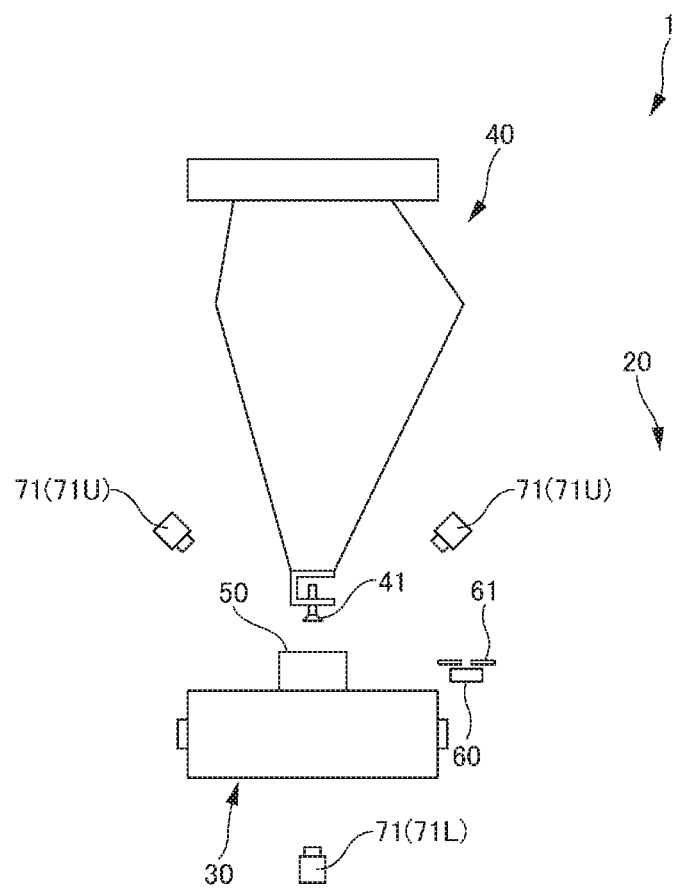

[FIG.13]
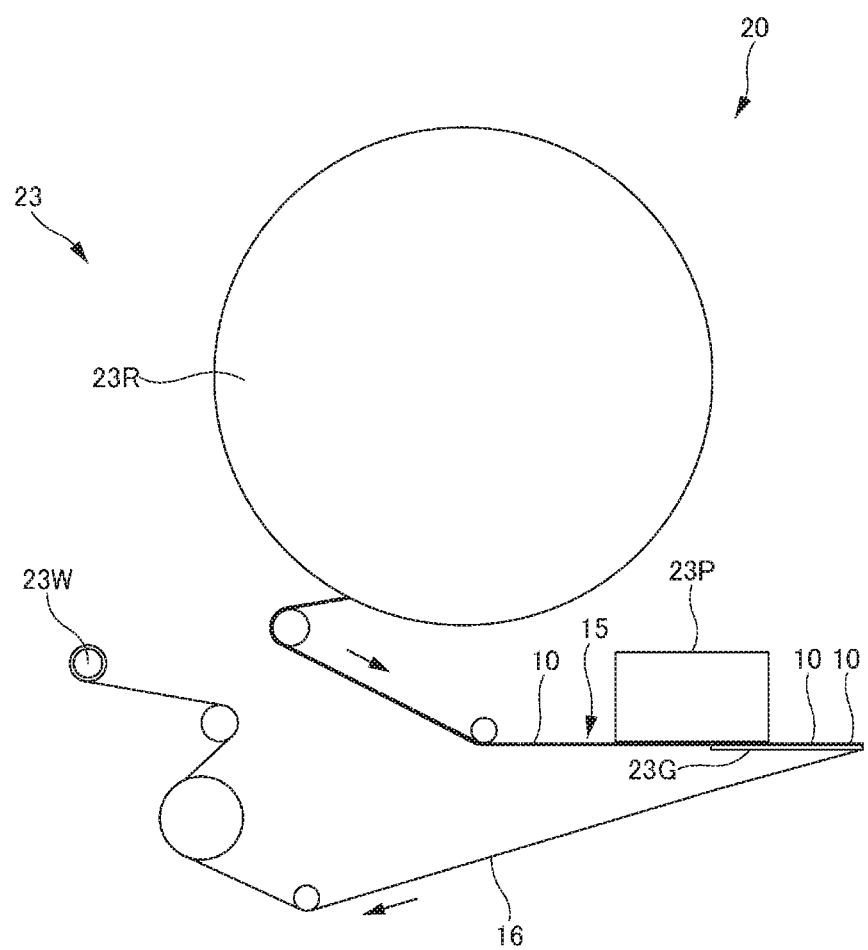

[FIG.14]
(a)
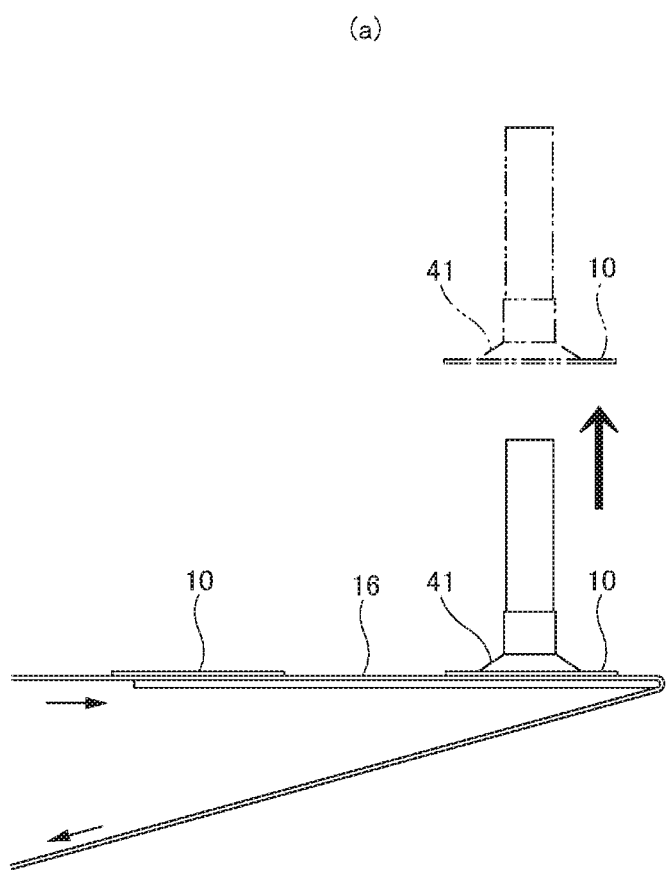
(b)
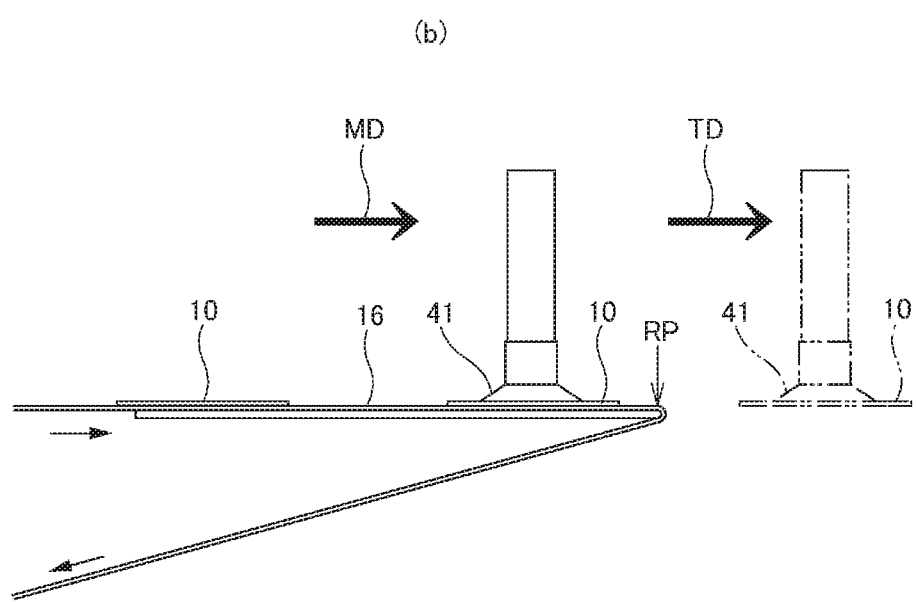

[FIG.15]
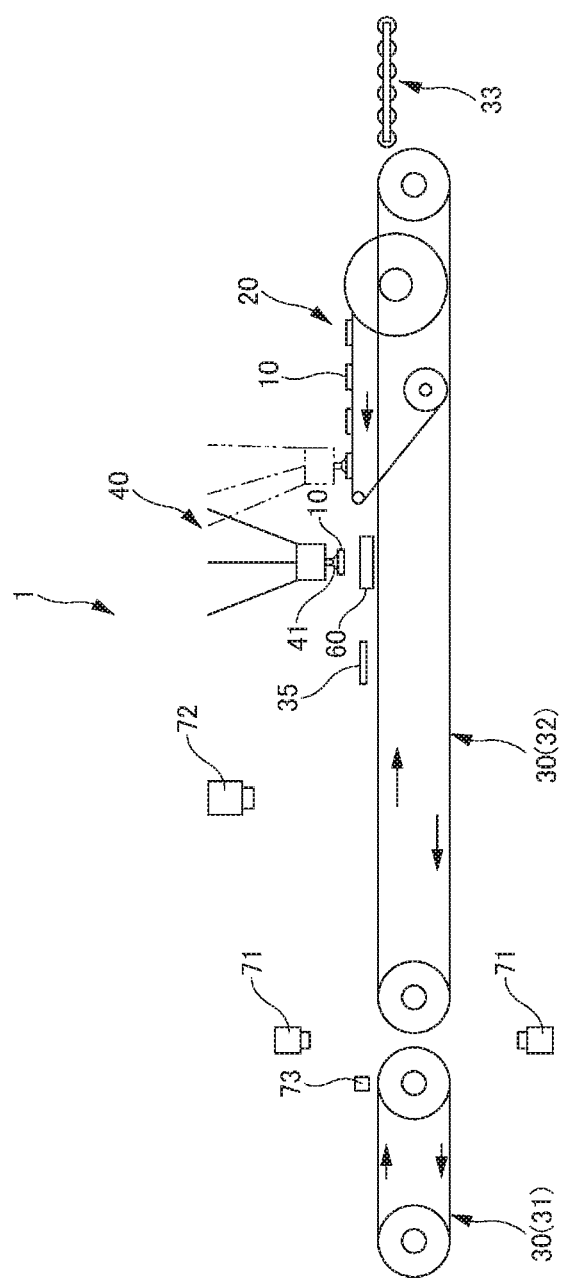

[FIG.16]
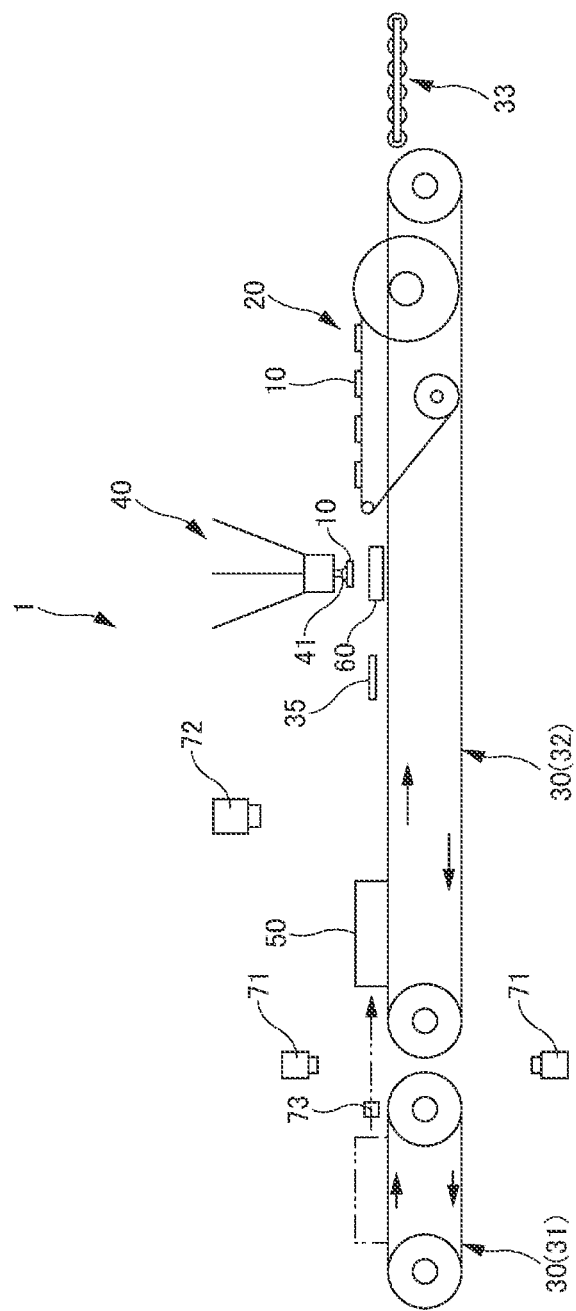

[FIG.17]
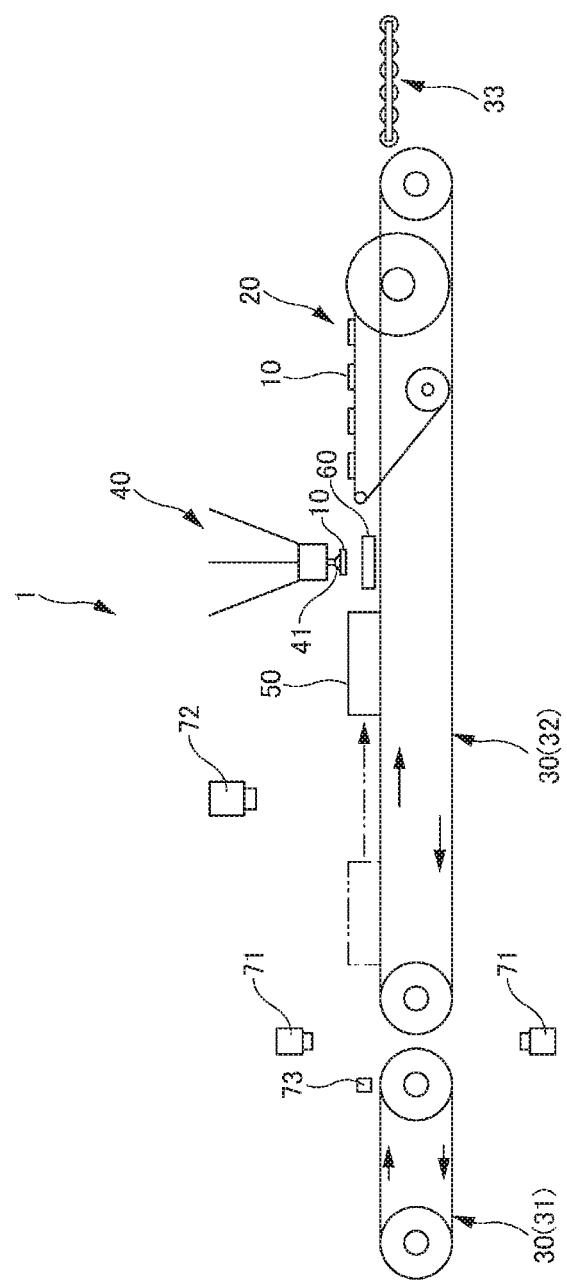

[FIG.18]
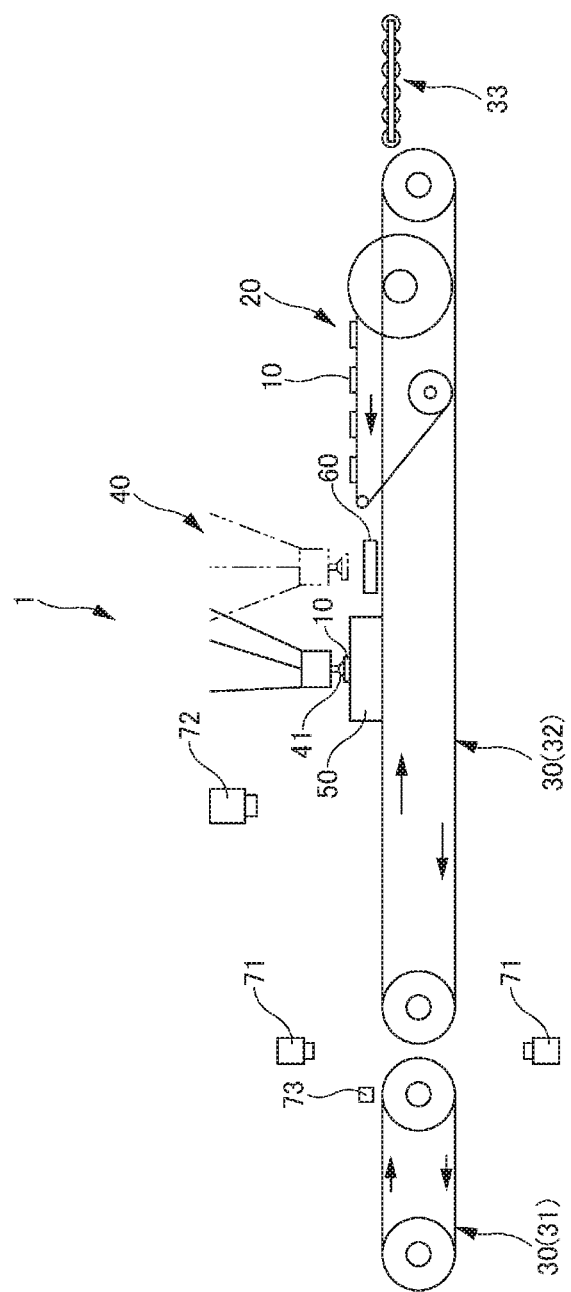

[FIG.19]
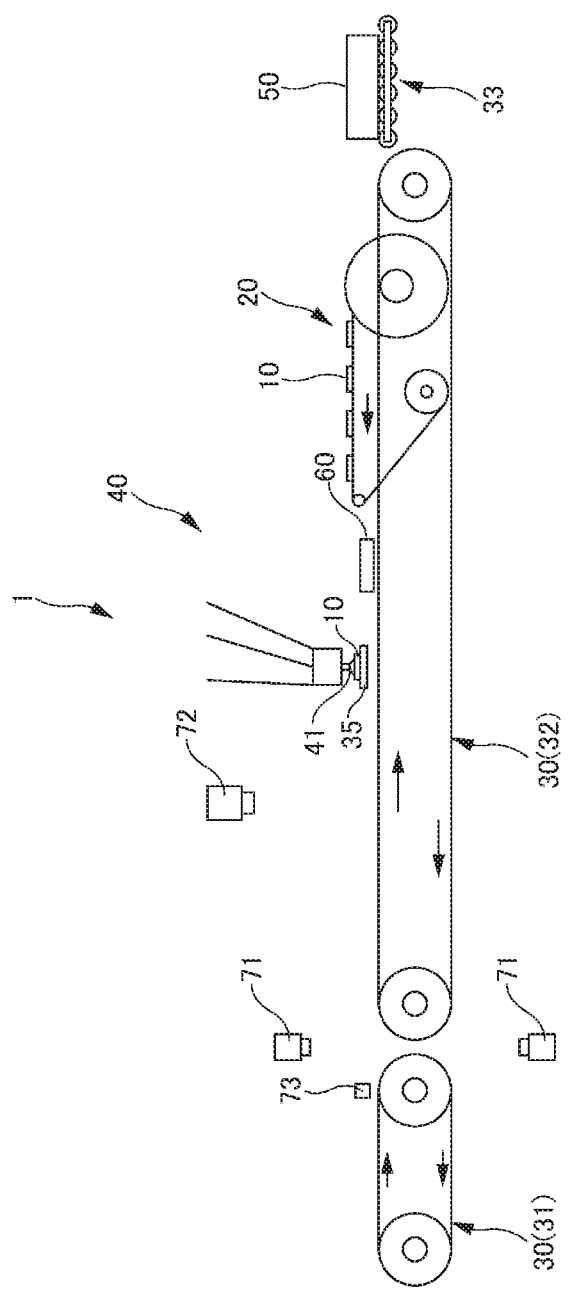

[FIG.20]
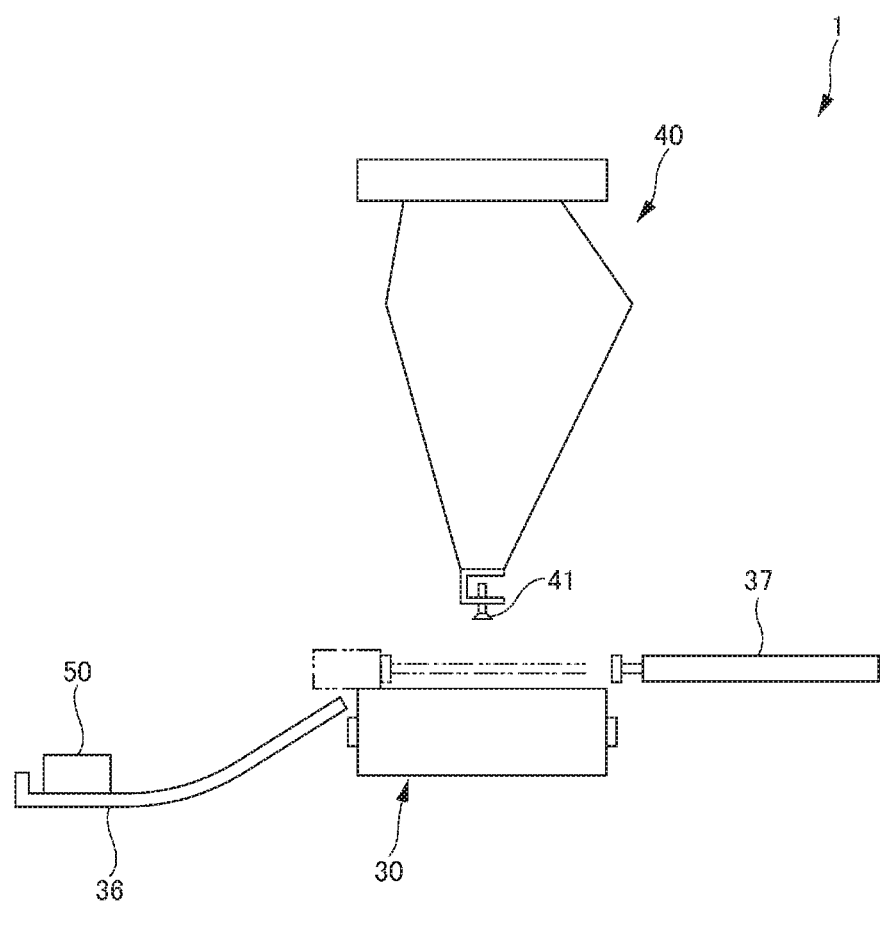

[FIG.21]
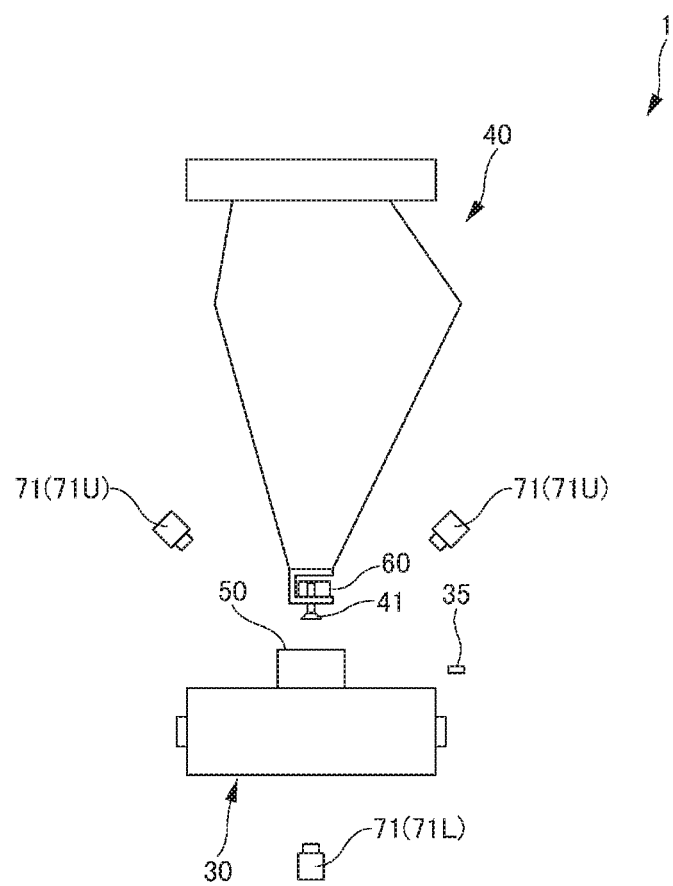

[FIG.22]
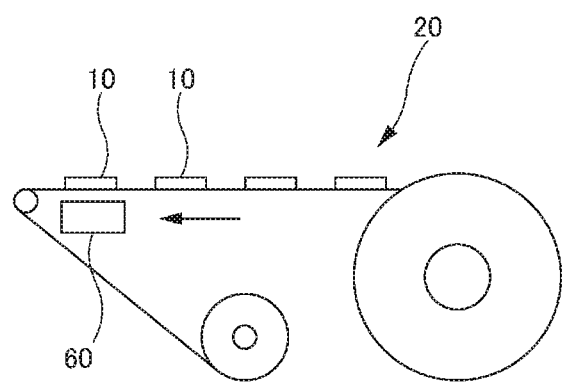

[FIG.23]
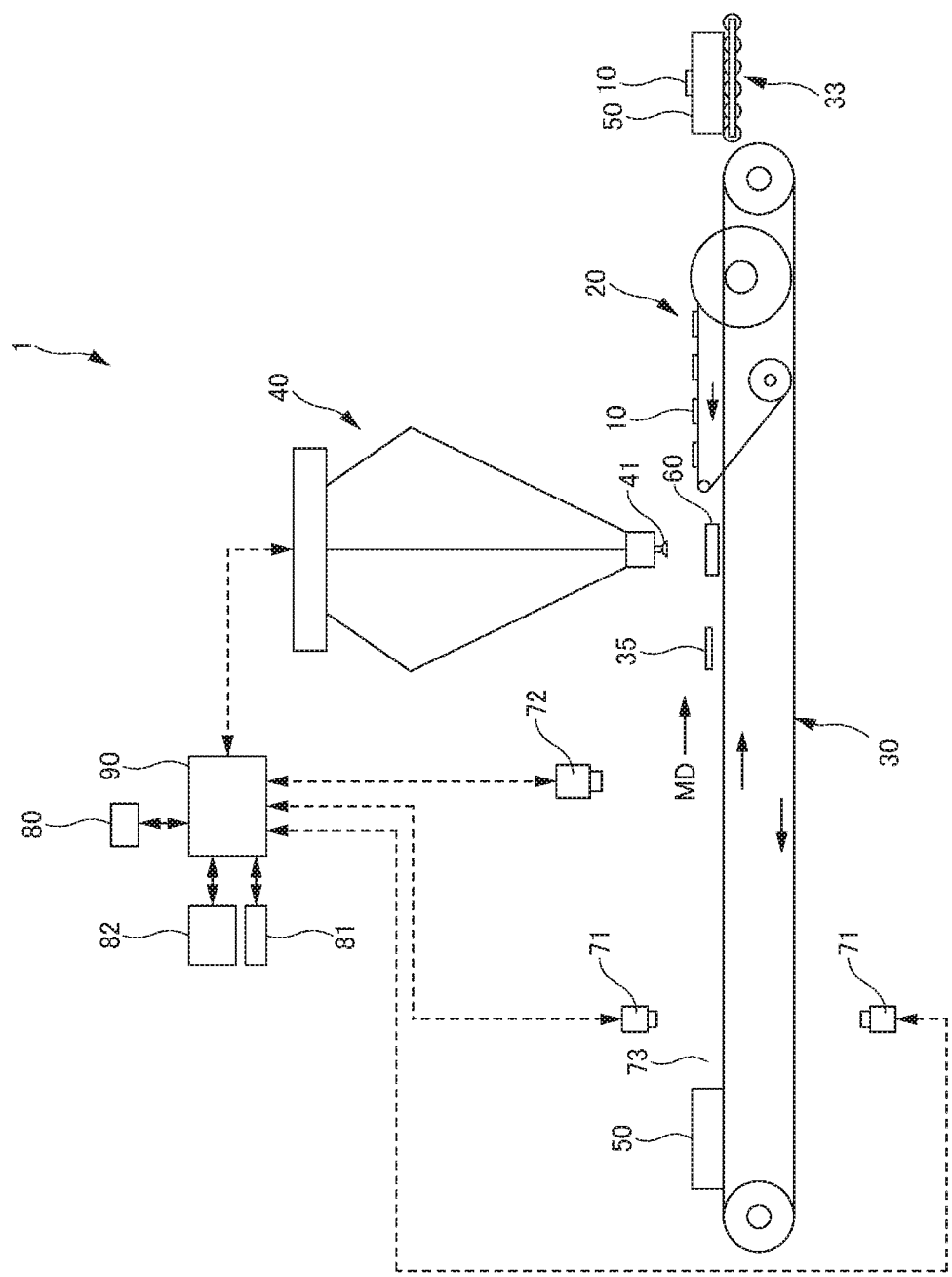

[FIG.25]
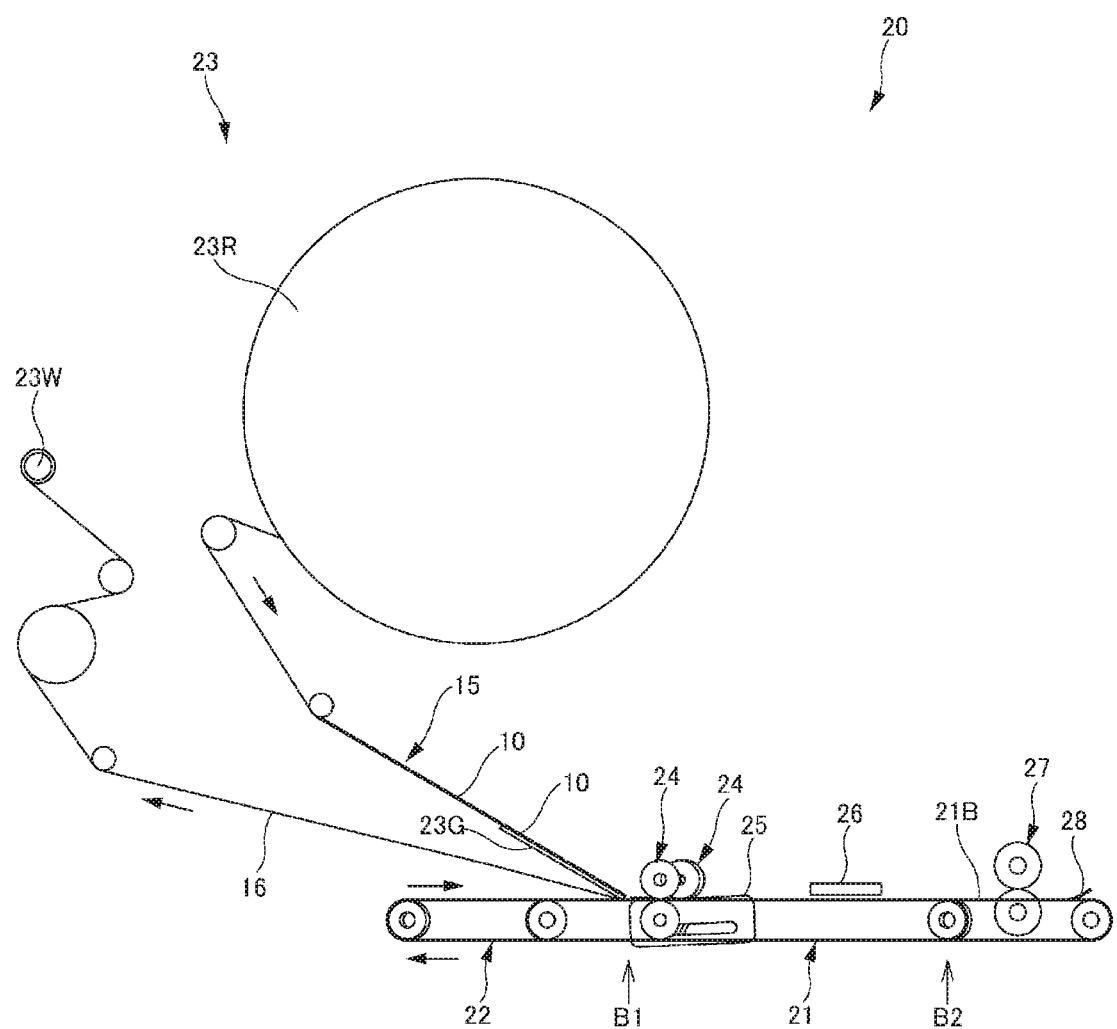

[FIG.26]
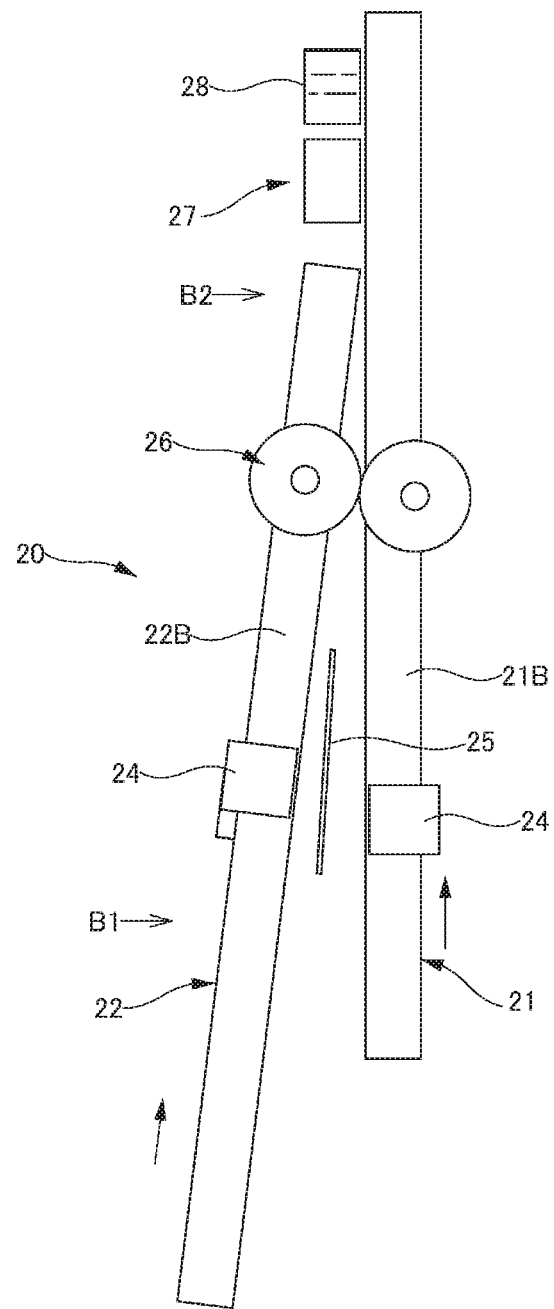

[FIG.27]
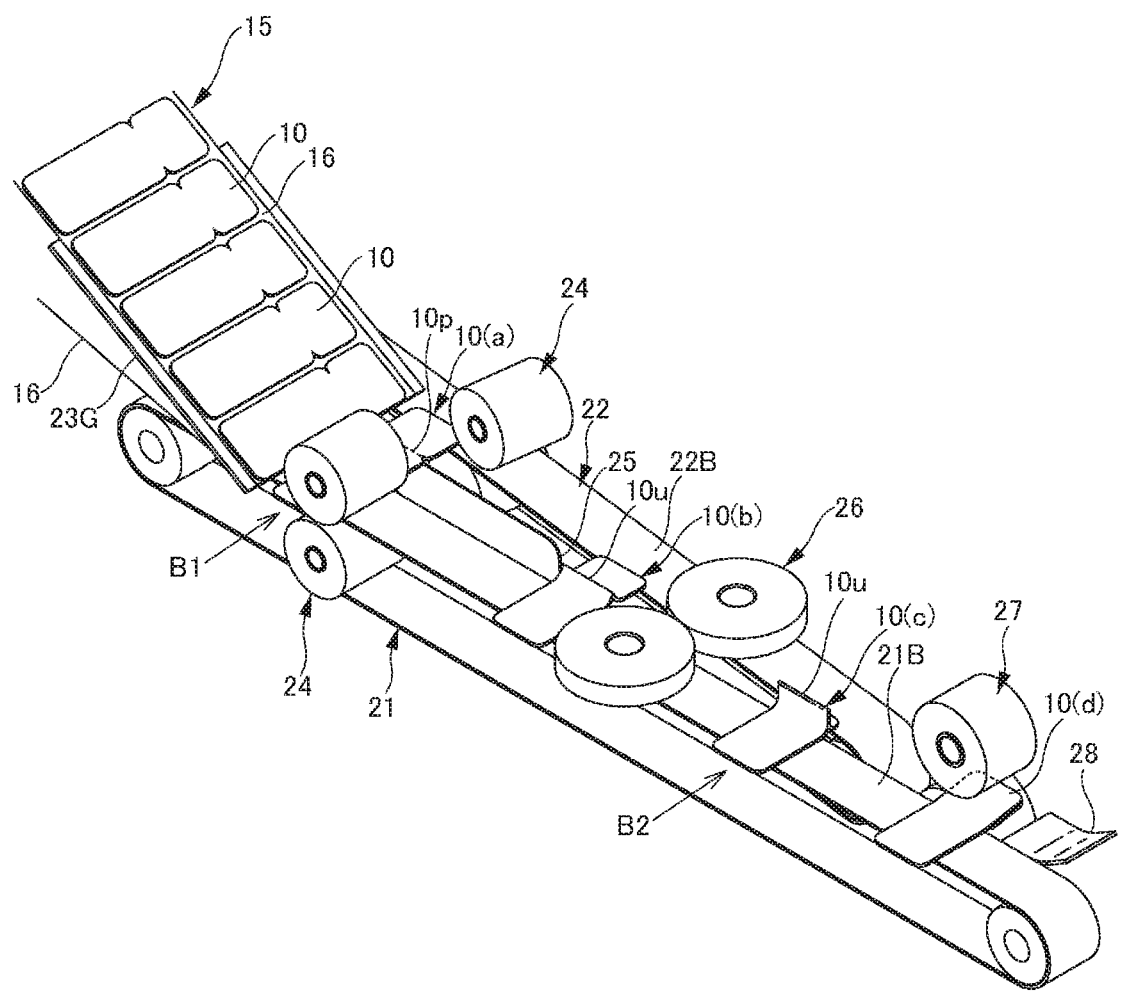

[FIG.28]
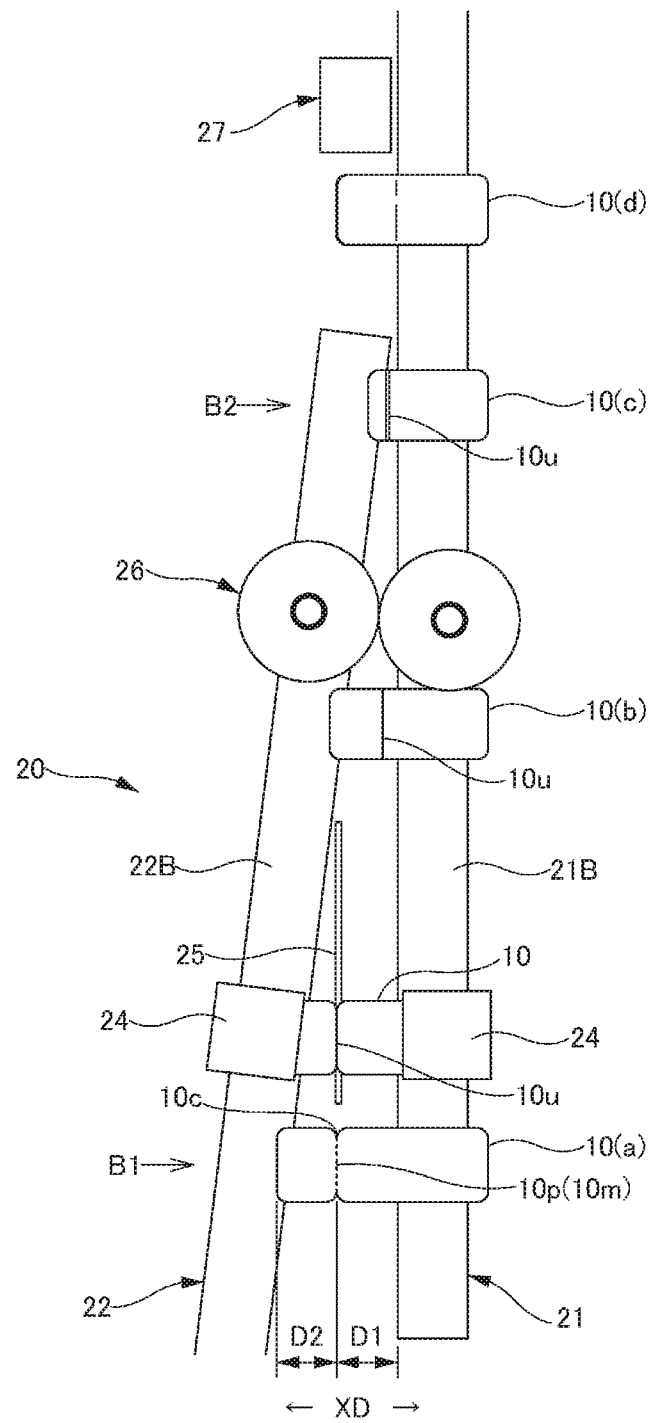

[FIG.29]
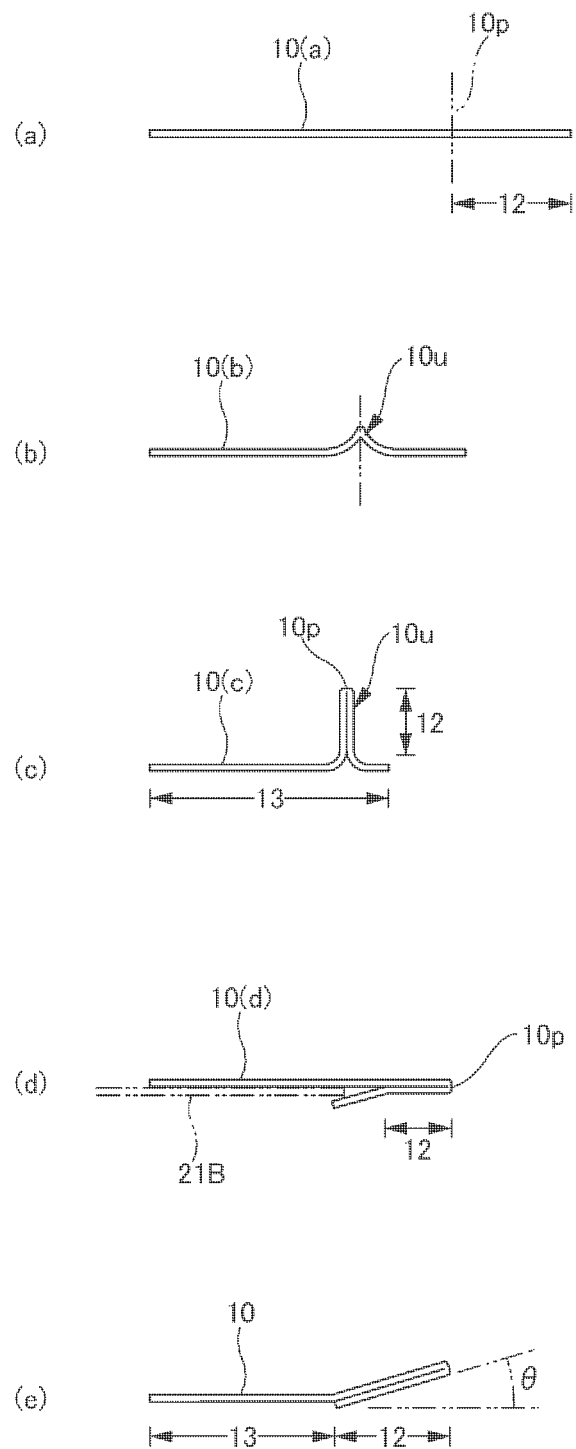

[FIG.30]
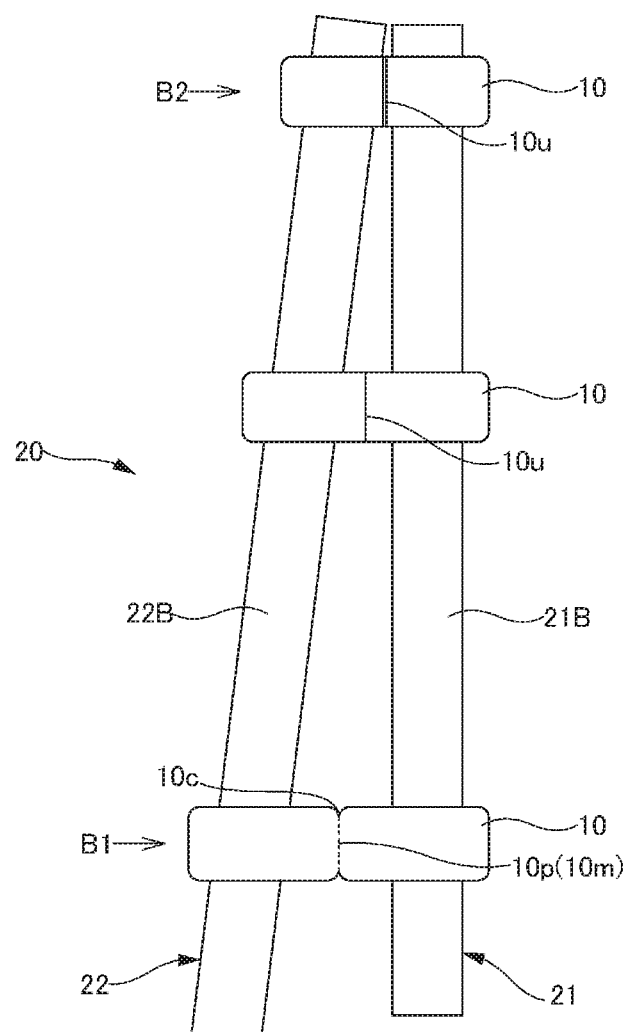

[FIG.31]
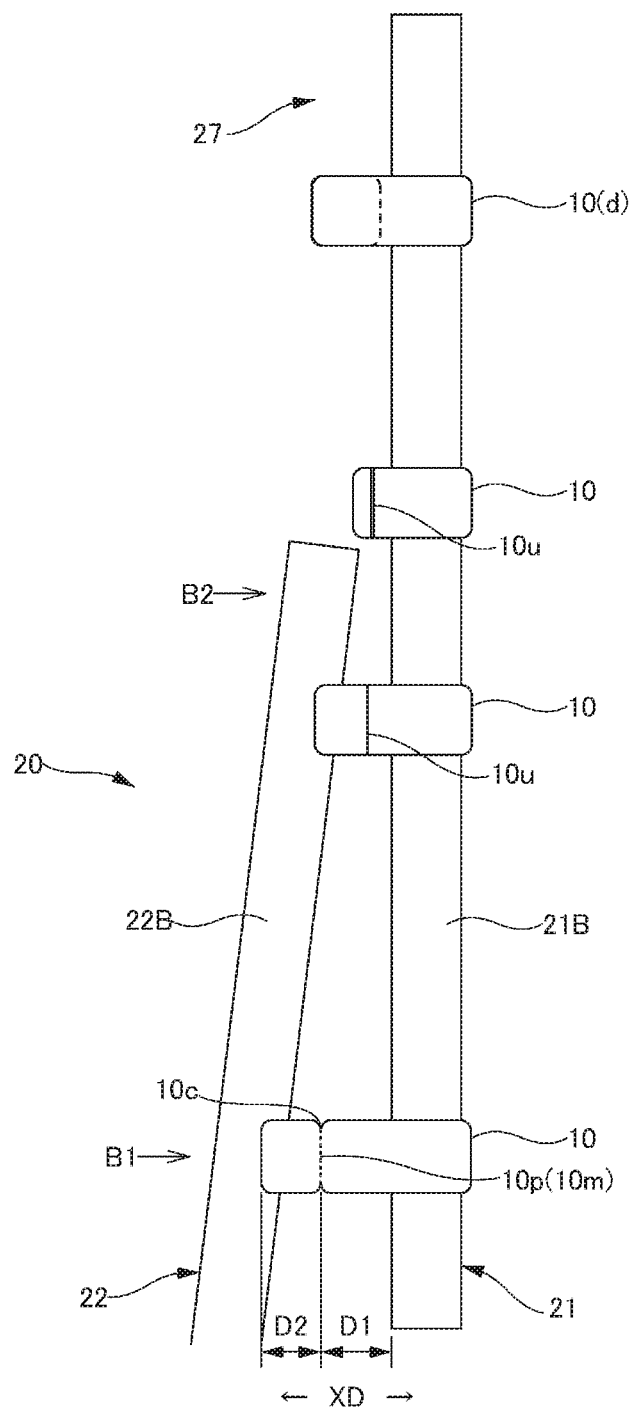

[FIG.32]
(a)
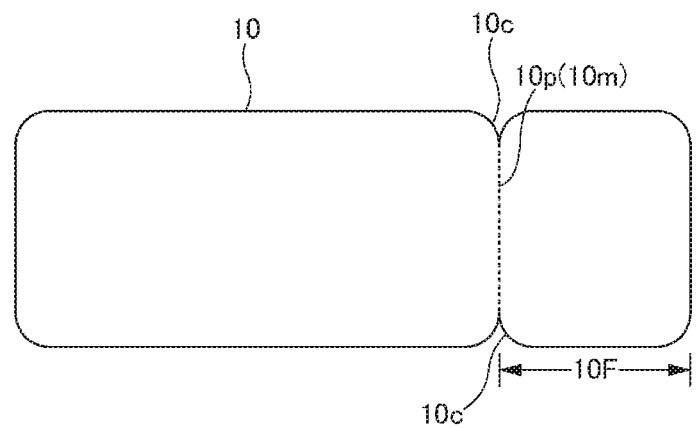
(b)
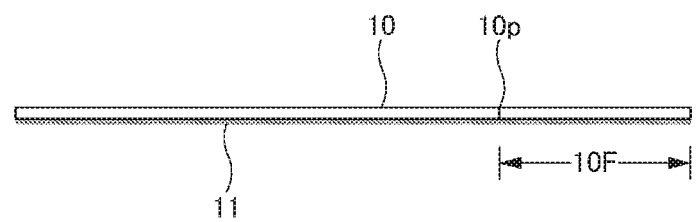
(c)
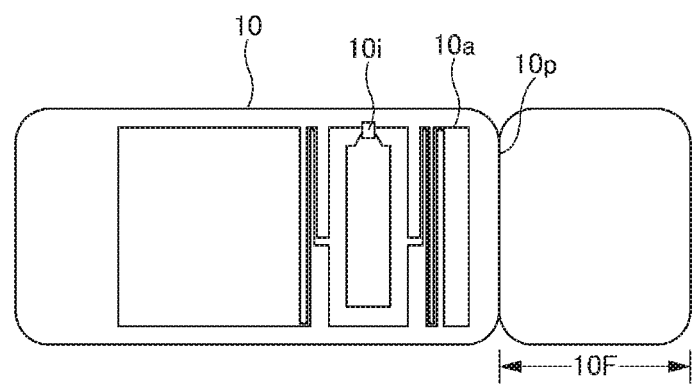

[FIG.33]
(a)
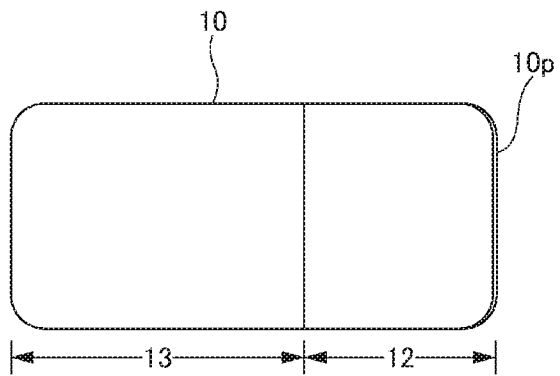
(b)
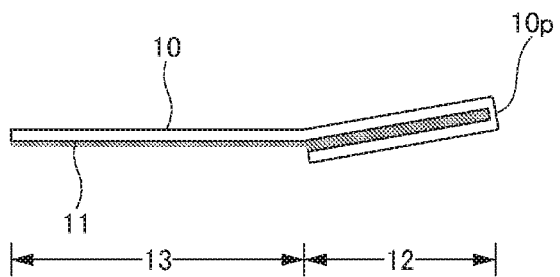
(c)
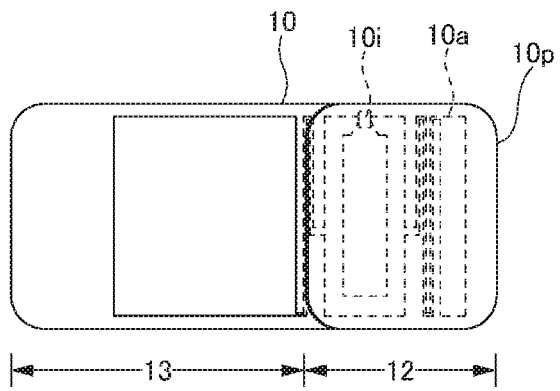

[FIG.34]
(a)
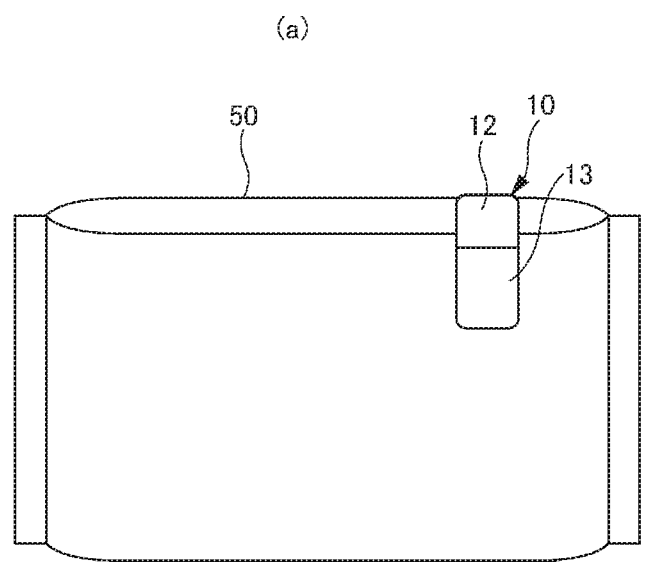
(b)
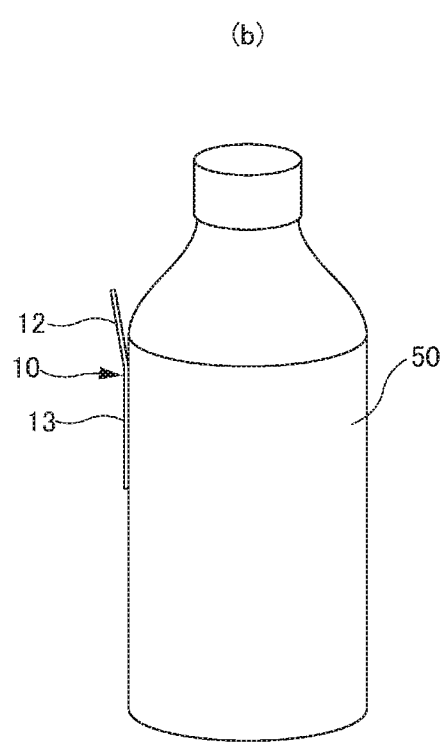

[FIG.35]
(a)
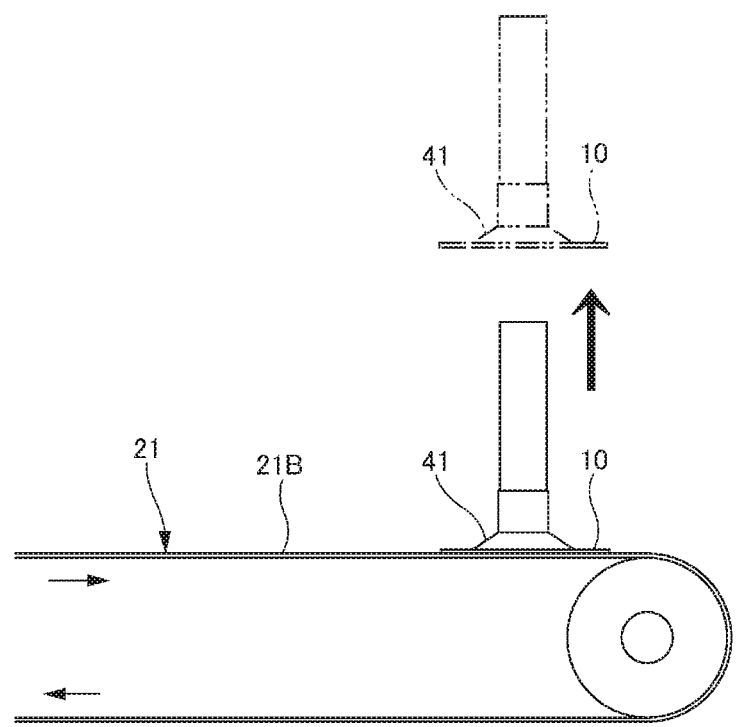
(b)
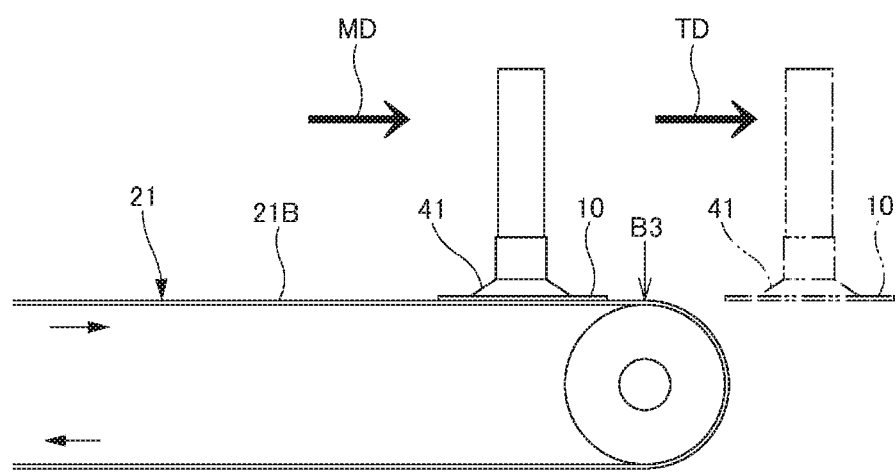

[FIG.36]
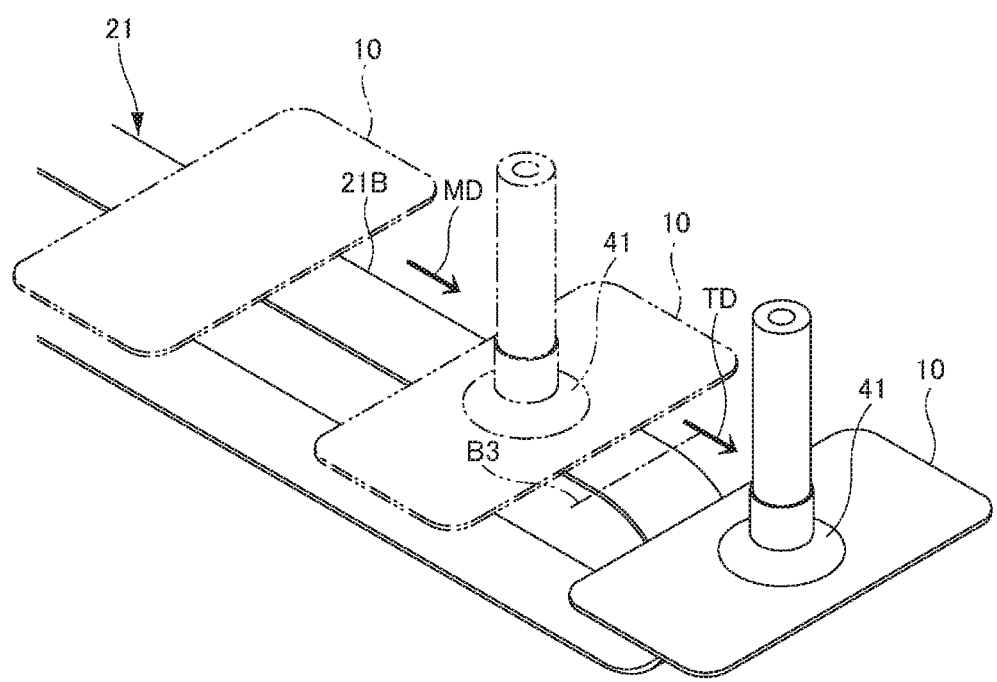

[FIG.37]
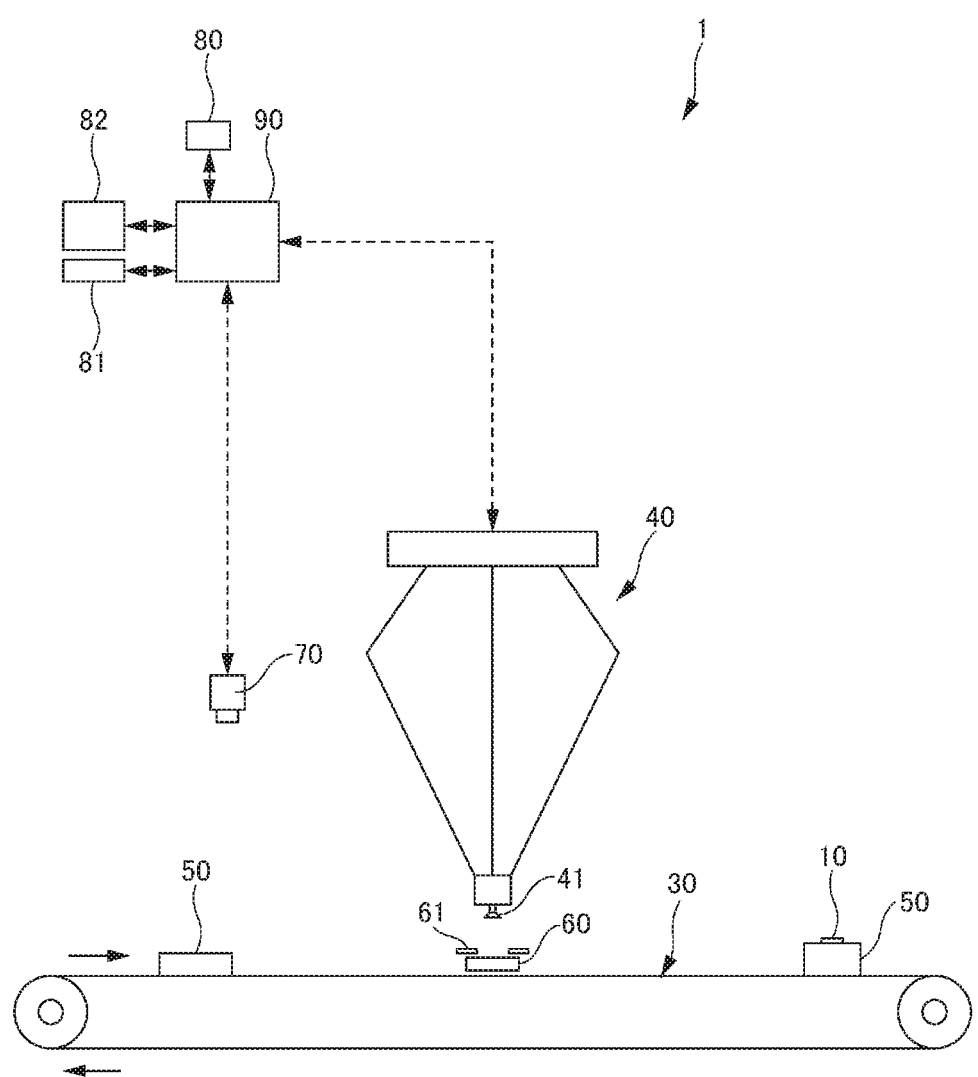

[FIG.38]
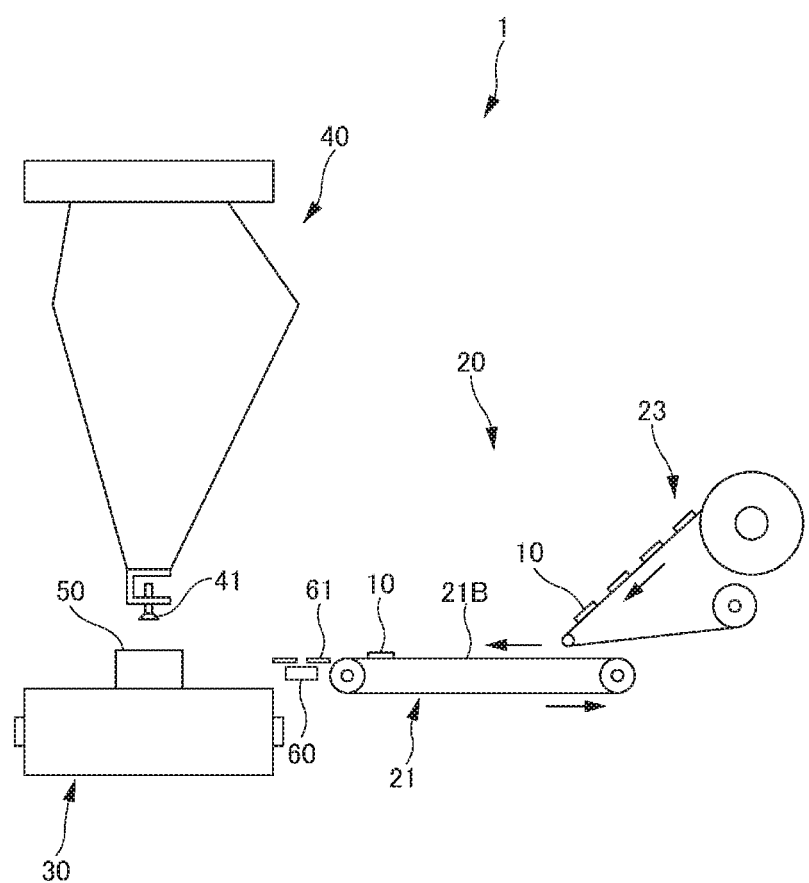

[FIG.39]
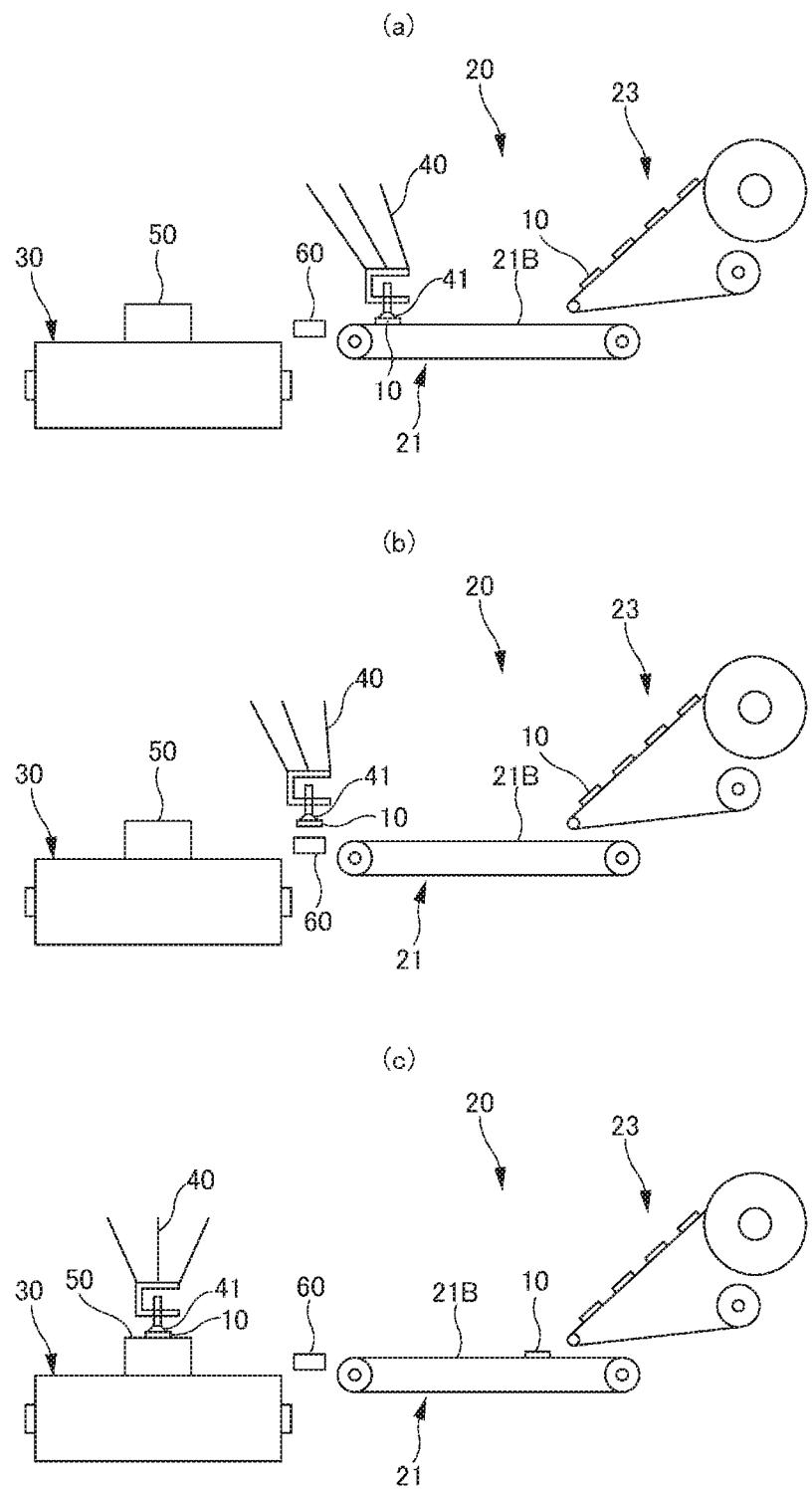

[FIG.40]
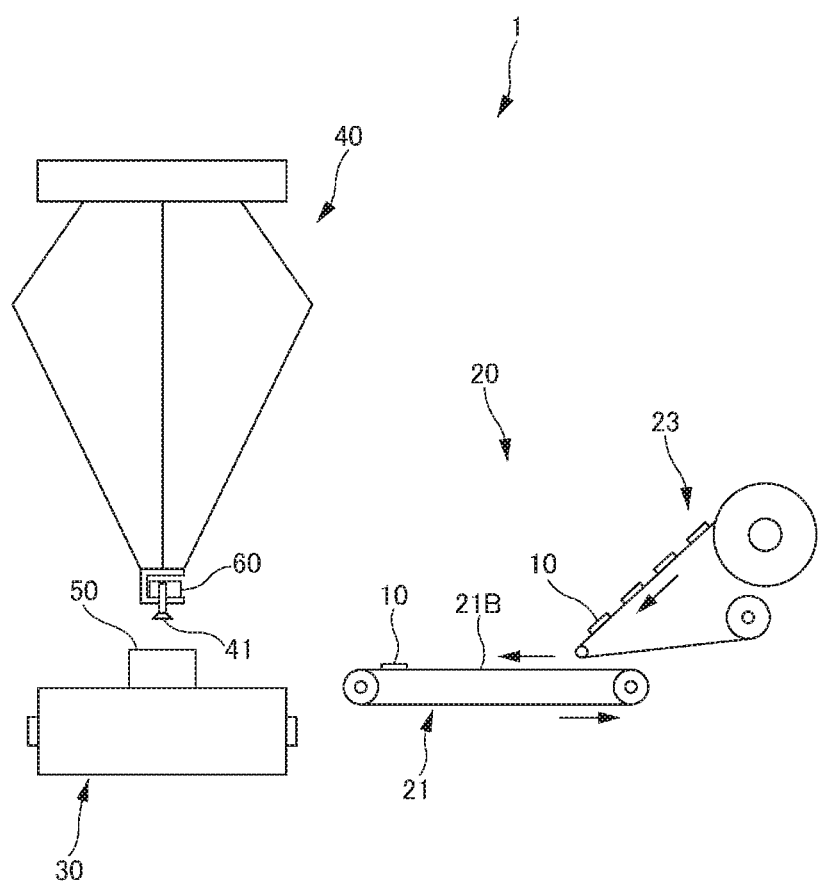

[FIG.41]
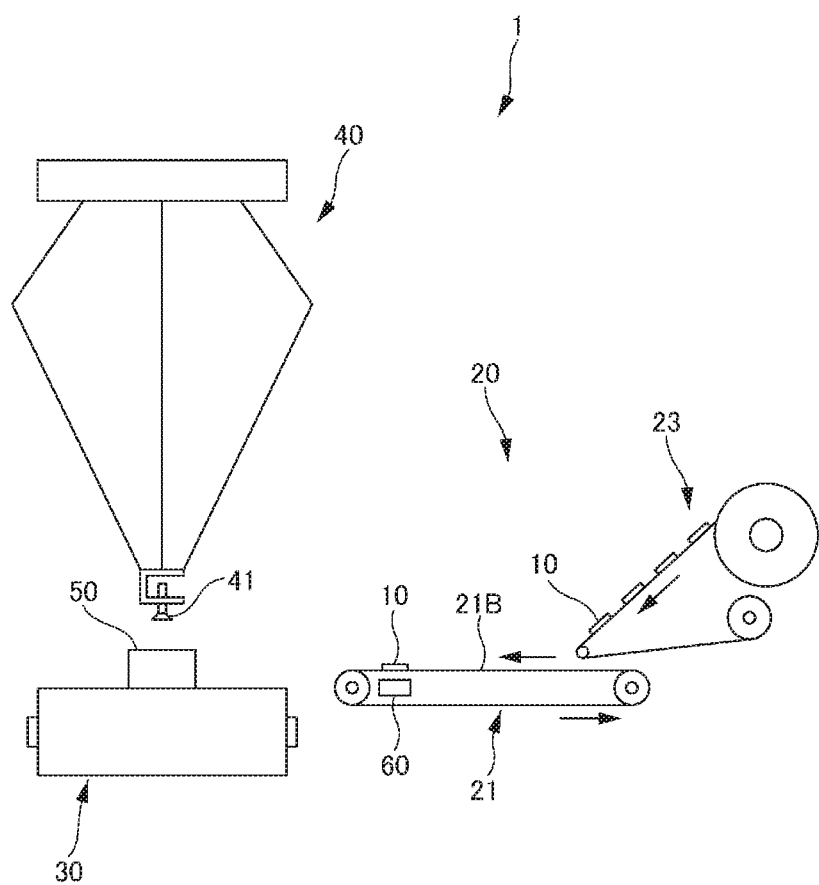

[FIG.42]
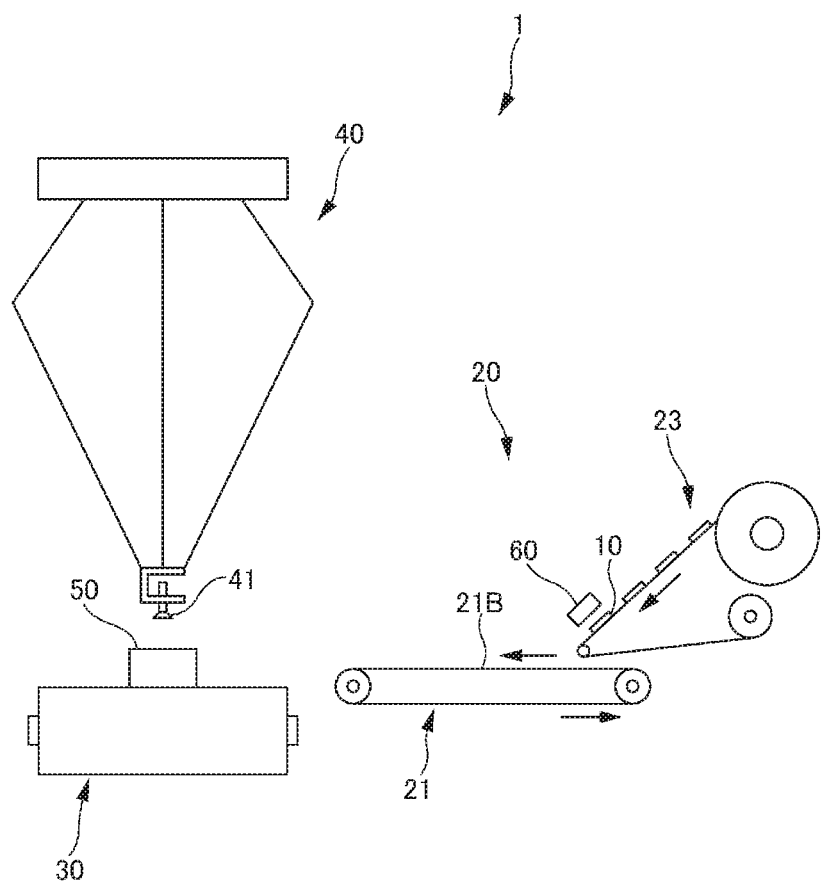

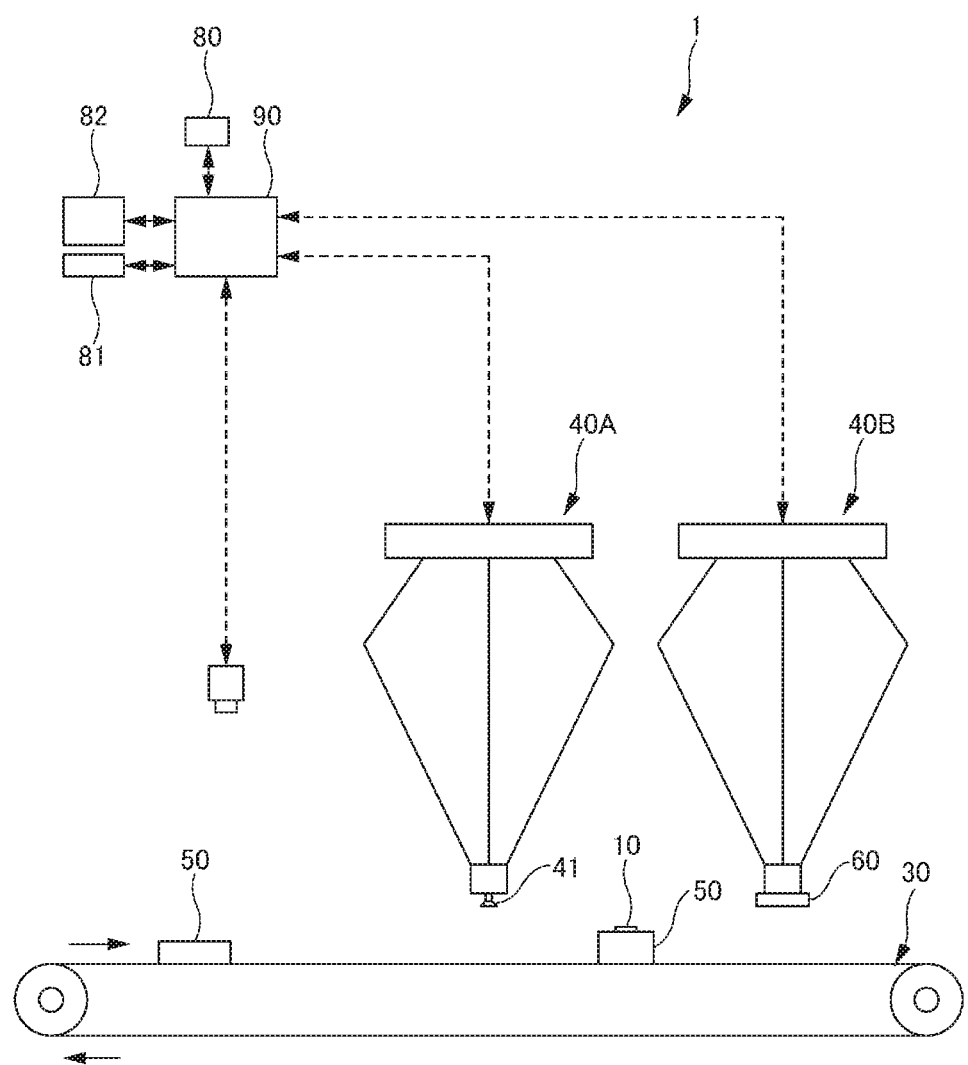
[FIG.43]

ELECTRONIC TAG WRITING SYSTEM AND METHOD FOR SAME

CROSS-REFERENCE TO RELATED APPLICATIONS

This application is the U.S. national stage application of International Application PCT/JP2019/016758, filed Apr. 19, 2019, which international application was published on Oct. 24, 2019, as International Publication WO 2019/203337 in the Japanese language. The International Application claims priority of Japanese Patent Application Nos. 2019-044000, filed Mar. 11, 2019; 2018-194639, filed Oct. 15, 2018; and 2018-080994, filed Apr. 19, 2018. The international application and Japanese applications are all incorporated herein by reference, in entirety.

TECHNICAL FIELD

The present invention relates to an electronic tag writing system and a method for the same.

BACKGROUND ART

As is well known, an electronic tag (also referred to as an RF tag, an IC tag, an RF label, etc.) has an IC chip and an antenna connected to the IC chip for performing contactless storage and reading of information by short-range wireless communication. In addition, in general, the electronic tag has a pressure sensitive adhesion surface as a back surface to stick to an object, or has no pressure sensitive adhesion surface and is attached to a product by a string, etc. Radio frequency identification (RFID) is an automatic recognition system that uses such an electronic tag to write information about an object into the electronic tag and reads information stored in the electronic tag by wireless communication.

Various studies and proposals have been made on the electronic tag, and some of the studies and proposals have been implemented while others have not been implemented. For example, the electronic tag is expected to be applied to individual product management as an alternative to an optically readable tag such as a bar code. However, usage in retail stores with low unit prices, such as convenience stores, has not been realized in Japan. A main reason therefor is that a unit price of the electronic tag is high. However, a problem of reading accuracy (blocking of radio waves due to water contained in product content, a metal product container, etc.) and an incomplete electronic tag writing technology for individual products have hindered widespread use.

Among these reasons, with regard to the electronic tag writing technology, a technology for writing certain information (for example, manufacturing information, truck loading information, inventory information, sales information, loss information, delivery information, expiration date information, and consumption information) into an electronic tag for a certain product has been proposed (for example, see Patent Literatures 1 to 4).

However, in order to realize individual product management using a scheme of attaching electronic tags into which certain information is written to products, source tagging (attaching electronic tags to products by makers) is necessary for almost all products, and it takes a lot of time for environment maintenance.

In addition, even when it is possible, it is impossible for the retail stores to meet the demand for attaching an electronic tag into which different information is written for each object. That is, in the case of attaching an electronic tag at a retail store, it is necessary to attach an electronic tag into which different information is written to merchandise of different types (sizes, packaging, etc.), quantities, etc. (small quantity and large variety). However, it is not practical to manually perform this operation, and there is no device for automatically performing this operation in a current situation. Naturally, other than the retail stores, there are demands similar to those of the retail stores in the case of manufacturers of small quantity and large variety production, etc.

CITATION LIST

Patent Literature

Patent Literature 1: JP 2005-104521 A
Patent Literature 2: JP 2007-091246 A
Patent Literature 3: JP 2007-091298 A
Patent Literature 4: JP 2008-044661 A
Patent Literature 5: JP 2008-62965 A

SUMMARY OF INVENTION

Technical Problem

Then, a main subject of the invention is to provide a technology for writing different information depending on an object into an electronic tag.

Solution to Problem

An electronic tag writing system and a method for the same solving the above problems are as follows.
<First Aspect>
An electronic tag writing system including
a writing device that writes write information into an electronic tag, and
an information acquisition section that acquires write information related to an object associated with the electronic tag,
in which the write information acquired by the information acquisition section is written into the electronic tag using the writing device.
(Function and Effect)
In the electronic tag writing system, the write information related to the object associated with the electronic tag is acquired and the writing is performed to the corresponding electronic tag, so that different information can be written into the electronic tag depending on the object. For example, in the case of attaching the electronic tag at a retail store, when the electronic tag is attached to incoming merchandise of different types (sizes, packaging, etc.), quantities, etc. (small quantity and large variety), different information can be written into the electronic tag depending on the object.
<Second Aspect>
The electronic tag writing system according to the first aspect, in which the write information includes at least one of a part or all of primary information acquired from the object and secondary information acquired based on the acquired primary information.
(Function and Effect)
Acquiring the write information from the object by detection, etc. is preferable since the write information can be more accurately and easily prepared.
<Third Aspect>
The electronic tag writing system according to the first or second aspect, further including a tag supply section that successively supplies electronic tags to the writing device.

(Function and Effect)

By including such a tag supply section, the electronic tags into which different information is written depending on the object can be automatically and successively manufactured.

<Fourth Aspect>

The electronic tag writing system according to the first or second aspect, further including a tag supply section that successively supplies electronic tags, and a tag attachment section that attaches the electronic tag supplied from the tag supply section to the object, in which the writing device writes the write information into the electronic tag attached to the object.

(Function and Effect)

In the electronic tag writing system, for example, after the unwritten electronic tag is attached to incoming merchandise of different types (sizes, packaging, etc.), quantities, etc. (small quantity and large variety) at a retail store, write information can be written into the electronic tag. In this case, in addition to performing attaching and writing to the electronic tag for each object, it is possible to attach the electronic tags to all the objects to be processed at one time and then perform writing into the electronic tags attached to the respective objects in order.

<Fifth Aspect>

The electronic tag writing system according to the first or second aspect, in which an electronic tag supply section is not provided, and the write information acquired by the information acquisition section is written into the electronic tag attached to the object using the writing device.

(Function and Effect)

The electronic tag writing system is a system that merely writes write information into the electronic tag without supplying the electronic tag to attach the electronic tag to the object. For example, when a producer attaches the unwritten electronic tag to a product or a container or packaging thereof and ships the product, a retail store may use this system to perform writing into the electronic tag attached to the incoming merchandise.

<Sixth Aspect>

An electronic tag writing method including a step of acquiring write information related to an object associated with an electronic tag, and a step of writing the acquired write information into a corresponding electronic tag.

(Function and Effect)

The same function and effect as those of the first aspect are achieved.

<Seventh Aspect>

The electronic tag writing system according to the second aspect, further including a tag supply section that successively supplies electronic tags having pressure sensitive adhesion sections, and an attachment section that attaches an electronic tag supplied from the tag supply section to an object to be attached, in which the writing device writes write information related to the object into an electronic tag in a process until attachment to the object, the information acquisition section includes an individual information sensor that detects individual information of the object, and write information including at least one of a part or all of the individual information detected by the individual information sensor and related information acquired based on the detected individual information is written into the electronic tag to be attached to the object subjected to detection of the individual information by the writing device.

(Function and Effect)

In the electronic tag writing system, the individual information of the object is detected and write information based on a detection result is written into the electronic tag to be attached to the object subjected to detection of the individual information. Thus, even when the electronic tags are attached to a plurality of types of objects in no particular order, the electronic tags into which appropriate information is automatically written can be attached. For example, in the case of attaching the electronic tag at the retail store, it is possible to attach the electronic tag into which appropriate information is automatically and successively written without an operator being aware of a type of the object for incoming merchandise of different types (sizes, packaging, etc.), quantities, etc. (small quantity and large variety).

<Eighth Aspect>

The electronic tag writing system according the seventh aspect, in which the individual information sensor is at least one of a code reader, an optical character reading device, a color sensor, and a weight sensor.

(Function and Effect)

In the electronic tag writing system, when the individual information sensor is the code reader for a one-dimensional code or the two-dimensional code, the electronic tag into which read information thereof is written can be attached. Therefore, for example, when a retailer attaches such an electronic tag to a product for sale, it is possible to collectively identify a large number of products at once without contact in cash register/inspection/inventory operations and shoplifting prevention using a crime prevention gate. In addition, when the individual information sensor is an optical character reading device, labels such as product size, product color, content amount, manufacturing date, and expiration date attached to the object (usually the product exterior or the product) can be read, and the electronic tag into which read information thereof is written can be attached. Furthermore, when the individual information sensor is a color sensor, the electronic tag into which information related to the color of the object is written can be attached. When the individual information sensor is a weight sensor, the electronic tag into which information related to the weight of the object is written can be attached. Therefore, for example, when the retailer attaches these electronic tags to productions for sale, merchandise management can be performed based on the individual information not included in the one-dimensional code or the two-dimensional code that is usually given.

<Ninth Aspect>

The electronic tag writing system according the seventh or eighth aspect, further including an input device that selects continuous processing of the same object, in which in a case where continuous processing of the same object is selected by the input device, when the electronic tag is attached to a first object, write information including at least one of a part or all of the individual information detected by the individual information sensor and related information acquired based on the detected individual information is written into the electronic tag to be attached to the object subjected to detection of the individual information using the writing device, and when the electronic tag is attached to the same object subsequent to the first object, write information in the first object is written into the electronic tag to be attached to the object subsequent to the first object using the writing device.

(Function and Effect)

According to this device, when the operator selects continuous processing using the input device, it is possible to continuously process a plurality of the same objects while the selection is effective. Thus, when a certain number of objects are processed, writing of the information into the electronic tag and attaching can be efficiently performed. Further, the control becomes simpler when compared to the case of automatically recognizing the product, and there is no risk of erroneous recognition.

<Tenth Aspect>

The electronic tag writing system according to any one of the seventh to ninth aspects, further including a conveyor for conveying the object, in which the attachment section includes a robot that receives the electronic tag supplied from the tag supply section and attaches the electronic tag to the object conveyed on the conveyor, the individual information sensor is provided on an upstream side of an attachable range of the robot in the conveyor, and after causing the robot to receive the electronic tag supplied from the tag supply section, the electronic tag is brought close to the writing device to perform writing, and then attached to the object.

(Function and Effect)

As described above, when the electronic tag is attached to the object, which is being conveyed, by the robot while the object is conveyed by the conveyor, a large number of objects can be continuously processed. In addition, by writing information into the electronic tag immediately before attachment, electronic tags to which information is individually written can be attached to a plurality of types of attachment objects, useless writing can be suppressed, and efficient information writing and attaching can be performed.

<Eleventh Aspect>

The electronic tag writing system according to the tenth aspect, further including a passage sensor that detects passage of the object on an upstream side of the individual information sensor in the conveyor, in which when the individual information is not detected by the individual information sensor until a predetermined time elapses after detecting passage of the object by the passage sensor, at least the conveyor is stopped.

(Function and Effect)

When a position of target individual information (one-dimensional code, etc.) on the object is present on a surface that may not be detected by the individual information sensor, or when there is a large wrinkle on the packaging with the individual information, the individual information sensor may not detect the individual information, and the object is merely conveyed on the conveyor. In this case, it is unknown whether a reading error of the individual information has occurred or a problem has occurred in the control of the robot. On the other hand, as in this aspect, when the individual information is not detected by the individual information sensor until a predetermined time elapses after the passage of the object is detected by the passage sensor disposed on the upstream side of the individual information sensor, it can be determined that a reading error of the individual information sensor has occurred. Therefore, in such a case, at least when the conveyor is stopped, the operation can be restarted without wasting the electronic tag by taking out the object and restarting the device.

<Twelfth Aspect>

The electronic tag writing system according to the tenth or eleventh aspect, further including a temporary attachment section for attaching the electronic tag to be discarded in addition to a conveyance space of the object by the conveyor, in which when the writing error of the electronic tag occurs, the electronic tag received by the robot is attached to the temporary attachment section, and the object, to which the electronic tag has been scheduled to be attached, is discharged from the conveyor without attaching the electronic tag thereto.

(Function and Effect)

As described above, it is one preferable scheme to bring the electronic tag received by the robot close to the writing device by the robot to perform writing. However, in this scheme, when a writing error of the electronic tag occurs, a subsequent process may not be performed until the electronic tag is released. Therefore, as in this aspect, it is preferable that a temporary attachment section is provided, and when an electronic tag writing error occurs, the electronic tag received by the robot is attached to the temporary attachment section, and the object is discharged from the conveyor without attaching the electronic tag thereto.

Note that the term "writing error" means all errors occurring in a process required for writing, and includes an error occurring at the time of actual writing to the memory, and an error occurring during reading, which is necessary before actual writing to the memory. These errors occur, for example, due to a breakdown of hardware such as an IC chip or an antenna, deterioration of communication quality, collision of communication, etc.

<Thirteenth Aspect>

The electronic tag writing system according to any one of the tenth to twelfth aspects, further including an image pickup device that picks up an image of the object conveyed on the conveyor on an upstream side of an attachable range of the robot in the conveyor, in which the individual information sensor is provided on an upstream side of the image pickup device in the conveyor, the electronic tag writing system further includes a storage section in which image information of the object and a designated attachment position on the object are stored in association with each other, imaging information obtained by the image pickup device is compared with the image information of the object stored in the storage section by image recognition, when the object is recognized on the conveyor, a designated attachment position associated with the recognized object is read from the storage section, and a position of the object on the conveyor is detected, and the robot attaches the electronic tag to the designated attachment position on the object conveyed on the conveyor based on the designated attachment position and a position of the object, before reading of the designated attachment position is completed, the robot ends an operation from receiving to writing of the electronic tag, the electronic tag writing system further includes a temporary attachment section for attaching an electronic tag to be discarded other than a conveyance space of the object by the conveyor, and when the designated attachment position is not read until the object passes through the attachable range of the robot after the individual information is detected by the individual information sensor, the electronic tag received by the robot is attached to the temporary attachment section, and an object to which the electronic tag has been scheduled to be attached is discharged from the conveyor without attaching the electronic tag.

(Function and Effect)

In this way, when image recognition is performed using the image pickup device, and the electronic tag received by the robot based on a result is attached to the designated attachment position of the object, it is possible to attach the electronic tag to the designated attachment position of the object even when the operator irregularly puts the object on the conveyor without being aware of a position (including a direction) of the object on the conveyor.

In addition, considering a current speed of the robot and the speeding up of an attachment process as a whole, it is preferable that the electronic tag is delivered to the robot and writing is completed before reading of the designated attachment position is completed.

However, in this case, when a reading error of the designated attachment position occurs due to an image recognition error or since an image of the object and the designated attachment position are not stored in the storage section, the robot may not attach the previously received electronic tag to the object. Moreover, since the electronic tag held by the robot previously completes writing, a subsequent process may not be performed until the electronic tag is released. Therefore, as in this aspect, the temporary attachment section is provided, and when the designated attachment position is not read until the object passes through the attachable range of the robot after the individual information is detected by the individual information sensor, it is presumed that a reading error of the designated attachment position occurs, the electronic tag received by the robot is attached to the temporary attachment section, and the object is discharged from the conveyor without attaching the electronic tag thereto, which is preferable.

<Fourteenth Aspect>

The electronic tag writing system according to any one of the tenth to thirteenth aspects, further including an image pickup device that picks up an image of the object conveyed on the conveyor on an upstream side of an attachable range of the robot in the conveyor, in which the individual information sensor is provided on an upstream side of the image pickup device in the conveyor, the electronic tag writing system further includes a storage section in which image information of the object and a designated attachment position on the object are stored in association with each other, imaging information obtained by the image pickup device is compared with the image information of the object stored in the storage section by image recognition, when the object is recognized on the conveyor, a designated attachment position associated with image information of the object recognized as the same as the recognized object is read from the storage section, and a position of the object on the conveyor is detected, and the robot is caused to attach the electronic tag to the designated attachment position on the object conveyed on the conveyor based on the designated attachment position and a position of the object, the robot is a robot having six or more degrees of freedom including motions in an X-axis direction, a Y-axis direction, a Z-axis direction, and rotation directions around these respective axes, and the designated attachment position includes a side surface of the object.

(Function and Effect)

In this electronic tag writing system, the electronic tag can be attached to the designated attachment position (including the direction) including the side surface of the object using the robot having 6 or more degrees of freedom. Therefore, depending on the object, the electronic tag can be attached to a position where it is unlikely to affect the product or a position where the communication quality is unlikely to deteriorate. In addition, even when the operator irregularly places the object on the conveyor without being aware of a position (including direction) of the object on the conveyor, the electronic tag can be attached to the designated attachment position of the object.

<Fifteenth Aspect>

The electronic tag writing system according to any one of the tenth to fourteenth aspects, in which prior to detecting the individual information of the object by the individual information sensor, the robot is caused to receive the electronic tag from the tag supply section, and the electronic tag is caused to stand by at a writable position by the writing device, and after the individual information of the object is detected by the individual information sensor, writing by the writing device is performed.

(Function and Effect)

In this way, by making the electronic tag stand by at the writable position by the writing device in advance, it is possible to shorten a time from detection of the individual information to writing into the electronic tag. In this way, not only the attaching efficiency as a whole can be improved, but also a conveyance distance from the individual information sensor to the attachment position can be shortened, and the device can be downsized.

<Sixteenth Aspect>

The electronic tag writing system according to any one of the tenth to fifteenth aspects, further including an image pickup device that picks up an image of the object conveyed on the conveyor on an upstream side of an attachable range of the robot in the conveyor, in which the individual information sensor is provided on an upstream side of the image pickup device in the conveyor, the electronic tag writing system further includes a storage section in which image information of the object and a designated attachment position on the object are stored in association with each other, imaging information obtained by the image pickup device is compared with the image information of the object stored object is recognized on the conveyor, a designated attachment position associated with the recognized object is read from the storage section, and a position of the object on the conveyor is detected, and the robot attaches the electronic tag to the designated attachment position on the object conveyed on the conveyor based on the designated attachment position and a position of the object, and the designated attachment position is a position which is on the same surface as a detection surface of the individual information on the object and does not overlap the individual information.

(Function and Effect)

The attachment position of the electronic tag may be determined as appropriate. However, when the attachment position is set to the position which is on the same surface as the detection surface of the individual information on the object and does not overlap the individual information, the individual information is not hidden by the electronic tag after the electronic tag is attached, and thus it becomes easy to compare and confirm stored content of the electronic tag with the individual information of the object.

<Seventeenth Aspect>

The electronic tag writing system according to any one of the seventh to sixteenth aspects, further including a first conveyor that conveys the object and a second conveyor connected to a downstream side of the first conveyor with a gap therebetween to receive and convey the object sent out from the first conveyor, in which the attachment section has a robot that receives the electronic tag supplied from the tag supply section and attaches the electronic tag to the object conveyed on the second conveyor, and the individual information sensor includes a lower sensor that detects the individual information of the object from below the object through the gap between the first conveyor and the second conveyor, and an upper sensor that detects the individual information of the object from above the object on an upstream side of an attachable range of the robot.

(Function and Effect)

As described above, when the electronic tag is attached to the object, which is being conveyed, by the robot while the object is conveyed by the first conveyor and the second conveyor, a large number of objects can be continuously processed. In addition, not only the conveyor is divided into the first conveyor and the second conveyor, but also the individual information of the object can be detected from above and below by utilizing a gap of a delivery part. Thus, it is possible to continuously process a plurality of types of attachment objects in which positions of the individual information of the detection target are different from each other in a vertical direction without being aware of the vertical direction.

<Eighteenth Aspect>

The electronic tag writing system according to any one of the seventh to seventeenth aspects, further including a conveyor that conveys the object, in which the attachment section has a robot that receives the electronic tag supplied from the tag supply section and attaches the electronic tag to the object conveyed on the conveyor, the individual information sensor is provided on an upstream side of an attachable range of the robot in the conveyor, the tag supply section has an electronic tag sheet including a continuous belt shaped release sheet and an electronic tag repeatedly attached at a predetermined interval in a continuous direction, and a delivery section that transfers the electronic tag sheet in the continuous direction, peels off the electronic tag in order from a downstream side in a transfer direction, and delivers the electronic tag to the robot, the delivery section includes a folding guide that guides the release sheet so that the release sheet is folded back to an opposite side from a side having the electronic tag, an end effector of the robot is a sucking section that holds the electronic tag by suction, the robot sucks the electronic tag on the release sheet by the sucking section, peels off the electronic tag from the release sheet by movement of the sucking section, and then attaches the electronic tag to the object, and after causing the sucking section to suck the electronic tag on the release sheet on a front side of a folding start position of the release sheet in the delivery section, the sucking section is moved together with the release sheet while sucking the electronic tag up to the folding start position, and moved at the same speed as that of the release sheet in a tangential direction of a moving direction of the release sheet while sucking the electronic tag after the folding start position, thereby delivering the electronic tag peeled off from the release sheet by folding back the release sheet to the sucking section.

(Function and Effect)

Since the electronic tag having a pressure sensitive adhesion section is sold as an electronic tag sheet including the continuous belt shaped release sheet and the electronic tag repeatedly attached at the predetermined interval in the continuous direction, it is preferable that the electronic tag supply section transfers the electronic tag sheet in the continuous direction, peels off the electronic tag in order from the downstream side in the transfer direction, and delivers the electronic tag to the robot. Further, when the robot holds the electronic tag having the pressure sensitive adhesion section as described above, it is desirable that the end effector of the robot is used as the sucking section and a surface opposite to the pressure sensitive adhesion section is sucked.

However, in order to reliably deliver the electronic tag attached on the release sheet to the sucking section of the robot, a strong sucking force or a mechanism for assisting peeling is required. Further, when a sucking position of the electronic tag is shifted during delivery of the electronic tag with respect to the sucking section of the robot, attaching to an attachment position intended by the robot may not be performed.

On the other hand, in this aspect, the sucking section of the robot is moved in the tangential direction of the moving direction of the release sheet at the same speed as that of the release sheet while sucking the electronic tag after the folding start position of the release sheet. In this way, mainly using a peeling force acting on the electronic tag by folding back the release sheet and hardly using a force due to the sucking section peeling off from the release sheet, the electronic tag can be held by the sucking section and peeled off from the release sheet. Therefore, it is possible to reliably deliver the electronic tag with a smaller sucking force even though the mechanism is significantly simple, and the attachment position of the electronic tag is less likely to shift.

<Nineteenth Aspect>

The electronic tag writing method according to the sixth aspect, further including a step of successively supplying electronic tags having pressure sensitive adhesion sections, a step of attaching the supplied electronic tags to the object to be attached, a step of detecting individual information of the object by an individual information sensor, and acquiring write information including at least one of a part or all of the detected individual information and related information acquired based on the detected individual information, and a step of writing the write information into the electronic tag to be attached to the object subjected detection of the individual information.

(Function and Effect)

The same function and effect as those of the seventh aspect are achieved.

<Twentieth Aspect>

The electronic tag writing system according to the second aspect, further including a tag supply section that successively supplies electronic tags having pressure sensitive adhesion sections, a conveyor that conveys an object to which the electronic tag is attached, and a robot that receives the electronic tag supplied from tag supply section and attaches the electronic tag to the object conveyed on the conveyor, in which the writing device writes write information related to the object into an electronic tag in a process until attachment to the object, and the information acquisition section reads write information related to the object conveyed on the conveyor from a storage section in which identification information of the object and write information related to the object are stored in association with each other.

(Function and Effect)

In this electronic tag writing system, writing is performed into the electronic tag in the process until attachment to the object in the device, and thus it is possible to attach electronic tags into which information is individually written to a plurality of types of objects. For example, in the case of attaching the electronic tag at the retail store, incoming merchandise of different types (sizes, packaging, etc.), quantities, etc. (small quantity and large variety) can be successively placed on the conveyor by the operator, and the electronic tag into which information is individually written can be attached.

<Twenty-First Aspect>

The electronic tag writing system according to the twentieth aspect, further including an individual information sensor provided on an upstream side of an attachable range of the robot in the conveyor to optically read identification information displayed on an appearance of the object conveyed on the conveyor, in which when the identification information is read by the individual information sensor, write information corresponding to the identification information is read from the storage section and written into an electronic tag in a process until attachment to the object by the writing device.

(Function and Effect)

In this electronic tag writing system, the objects is successively and automatically recognized based on an optical reading result of the individual information sensor, and the corresponding write information associated in advance is written into the electronic tag. Thus, even when a plurality of types of objects are placed on the conveyor in random order and in random intervals, it is possible to attach the electronic tag into which appropriate information is automatically written. For example, in the case of attaching the electronic tag at the retail store, it is possible to attach the electronic tag into which information is individually written to the product merely by successively placing incoming merchandise of different types (sizes, packaging, etc.), quantities, etc. (small quantity and large variety) on the conveyor without the operator being aware of the order or intervals.

<Twenty-Second Aspect>

The electronic tag writing system according to the twentieth aspect, further including an input device that selects the object stored in the storage section, in which write information related to the object selected by the input device is read from the storage section, and the write information is successively written into the electronic tag without changing the write information until a new object is selected by the input device.

(Function and Effect)

According to this device, when the operator selects the object using the input device, it is possible to continuously process a plurality of the same objects. Thus, when a certain number of objects are processed, writing of the information into the electronic tag and attaching can be sufficiently efficiently performed. Further, the control becomes simpler when compared to the case of automatically recognizing the product, and there is no risk of erroneous recognition.

<Twenty-Third Aspect>

The electronic tag writing system according to any one of the twentieth to twenty-second aspects, in which after causing the robot to receive the electronic tag supplied from the tag supply section, the electronic tag is brought close to the writing device to perform writing, and then attached to the object.

(Function and Effect)

In this way, by writing information into the electronic tag immediately before attachment, useless writing can be suppressed, and efficient information writing and attaching can be performed.

<Twenty-Fourth Aspect>

The electronic tag writing system according to any one of the twentieth to twenty-third aspects, in which the robot is a robot having four or more degrees of freedom including motions in an X-axis direction, a Y-axis direction, a Z-axis direction, and a rotation direction around a Z-axis, the electronic tag writing system further includes an image pickup device that captures an image of the object conveyed on the conveyor provided on an upstream side of an attachable range of the robot in the conveyor, the storage section stores the identification information, write information related to the object corresponding to the identification information, and a designated attachment position on the object corresponding to the identification information in association with one another, a position of the object is detected based on imaging information obtained by the image pickup device, write information related to the object is read from the storage section, writing into the electronic tag is performed, a designated attachment position on the object is read, and the robot attaches the electronic tag to the designated attachment position on the object conveyed on the conveyor based on the designated attachment position and the position of the object, the tag supply section includes a conveyor having an endless moving section folded back at an end point to return to a start point, and an electronic tag sending section that supplies the electronic tag to the conveyor and attaches the pressure sensitive adhesion section to the moving section, an end effector of the robot is a sucking section that holds the electronic tag by suction, the robot sucks the electronic tag attached to the moving section by the sucking section, peels off the electronic tag from the moving section by movement of the sucking section, and then attaches the electronic tag to the object, and after causing the sucking section to suck the electronic tag attached to the moving section on a front side of a folding start position of the moving section at an end point of the conveyor, the sucking section is moved together with the moving section while sucking the electronic tag up to the folding start position, and moved at the same speed as that of the moving section in a tangential direction of a moving direction of the moving section while sucking the electronic tag after the folding start position, thereby delivering the electronic tag peeled off from the moving section by folding back the moving section to the sucking section.

(Function and Effect)

In this electronic tag writing system, it is possible to attach the electronic tag to the designated attachment position (including the direction) using the robot having four or more degrees of freedom. Therefore, depending on the object, the electronic tag can be attached to a position where it is unlikely to affect the product or a position where the communication quality is unlikely to deteriorate. In addition, even when the operator irregularly places the object on the conveyor without being aware of a position (including direction) of the object on the conveyor, the electronic tag can be attached to the designated attachment position of the object.

In addition, when the robot holds the electronic tag having the pressure sensitive adhesion section, it is desirable that the end effector of the robot is used as the sucking section and a surface opposite to the pressure sensitive adhesion section is sucked. In this case, in order to move the electronic tag to within a receiving range of the robot, it is preferable that the tag supply section attaches the electronic tag having the pressure sensitive adhesion section to the moving section of the conveyor and conveys the electronic tag as in this aspect.

However, in order to reliably deliver the electronic tag attached on the moving section of the conveyor to the sucking section of the robot, a strong sucking force or a mechanism for assisting peeling is required. Further, when a sucking position of the electronic tag is shifted during delivery of the electronic tag with respect to the sucking section of the robot, attaching to the designated attachment position may not be performed.

On the other hand, in this aspect, the sucking section of the robot is moved in the tangential direction of the moving direction of the moving section of the conveyor at the same speed as that of the moving section while sucking the electronic tag after the folding start position of the moving section. In this way, mainly using a peeling force acting on the electronic tag by folding back the moving section and hardly using a force due to the sucking section peeling off from the moving section, the electronic tag can be held by the sucking section and peeled off from the moving section. Therefore, it is possible to reliably deliver the electronic tag with a smaller sucking force even though the mechanism is significantly simple, and the attachment position of the electronic tag is less likely to shift.

<Twenty-Fifth Aspect>

The electronic tag writing method according to the sixth aspect, further including a step of conveying the object to which the electronic tag is attached by a conveyor, a step of receiving an electronic tag having a pressure sensitive adhesion section and attaching the electronic tag to the object conveyed on the conveyor by a robot, a step of reading write information related to the object conveyed on the conveyor from a storage section in which identification information of the object and write information related to the object are stored in association with each other, and a step of writing the read write information related to the object to an electronic tag in a process until attachment to the object.

(Function and Effect)

The same function and effect as those of the twentieth aspect are achieved.

Advantage Effects of Invention

The invention is advantageous in that it is possible to write different information into an electronic tag depending on the object.

BRIEF DESCRIPTION OF DRAWINGS

FIG. 1 is a schematic diagram of an electronic tag writing system.

FIG. 2 is a schematic diagram of the electronic tag writing system.

FIG. 3 is a schematic diagram of the electronic tag writing system.

FIG. 4 is a schematic diagram of the electronic tag writing system.

FIG. 5 is a schematic diagram of the electronic tag writing system.

FIG. 6 is a schematic diagram of the electronic tag writing system.

FIG. 7 is a schematic diagram of the electronic tag writing system.

FIG. 8 is a configuration diagram of a control section.

FIG. 9 illustrates an example of the electronic tag, in which FIG. 9(a) is a plan view, FIG. 9(b) is a side view, FIG. 9(c) is a bottom view, FIG. 9(d) is a plan view, FIG. 9(e) is a side view, and FIG. 9(f) is a bottom view.

FIG. 10 is a perspective view illustrating an object to which the electronic tag is attached.

FIG. 11 is a front view schematically illustrating the electronic tag writing system.

FIG. 12 is a side view schematically illustrating the electronic tag writing system.

FIG. 13 is a front view illustrating an example of a tag supply section.

FIG. 14 is a front view illustrating a delivery section of the electronic tag.

FIG. 15 is a front view schematically illustrating a main part of the electronic tag writing system.

FIG. 16 is a front view schematically illustrating the main part of the electronic tag writing system.

FIG. 17 is a front view schematically illustrating the main part of the electronic tag writing system.

FIG. 18 is a front view schematically illustrating the main part of the electronic tag writing system.

FIG. 19 is a front view schematically illustrating the main part of the electronic tag writing system.

FIG. 20 is a side view schematically illustrating the electronic tag writing system.

FIG. 21 is a side view schematically illustrating the electronic tag writing system.

FIG. 22 is a front view schematically illustrating an example of the tag supply section.

FIG. 23 is a front view schematically illustrating the main part of the electronic tag writing system.

FIG. 25 is a front view illustrating an example of the tag supply section.

FIG. 26 is a plan view illustrating a main part of the tag supply section.

FIG. 27 is a perspective view illustrating a main part of the tag supply section.

FIG. 28 is a plan view illustrating a change in the electronic tag in the tag supply section.

FIG. 29 is a side view illustrating a change in the electronic tag.

FIG. 30 is a plan view illustrating a change in the electronic tag in the tag supply section.

FIG. 31 is a plan view illustrating a change in the electronic tag in the tag supply section.

FIG. 32 illustrates an example of the electronic tag, in which FIG. 32(a) is a plan view, FIG. 32(b) is a side view, and FIG. 32(c) is a bottom view.

FIG. 33 illustrates an example of the electronic tag after being bent, in which FIG. 33(a) is a plan view, FIG. 33(b) is a side view, and FIG. 33(c) is a bottom view.

FIG. 34 is a perspective view illustrating an object to which the electronic tag is attached.

FIG. 35 is a front view illustrating the delivery section of the electronic tag.

FIG. 36 is a perspective view illustrating the delivery section of the electronic tag.

FIG. 37 is a front view schematically illustrating the electronic tag writing system.

FIG. 38 is a side view schematically illustrating the electronic tag writing system.

FIG. 39(a) is a side view illustrating reception of the electronic tag, FIG. 39(b) is a side view illustrating writing of information, and FIG. 39(c) is a side view illustrating attachment to an object.

FIG. 40 is a side view schematically illustrating an attaching device for the electronic tag.

FIG. 41 is a side view schematically illustrating the attaching device for the electronic tag.

FIG. 42 is a side view schematically illustrating the attaching device for the electronic tag.

FIG. 43 is a side view schematically illustrating the attaching device for the electronic tag.

DESCRIPTION OF EMBODIMENTS

<Basic Matters>

Figure 24:
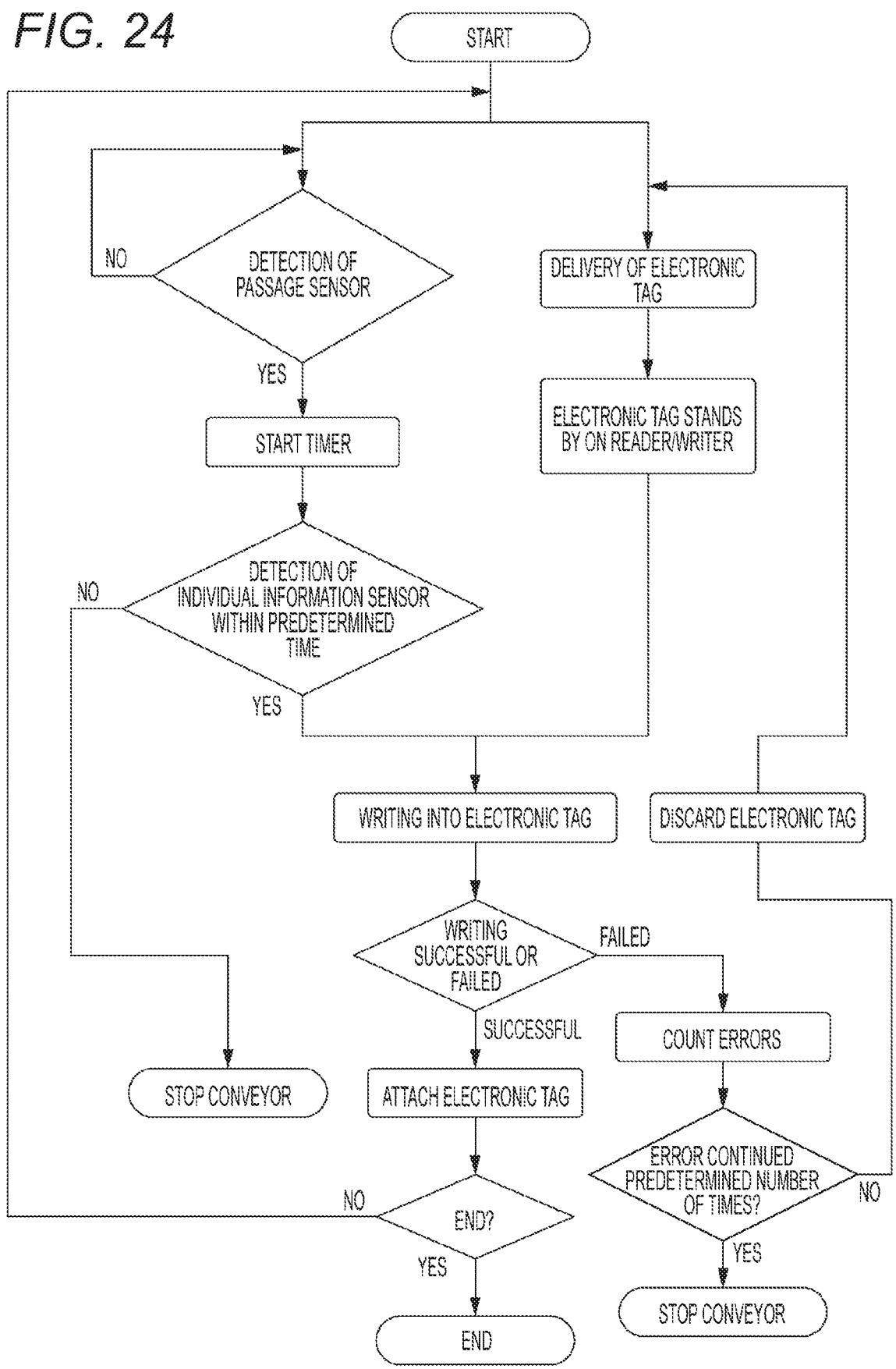
FIG. 24 is a flowchart illustrating an example of control.

FIGS. 1 to 7 illustrate a typical example of an electronic tag writing system 1. The electronic tag writing system 1 includes a writing device 60 that writes write information into an electronic tag 10, an information acquisition section 70 that acquires write information related to an object 50 associated with the electronic tag 10, and a control section 90 that writes the write information acquired by the information acquisition section 70 into the corresponding electronic tag 10 using the writing device 60.

Therefore, in the electronic tag writing system 1, the write information related to the object 50 associated with the electronic tag 10 is acquired and the writing is performed to the corresponding electronic tag 10, so that different information can be written into the electronic tag 10 depending on the object 50. For example, in the case of attaching the electronic tag 10 at a retail store, when the electronic tag 10 is attached to incoming merchandise of different types (sizes, packaging, etc.), quantities, etc. (small quantity and large variety), different information can be written into the electronic tag 10 depending on the object 50.

(Control Section)

In order to operate the system, the control section 90 communicates with constituent elements of the system while inputting/outputting information and performing calculations as necessary, and controls each constituent element. Therefore, the control section may include an input/output device, an arithmetic device, a communication device, a storage device, etc. Such a control section 90 can be composed of a known industrial control device such as a sequencer (PLC) or a computer (PC, microcontroller) alone, or a combination of a plurality of known industrial control devices according to a function, etc. For example, in the case of an application example described later, the basic control and interface of a conveyor, a sensor, a robot, etc. can be implemented by a sequencer, and information processing and a command to the sequencer based thereon (mode setting, parameter setting, operation start instruction, etc.) can be implemented by a computer.

As illustrated in FIG. 8, the control section 90 may include an input device 81 for input by an operator, and perform various operations of the system (information acquisition, writing, etc.) in response to the input. The input device 81 may be a keyboard, a mouse, or a dedicated switch. It is preferable to provide a display device 82 for displaying a graphical user interface such as a button for executing a process so that the operator can select the process. In this case, it is particularly preferable that a touch panel in which the input device 81 and the display device 82 are integrated is provided, and process selection input is performed by touching the button, etc. displayed on the display device 82 for executing continuous processing. In addition, although not illustrated, a mobile terminal such as a smartphone having the display device 82 and the input device 81 may be connectable to the control section 90 by a network, short-range wireless communication, or wired communication, and the display device 82 and the input device 81 of the mobile terminal may be used to select a process.

(Electronic Tag)

The electronic tag 10 is not particularly limited in shape and structure as long as the electronic tag 10 is attached to an object, and a known electronic tag 10 can be used as appropriate. For example, the electronic tag 10 may be a tag externally added to an object such as a price tag or a luggage tag, or may be a tag built in a container, a lid, a packaging box, or a conveyance cardboard box for the object. The electronic tag 10 externally added to the object may be fixed or connected to the object by a pressure sensitive adhesion surface, a string, a tag pin, etc. However, as long as the electronic tag 10 is processed (handled) with the object, the electronic tag 10 may not be fixed or connected to the object and may be freely movable.

For example, in general, a shape of the electronic tag 10 of the type having the pressure sensitive adhesion surface is a rectangular shape having rounded corners as in the example illustrated in FIGS. 9(a) to 9(c) or the example illustrated in FIGS. 33(a) to 33(c). However, the invention is not limited thereto. In addition, for example, as illustrated in FIG. 9(c) and FIG. 33(c), a typical one of the electronic tag 10 is a passive type electronic tag 10 having an IC chip 10i and an antenna 10a connected thereto as inlets 10a and 10i. However, the invention is not limited thereto.

In the electronic tag 10, it is desirable that at least a part of the antenna 10a is separated from an attachment object 50 in order to prevent deterioration of communication quality. Therefore, in the case of the electronic tag 10 having the pressure sensitive adhesion surface 11, as illustrated in FIGS. 33(a) to 33(c), a part including the antenna 10a of the electronic tag 10 can be folded at a folding position 10p to form a non-pressure sensitive adhesion part 12 in which parts of the pressure sensitive adhesion surface 11 stuck together and a remaining pressure sensitive adhesion part 13 in which the pressure sensitive adhesion surface 11 is exposed, and the electronic tag 10 can be attached to the object 50 using the pressure sensitive adhesion surface 11 of the remaining pressure sensitive adhesion part 13 as illustrated in FIG. 34. In this case, it is not preferable to perform folding at a position passing through the inlets 10a and 10i. Therefore, in such an electronic tag 10, it is desirable to provide the folding position 10p between a portion which is adjacent to a portion having the inlets 10a and 10i and overlaps at least a part of the antenna 10a when the folding position 10p is folded back to the inlets 10a and 10i and the portion having the inlets 10a and 10i. For example, in the case of the rectangular electronic tag 10 in the illustrated example, a folded part 10F not having the inlets 10a and 10i can be provided at one end in a longitudinal direction, the inlets 10a and 10i can be provided on the opposite side, and a boundary therebetween can be used as the folding position 10p.

Such folding of the electronic tag 10 may be performed by a folding device provided in the tag supply section 20 when the tag supply section 20 is provided as described later (for example, see Patent Literature 5), or the electronic tag 10 partially folded in advance may be supplied to the electronic tag writing system 1.

(Write Information)

The write information for the electronic tag 10 is information related to the object 50 associated with the electronic tag 10 and includes different information depending on the object 50. As long as this description is applied, even though the write information is not particularly limited, it is preferable to include a part or all of individual information 51 of the object 50. In addition to identification information for identifying the object 50 from other objects, the individual information 51 includes attribute information indicating a characteristic, a property, etc. of the object 50 even though attribute information may not identify the object 50 from other objects. Examples of the identification information may include a product code, a serial number, a product number, a lot number, etc. In addition, examples of the attribute information may include shipping order, manufacturing date, expiration date, trademark such as product name, color of product or packaging, and product weight. In addition, the write information may include additional information other than the identification information and the attribute information. Examples of the additional information may include time information such as time required for manufacturing, temperature information such as temperature during manufacturing, humidity information such as humidity during manufacturing, random number information related to fortune-telling and lottery misses, etc.

The individual information 51 and the attribute information of the object 50 are preferably information added to the object 50 by printing, etc. as a one-dimensional code or a two-dimensional code, or as a character, a picture, etc. as illustrated in FIG. 10 since the information can be easily obtained from the object 50. However, the information is not limited thereto.

(Information Acquisition Section)

The information acquisition section 70 can use a part or all of the write information as primary information that can be acquired from the object 50. In this way, preparation of the write information becomes more accurate and easier. For example, the information acquisition section 70 can include an individual information sensor 71 that detects the individual information 51 from the object 50.

The individual information sensor 71 is not particularly limited as long as the individual information sensor 71 can detect the individual information 51 from the object 50. For example, the individual information sensor 71 can be at least one of a code reader, an optical character reading device, a color sensor, a weight sensor, a magnetic sensor, a voice recognition sensor, etc. When the individual information sensor 71 is the code reader for the one-dimensional code or the two-dimensional code, the electronic tag 10 into which read information thereof is written can be attached to the object 50. Therefore, for example, when a retailer attaches such an electronic tag 10 to a product for sale, it is possible to collectively identify a large number of products at once without contact in cash register/inspection/inventory operations and shoplifting prevention using a crime prevention gate. In addition, when the individual information sensor 71 is an optical character reading device, labels such as product size, product color, content amount, manufacturing date, and expiration date attached to the object 50 (usually the product exterior or the product) can be read, and the electronic tag 10 into which read information thereof is written can be attached to the object 50. Furthermore, when the individual information sensor 71 is a color sensor, the electronic tag 10 into which information related to the color of the object 50 is written can be attached to the object 50. When the individual information sensor 71 is a weight sensor, the electronic tag 10 into which information related to the weight of the object 50 is written can be attached to the object 50. Therefore, for example, when the retailer attaches these electronic tags 10 to productions for sale, merchandise management can be performed based on the individual information 51 not included in the one-dimensional code or the two-dimensional code that is usually given.

When the individual information sensor 71 is a magnetic sensor, magnetic recording information of an object having a magnetic stripe such as a ticket, a check (MICR), a passbook, or a credit card can be read, and the electronic tag 10 into which read information thereof is written can be attached to the object 50.

When the individual information sensor 71 is a voice recognition sensor including a microphone and a voice recognition system, the operator can recognize the individual information of the object by visually recognizing the individual information and uttering the individual information, and the electronic tag 10 into which recognition information thereof is written can be attached to the object 50.

A detection target by the individual information sensor 71 preferably includes at least the identification information, and more preferably includes both the identification information and the attribute information.

The code reader, the optical character reading device, and the color sensor are preferably realized using an image sensor such as a CCD image sensor or a CMOS image sensor. In a method using the image sensor, a wide range can be detected, and the device can be utilized as a multipurpose reader for detecting a plurality of types of detection targets. That is, in this case, it is possible to detect a one-dimensional code or a two-dimensional code, a character, and a color using one sensor without providing a sensor for each detection target. Naturally, the individual information sensor 71 is not limited to the image sensor, and for example, in the case of the code reader, various well-known sensors such as a laser scan system can be used.

It is preferable to install the individual information sensor 71 on a conveyor used in a process of production and physical distribution of the object 50, or add a conveyor equipped with the individual information sensor 71, and detect the individual information 51 from the object 50 being conveyed by the conveyor.

The individual information sensor 71 may be a handy type device (handy type code reader, etc.), and when the object 50 is loaded, unloaded, or displayed, the operator can hold the device with a hand and hold the device over the object 50 to successively detect individual information 51 of a plurality of objects 50. Alternatively, the individual information sensor 71 may be set to a stationary type device, and when the object 50 is loaded, unloaded, or displayed, the operator can hold the object 50 with a hand and hold the object 50 over the stationary type individual information sensor 71 to successively detect individual information 51 of a plurality of objects 50.

When the information acquisition section 70 includes the individual information sensor 71, the information acquisition section 70 can include a computer (PC, microcontroller, tablet terminal, or smartphone) including the individual information sensor 71 such as a digital camera or a microphone.

(Storage Section)

The information acquisition section 70 can read all the write information from the storage section 80 in which the write information, etc. is stored, instead of acquiring all the write information from the object 50. Further, the information acquisition section 70 can acquire a part of the write information from the object 50 and read the rest from the storage section 80.

The storage section 80 may be a storage device such as a hard disk or SSD built in or attached to the control section 90, or may be a network access storage, a cloud storage, a storage server, or a database server connected via a local network or the Internet. The storage section 80 may be a storage section 80 such as a physical distribution system such as a POS system or a production management system, or may include information duplicated from information in the storage section 80 of the separate system or information obtained by applying a change or addition to the information. In this case, in a process of production and physical distribution of the object 50, a processing order of the object 50 in the process and write information of each object 50 are stored in the storage section 80. In addition, in the process of production and physical distribution of the object 50, based on at least one of a part or all of primary information acquired by the individual information sensor 71 and secondary information acquired based on the acquired primary information, a processing order of the object 50 in the process and write information of each object 50 can be stored in the storage section 80.

When there is a plurality of types of stored information, the storage section 80 may be provided for each type, or a single storage section 80 that stores all the stored information may be provided. For example, in the case of an application example described later, it is presumed that the write information and attachment position information are stored in the single storage section 80 in the illustrated example. However, the invention is not limited thereto.

When the information acquisition section 70 reads the write information from the storage section 80, the information acquisition section 70 can include a computer (PC, microcontroller, tablet terminal, or smartphone), and can include an input device such as a mouse, a keyboard, or a touch panel (that is, the same as the control section 90).

The storage section 80 may store identification information of the object 50 and write information associated with the identification information, and the information acquisition section 70 may read the write information from the storage section 80 based on the identification information read by the individual information sensor 71, or based on the identification information input by the input device 81 such as a mouse, a keyboard, or a touch panel. That is, the write information may include secondary information acquired based on the primary information acquired from the object 50. For example, in the case of the electronic tag 10 attached to a product, the identification information such as the one-dimensional code described above may be detected by the individual information sensor 71, and the control section 90 may acquire the attribute information from the storage section 80 in which the identification information and the attribute information such as the product name and the expiration date are stored in association with each other based on a detection result thereof, and write only the acquired attribute information or the identification information together with the acquired attribute information as write information into the electronic tag 10.

In addition, when the information acquisition section 70 reads the write information from the storage section 80, the information acquisition section 70 may select one or a plurality of pieces of write information from the storage section 80 using the input device, etc., and read the write information one by one or continuously.

In particular, in a case where write information is read continuously, when the write information and the processing order of the object 50 are stored in the storage section 80 in association with each other, the information acquisition section 70 can read the write information associated with the processing order from the storage section 80 according to the processing order, and write the read write information into the electronic tag 10 using the writing device 60.

(Writing Device)

The writing device 60 is a device capable of performing writing into the electronic tag 10 (so-called reader/writer), and an installation position, etc. can be appropriately determined. For example, in the case of writing into the electronic tag 10 from a certain distance, the writing device 60 may be fixedly installed on a moving path of the electronic tag 10 to successively perform writing into the electronic tag 10 that is moving or temporarily stopped. In this case, the electronic tag 10 may be after attached to the object 50 or before attached to the object 50. In the former case, for example, the writing device 60 can be installed on a conveyor that conveys the object 50, and in the latter case, the writing device 60 can be installed, for example, on the tag supply section 20.

In the case of performing writing with the writing device 60 brought close to the electronic tag 10, the writing device 60 may be set to a handy type device (handy type code reader, etc.), and when the object 50 is loaded, unloaded, or displayed, the operator can hold the device with a hand and hold the device over the electronic tag 10, so that writing can be successively performed into a plurality of electronic tags 10. It is possible to attach the writing device 60 to a robot 40 and control the robot 40 to bring the writing device 60 close to the electronic tag 10, thereby performing writing.

Alternatively, the writing device 60 may be a stationary type device, and when the object 50 is loaded, unloaded, or displayed, the operator can hold the object 50 with a hand and hold the object 50 over the stationary type writing device 60 to successively perform writing into a plurality of electronic tags 10.

For a writing process using the writing device 60, a known method can be adopted without particular limitation.

Depending on the installation position of the writing device 60, an unwritten electronic tag 10 that is a subsequent writing target may be located near an electronic tag 10 that is a writing target. For example, in the case of the example illustrated in FIG. 11 and FIG. 12 described later, since a position of the writing device 60 and a delivery position of the electronic tag 10 of the tag supply section 20 are close to each other, when the tag supply section 20 prepares a subsequent electronic tag 10 at a deliverable position at the time of writing by the writing device 60, there is concern that a so-called collision (in an electromagnetic field of one writing device 60, communication by two or more electronic tags 10 occurs at the same time, resulting in an error or loss of communication content) occurs, or writing is performed into the electronic tag 10 that is not a writing target. A reason therefor is that a plurality of electronic tags 10 is present within a communicable range of the writing device 60. Therefore, as illustrated in FIGS. 11 and 12, it is preferable to that a shield 61 (mask) for shielding at least between the writing device 60 and the electronic tag 10 that is not the writing target is provided to limit a communication direction of the writing device 60 to a predetermined writing position (on the writing device 60 in the illustrated example). The shield 61 can be formed using a material such as a metal plate that shields radio waves, and a shape thereof is not particularly limited. For example, the shield 61 may be formed in a plate or foil having a hole between the writing device 60 and the predetermined writing position and having no holes around the predetermined writing position.

(Tag Attachment Section)

A tag attachment section can be provided to attach the electronic tag 10 to the object 50 in the electronic tag writing system 1. In the case of the electronic tag 10 having the pressure sensitive adhesion surface 11, the tag attachment section may employ a robot 40 of an application example described later or other known attaching device (labeler). The tag attachment section may be a handy type attaching device (handy labeler) for attaching the electronic tag 10 by being held in a hand of the operator against the object 50. In the case of the electronic tag 10 not having the pressure sensitive adhesion surface 11, the tag attachment section may be a tagging device that attaches the electronic tag 10 to the object 50 such as clothing through a string, a tag pin, etc. or an inserting device that inserts the electronic tag 10 into a packaging box of the product.

(Robot)

It is sufficient that the robot 40 has at least two degrees of freedom allowing movement in a horizontal and movement in a vertical direction. However, to cope with a case where the position of the object 50 on the conveyor 30 is irregular, etc., the robot 40 suitably has four or more degrees of freedom to allow movement in an X-axis direction, a Y-axis direction, a Z-axis direction, and a rotation direction around the Z-axis. In this way, as illustrated in FIGS. 10(*a*) and 10(*c*), the electronic tag 10 can be attached to an upper surface of the object 50 in all directions. Further, when the robot 40 having six or more degrees of freedom is used, the electronic tag 10 can be attached not only to the upper surface of the object 50 but also to a side surface thereof as illustrated in FIG. 10(*b*). Therefore, depending on the object 50, the electronic tag 10 can be attached to a position where it is unlikely to affect the product or a position where the communication quality is unlikely to deteriorate. As the robot 40, not only a parallel link robot as illustrated in the drawing but also a known industrial robot such as a vertical multi-joint robot, a horizontal multi-joint robot, or an orthogonal robot can be used.

(Tag Supply Section)

The tag supply section 20 can be provided to supply the electronic tag 10 in the electronic tag writing system 1. The tag supply section 20 successively supplies the electronic tag 10 to the writing device 60 or the tag attachment section. In this case, any known supply mechanism (for example, those described in Patent Literatures 1 to 5) can be adopted. For example, in the case of supplying the electronic tag 10 having the pressure sensitive adhesion surface 11, it is possible to use the tag supply section 20 that successively peels and supplies the electronic tag 10 from a belt shaped release sheet 16 to which the electronic tag 10 is repeatedly attached. For example, in the case of supplying the electronic tag 10 not having the pressure sensitive adhesion surface 11, it is possible to use the tag supply section 20 that successively forms and supplies the electronic tag 10 by cutting or punching a belt shaped material in which unit parts corresponding to the electronic tag 10 are repeated at a boundary between the respective unit parts. The tag supply section 20 may be built in a device of the tag attachment section.

(Device Configuration)

In the electronic tag writing system 1, all of the constituent elements may be integrated as one device, or a plurality of devices each including one or more constituent elements may be combined. In particular, some or all of constituent elements such as the information acquisition section 70, the control section 90, and the storage section 80 that can be constructed as a combination of hardware or software on one device are preferably constructed on one device. In addition, some or all of the constituent elements may be allowed to perform wired or wireless one-way or two-way communication (including those not via a network and those via a network) in order to work together as a system. Further, some of the constituent elements may operate independently of other constituent elements.

The electronic tag writing system 1 may be a single handy type device as a whole, or a stationary type device that can be installed on a desk or a register of a retail store. Further, the electronic tag writing system 1 may be a larger device including the conveyor and the robot 40 as in the application example described later. In addition, in a case where the electronic tag writing system 1 includes a plurality of devices, each of the devices may be a single handy type device, a stationary type device that can be installed on a desk or a register of a retail store, or a device having a larger size.

Hereinafter, specific examples of the device configuration, etc. will be described.

First Example

FIG. 1 illustrates a first example of the electronic tag writing system 1. This example includes the writing device 60, the tag supply section 20 that supplies the electronic tag 10 to the writing device 60, and the information acquisition section 70, and writes the write information acquired by the information acquisition section 70 into the electronic tag 10 supplied from the tag supply section 20 using the writing device 60. Therefore, in the system of this example, the electronic tags 10 into which different information is written depending on the object 50 can be automatically and successively manufactured.

In the first example, the information acquisition section 70 may be any of the ones described above. However, the example illustrated in FIG. 1(*a*) includes the individual information sensor 71, and writes write information including the individual information 51 detected by the individual information sensor 71 into the electronic tag 10. On the other hand, the information acquisition section 70 of the example illustrated in FIG. 1(*b*) reads the write information from the storage section 80. The example illustrated in FIG. 1(*c*) combines both information acquisition sections 70, and writes the individual information 51 detected by the individual information sensor 71 and the secondary information read from the storage section 80 based on the individual information 51 into the electronic tag 10 as write information.

In the first example, the electronic tag 10 is externally added to the object 50. Therefore, as in the application example, etc. described later, it is preferable to have the tag attachment section for attaching the electronic tag 10 into which writing is finished by the writing device 60 to the object 50. However, the operator may manually attach the electronic tag 10 to the object 50. Note that attaching mentioned herein includes fixing or connecting to the object 50 and simply inserting into a package of the object 50.

For example, as in the examples illustrated in FIGS. 1(*a*) and 1(*c*), the whole system of the first example can be set to a single stationary type device E0. In this case, writing into the electronic tag 10 can be automatically performed according to the input to the device E0 or each time the write information is acquired by the information acquisition section 70.

In addition, as in the example illustrated in FIG. 1(*b*), a section other than the storage section 80 can be set to a stationary type first device E1, the storage section 80 can be set to a second device E2, and the information acquisition section 70 corresponding to the first device E1 performs reading from the storage section 80 corresponding to the second device E2. In this case, in response to a processing start input to the second device E2, the information acquisition section 70 can successively acquire write information and perform writing into the electronic tag 10.

In these examples, when the operator manually attaches the electronic tag 10 to the object 50, a device having the writing device 60 can be provided with a discharge section or a delivery section of the electronic tag 10, and the operator can receive the electronic tag 10 therefrom and attach the electronic tag 10 to the object 50.

Second Example

FIG. 2 illustrates a second example of the electronic tag writing system 1. This example has the tag attachment section for attaching the electronic tag 10 to the object 50, and the tag supply section 20 for supplying the electronic tag 10 thereto, and the writing device 60 writes the write information acquired by the information acquisition section 70 into the electronic tag 10 attached to the object 50. In the electronic tag writing system 1, for example, after the unwritten electronic tag 10 is attached to incoming merchandise of different types (sizes, packaging, etc.), quantities, etc. (small quantity and large variety) at a retail store, write information can be written into the electronic tag 10. In this case, in addition to performing attaching and writing to the electronic tag 10 for each object 50, it is possible to attach the electronic tags 10 to all the objects 50 to be processed at one time and then perform writing into the electronic tags 10 attached to the respective objects 50 in order.

In the second example, the information acquisition section 70 may be any of the ones described above. However, the example illustrated in FIG. 2(*a*) includes the individual information sensor 71, and writes write information including the individual information 51 detected by the individual information sensor 71 into the electronic tag 10. On the other hand, the information acquisition section 70 of the example illustrated in FIG. 2(*b*) reads the write information from the storage section 80. The example illustrated in FIG. 2(*c*) combines both information acquisition sections 70, and writes the individual information 51 detected by the individual information sensor 71 and the secondary information read from the storage section 80 based on the individual information 51 into the electronic tag 10 as write information.

For example, as in the example illustrated in FIG. 2(*a*), the whole system of the second example can be set to a single stationary type device E0. In this case, similarly to the application example described later, while conveying the object 50 by the conveyor, it is possible to automatically attach the electronic tag 10 to the object 50, obtain write information by the individual information sensor 71 thereafter (or may be therebefore), and perform writing by the writing device 60.

As in the example illustrated in FIG. 2(*b*), the tag attachment section and the tag supply section 20 may be set to the stationary type first device E1, and the information acquisition section 70, the control section 90, a writing section, and the storage section 80 may be set to the stationary second device E2. In this case, the operator can operate the first device E1 to attach the electronic tag 10 to the object 50 and then operate the second device E2 to acquire and write information. This example has an advantage that the first device E1 and the second device E2 can be installed separately.

In addition, as illustrated in FIG. 2(*c*), the tag attachment section and the tag supply section 20 may be set to the handy type or stationary type first device E1, the information acquisition section 70, the control section 90, and the writing section may be set to the handy type second device E2, and the storage section 80 may be set to a stationary type third device E3. In this case, the operator operates the first device E1 to attach the electronic tag 10 to the object 50. On the other hand, the operator can detect the individual information 51 of the object 50 by holding the individual information sensor 71 corresponding to the second device E2 over the object 50, acquire information from the storage section 80 corresponding to the third device E3 using the information acquisition section 70 corresponding to the second device E2 based thereon, hold the writing device 60 corresponding to the second device E2 over the object 50 after creating write information, and perform writing into the electronic tag 10 attached to the object 50.

Third Example

FIG. 3 illustrates a third example of the electronic tag writing system 1. This example is different from the second example in that the tag supply section 20 and the tag attachment section are not provided, and writing is performed into the electronic tag 10 attached to the object 50 in advance. For example, when a producer attaches the unwritten electronic tag 10 to a product or a container or packaging thereof and ships the product, a retail store may use this system to perform writing into the electronic tag 10 attached to the incoming merchandise.

In the third example, the information acquisition section 70 may be any of the ones described above. However, the example illustrated in FIG. 3(*a*) includes the individual information sensor 71, and writes write information including the individual information 51 detected by the individual information sensor 71 into the electronic tag 10. On the other hand, the information acquisition section 70 of the example illustrated in FIG. 3(*b*) reads the write information from the storage section 80. The example illustrated in FIG. 3(*c*) combines both information acquisition sections 70, and writes the individual information 51 detected by the individual information sensor 71 and the secondary information read from the storage section 80 based on the individual information 51 into the electronic tag 10 as write information.

The system of the third example does not include the tag attachment section and the tag supply section 20, and thus is suitable for a compact system. For example, as in the example illustrated in FIG. 3(*a*), the whole can be set to a single handy type device E0. In this case, the operator can hold the device E0 in a hand, detect the individual information 51 of the object 50 by holding the individual information sensor 71 of the device E0 over the object 50, create write information including the individual information 51, and then hold the writing device 60 of the device E0 over the electronic tag 10 attached to the object 50 to perform writing.

As in the example illustrated in FIG. 3(b), a section other than the storage section 80 can be set to the handy type first device E1, and the storage section 80 can be set to the stationary type second device E2. In the case, the operator can operate the first device E1, acquire information from the second device E2, create write information, and then hold the writing device 60 corresponding to the first device E1 over the electronic tag 10 attached to the object 50 to perform writing.

In addition, as in the example illustrated in FIG. 3(c), a section other than the storage section 80 can be set to the stationary type first device E1, and the storage section 80 can be set to the stationary type second device E2. In this case, the operator can detect the individual information 51 of the object 50 by holding the object 50 in a hand and holding the object 50 over the individual information sensor 71 corresponding to the first device E1, acquire information from the storage section 80 corresponding to the second device E2 using the information acquisition section 70 corresponding to the first device E1 based thereon, hold the writing device 60 corresponding to the first device E1 over the object 50 after creating write information, and perform writing into the electronic tag 10 of the object 50.

Fourth Example

FIG. 4 illustrates a fourth example of the electronic tag writing system 1. This example is different from the first example in that the write information and the processing order are stored in the storage section 80 in association with each other, and the processing order and the write information associated with the processing order are written into the electronic tag 10 using the writing device 60 according to the processing order acquired from the storage section 80 by the information acquisition section 70. In this example, according to the processing order read from the storage section 80, the write information associated with the processing order is written into the electronic tag 10. Thus, in the case of attaching the electronic tag 10 to a plurality of types of objects 50 processed (handled) in a fixed order, different information can be automatically written depending on the objects 50.

In the fourth example, the electronic tag 10 is externally added to the object 50. Therefore, as in the application example, etc. described later, it is preferable to have the tag attachment section for attaching the electronic tag 10 into which writing is finished by the writing device 60 to the object 50. However, the operator may manually attach the electronic tag 10 to the object 50. Note that attaching mentioned herein includes fixing or connecting to the object 50 and simply inserting into a package of the object 50.

For example, as in the example illustrated in FIG. 4, the whole system of the fourth example can be set to a single stationary type device E0. In this case, input for designating the processed object 50 (range of processing target) can be performed with respect to the device E0, the necessary processing order and write information can be acquired by the information acquisition section 70, and the write information associated with the processing order can be written into the electronic tag 10 according to the processing order.

Fifth Example

FIG. 5 illustrates a fourth example of the electronic tag writing system 1. This example is different from the fourth example in that in a first process in production and physical distribution of objects 50, a processing order of an object 50 in the process and write information of each object 50 are acquired and stored in the storage section 80, and in a second process of processing the objects 50 in the processing order on a downstream side of the first process, write information associated with the processing order is successively written into the electronic tag 10 by the writing device 60 according to the processing order.

In this system, for example, in a first process P1 of processing (handling) the object 50 in a fixed order such as a transfer process or an inspection process of the object 50 in a production facility of the object 50 or a conveyance process in a physical distribution of the object 50, the processing order and the write information of the object 50 are stored in the storage section 80 in advance, and then in a second process P2 of processing the object 50 in the processing order, writing into the electronic tag 10 is successively performed according to the processing order. For this reason, by successively attaching the written electronic tag 10 to the object 50, the electronic tag 10 into which different information is automatically written depending on the object 50 can be attached to the object 50.

In the case of storing the processing order of the object 50 and the write information of each object 50 in the storage section 80 in the first process P1, when the storage section 80 is a storage section 80 of an existing system (production management system, physical distribution system, etc.) as illustrated in FIG. 5(a), or a storage section 80 including information duplicated from the information in the storage section 80 of the existing system or information obtained by applying a change or addition to the information, the processing order of the object 50 and the write information of each object 50 are stored in the storage section 80 in the first process P1 as a result of operation of the existing system. In addition, as illustrated in FIG. 5(b), the individual information sensor 71 can be installed in a facility of the first process P1, and the processing order of the object 50 and the write information of each object 50 can be acquired based on at least one of a part or all of primary information such as the individual information 51 acquired by the individual information sensor 71 and secondary information acquired based on the acquired primary information and stored in the storage section 80.

The system of the fifth example can be constructed on a single conveyance line P0 of a production facility or a physical distribution facility as illustrated in FIG. 5(a). In addition, as illustrated in FIG. 5(b), the first process P1 can be set to a shipping process of the production facility, the individual information sensor 71 and the storage section 80 can be installed in the facility, the second process P2 of processing the object 50 in the same processing order as that of the first process P1 on the downstream side of the first process P1 can be set to a loading process of the physical distribution facility, and the information acquisition section 70, the control section 90, and the writing device 60 can be installed in the facility. In each of the examples illustrated in FIG. 5, since processing is performed while the object 50 is being conveyed by the conveyor 30, the processing order of the object 50 does not change. However, continuous conveyance may not be performed in the first process P1 and a process of performing writing into the electronic tag 10 on the downstream side thereof.

In the fifth example, when the operator manually attaches the electronic tag 10 to the object 50, a device including the writing device 60 can be provided with a discharge section or a delivery section of the electronic tag 10, and the operator can receive the electronic tag 10 therefrom and attach the electronic tag 10 to the object 50.

Sixth Example

FIG. 6 illustrates a sixth example of the electronic tag writing system 1. This example includes the tag attachment section that attaches the electronic tag 10 to the object 50 and the tag supply section 20 that supplies a tag thereto. In the first process P1 in the production and physical distribution of the object 50, the processing order of the object 50 in the process and the write information of each object 50 are acquired and stored in the storage section 80. In the second process P2 in the production and physical distribution of the object 50, the tag attachment section attaches the electronic tag 10 to the object 50. In a third process P3 of processing the object 50 in the same processing order on the downstream side of the first process P1 and the second process P2, the write information associated with the processing order is successively written into the electronic tag 10 attached to the object 50 by the writing device 60 according to the processing order.

In this system, for example, in the first process P1 of processing (handling) the object 50 in a fixed order such as a transfer process or an inspection process of the object 50 in a production facility of the object 50 or a conveyance process in a physical distribution of the object 50, the processing order and the write information of the object 50 are stored in the storage section 80 in advance. In addition, the electronic tag 10 is attached to the object 50 in the second process P2 which is parallel thereto or before or after the same. Thereafter, in the third process P3 of processing the object 50 in the processing order, writing into the electronic tag 10 attached to the object 50 is successively performed according to the processing order. In this way, the electronic tag 10 into which different information is automatically written depending on the object 50 can be attached to the object 50.

More specifically, when products of different types (sizes, packaging, etc.), quantities, etc. (small quantity and large variety) are conveyed from a distribution center to a product loading destination such as a retail store, the processing order and the write information can be stored in the storage section 80 and the electronic tag 10 can be attached in the distribution center (first process and the second process), and writing into the electronic tag 10 can be performed in the product loading destination (third process). Note that in the tag attachment section, in addition to performing attaching and writing to the electronic tag 10 for each object 50, it is possible to attach the electronic tags 10 to all the objects 50 to be processed at one time and then perform writing into the electronic tags 10 attached to the respective objects 50 in order.

A scheme of storing the processing order of the object 50 and the write information of each object 50 in the storage section 80 in the first process P1 in the sixth example is similar to that in the fifth example.

The system of the sixth example can be constructed on a single conveyance line of a production facility or a physical distribution facility as illustrated in FIG. 6(a). In addition, as illustrated in FIG. 6(b), the first process P1 can be set to a shipping process of the production facility, the tag attachment section, the tag supply section 20, the individual information sensor 71 and the storage section 80 can be installed in the facility, a process of processing the object 50 in the same processing order as that of the first process P1 on the downstream side of the first process P1 can be set to a loading process of the physical distribution facility, and the information acquisition section 70, the control section 90, and the writing device 60 can be installed in the facility. In each of the examples illustrated in FIG. 6, since processing is performed while the object 50 is being conveyed by the conveyor, the processing order of the object 50 does not change. However, continuous conveyance may not be performed in the first process P1 and a process of performing writing into the electronic tag 10 on the downstream side thereof.

Seventh Example

FIG. 7 illustrates a third example of the electronic tag writing system 1. This example is different from the sixth example in that the tag supply section 20 and the tag attachment section are not provided, and writing is performed into the electronic tag 10 attached to the object 50. That is, the electronic tag writing system 1 is a system that does not supply the electronic tag 10 to attach the electronic tag 10 to the object 50 and writes the write information associated with the processing order into the electronic tag 10 attached to the object 50 by the writing device 60 according to the processing order acquired by the information acquisition section 70 in a process of processing the object 50 in the processing order in production and physical distribution. More specifically, when products of different types (sizes, packaging, etc.), quantities, etc. (small quantity and large variety) are conveyed from a producer to a retail store, the producer can ship the product in which the unwritten electronic tag 10 is attached to the product, or the container or packaging thereof, and different information can be automatically written depending on the object 50 in a process of handling the product in a fixed order at the retail store or the distribution center.

A scheme of storing the processing order of the object 50 and the write information of each object 50 in the storage section 80 in the seventh example may be similar to that in the fifth example, or the processing order of the object 50 and the write information of each object 50 may be stored in the storage section 80 based on information, etc. acquired in a process other than the process of production and physical distribution of the object 50.

The system of the seventh example can be constructed on a single conveyance line of a production facility or a physical distribution facility as illustrated in FIG. 7(a). In addition, as illustrated in FIG. 7(b), the individual information sensor 71 and the storage section 80 can be installed in the facility of the unloading process (first process P1) of the physical distribution facility, and a handy type device E4 including the information acquisition section 70, the control section 90, and the writing device 60 can be installed in the facility of the loading process (second process) of the retail store corresponding to a process of processing the object 50 in the same processing order as that of the first process P1 on the downstream side of the first process P1. In this case, the operator can perform writing into the electronic tag 10 by holding the writing device 60 corresponding to the handy type device E4 over the electronic tag 10 attached to the object 50. In example illustrated in FIG. 7(a), since processing is performed while the object 50 is being conveyed by the conveyor, the processing order of the object 50 does not change. However, continuous conveyance may not be performed in the first process P1 and the second process P2 of performing writing into the electronic tag 10 on the downstream side thereof. For this reason, the system configuration illustrated in FIG. 7(*b*) can be implemented.

Application Example 1

FIGS. 11 and 12 illustrate the electronic tag writing system 1 to which the first example described above is applied. The electronic tag writing system 1 includes the tag supply section 20 that successively supplies the electronic tag 10 having the pressure sensitive adhesion surface 11, and attachment sections 30 and 40 that attach the electronic tag 10 supplied from the tag supply section 20 to the object 50 such as the product to be attached. In addition, the electronic tag writing system 1 includes the writing device 60 that writes the write information related to the object 50 into the electronic tag 10 in a process until attachment to the object 50, and the individual information sensor 71 that detects individual information of the object 50, and includes the control section 90 that writes write information including at least one of a part or all of the individual information detected by the individual information sensor 71 and related information related to the detected individual information into the electronic tag 10 to the attached to the object 50 subjected to detection of the individual information by the writing device 60.

Therefore, in the electronic tag writing system 1, in the device, the individual information of the object 50 is detected and write information based on a detection result is written into the electronic tag 10 to be attached to the object 50 subjected to detection of the individual information. Thus, even when the electronic tags 10 are attached to a plurality of types of objects 50 in no particular order, the electronic tags 10 into which appropriate information is automatically written can be attached. For example, in the case of attaching the electronic tag 10 at the retail store, it is possible to attach the electronic tag 10 into which appropriate information is automatically and successively written without the operator being aware of a type of the object 50 for incoming merchandise of different types (sizes, packaging, etc.), quantities, etc. (small quantity and large variety). Each section will be described in order below.

(Attachment Section)

As long as the electronic tag 10 supplied to an electronic tag 10 supply section can be attached to the object 50 to be attached, the attachment sections 30 and 40 may be those operated by the operator such as handy type labelers. In this case, it is preferable to incorporate the individual information sensor 71 or the writing device 60. However, at least one of the electronic tag 10 supply section and the attachment section, and the individual information sensor 71 and the writing device 60 can be separate bodies. The attachment sections 30 and 40 in the illustrated example have the conveyor 30 that conveys the object 50 that is an attachment target of the electronic tag 10, and the robot 40 that receives the electronic tag 10 supplied from the tag supply section 20 and attaches the electronic tag 10 to the object 50 conveyed on the conveyor 30. As described above, when the electronic tag 10 is attached to the object 50, which is being conveyed, by the robot 40 while the object 50 is conveyed by the conveyor 30, a large number of objects 50 can be automatically and continuously processed.

(Conveyor)

As the conveyor 30, any known conveyor can be used as long as the conveyor 30 can move a moving body in a conveyance direction by a driving force of a drive source and convey the object 50 on the moving body. For example, it is possible to preferably use a belt conveyor, a plate conveyor, etc. having an upper surface as a loading surface. It is preferable that the conveyor 30 has the loading surface wider than the object 50, since, for example, the operator can place various types of objects 50 having different sizes without being aware of positions or directions. Naturally, the conveyor 30 may have a constant type of object 50 and a constant loading position (including direction). In addition, the object 50 can be mechanically loaded on the conveyor 30.

The conveyor 30 can be configured by connecting a plurality of conveyors 31 and 32 as in the example illustrated in FIG. 11, etc., or only one conveyor 30 can be provided as illustrated in FIG. 23. In addition, referring to the conveyor 30, when a free roller conveyor 33 is provided on the most downstream side, the object 50 is pushed onto the free roller conveyor 33 and stopped, and thus a subsequent operation is facilitated.

It is desirable that the conveyor 30 continuously performs conveyance at a constant speed. However, the conveyor 30 can be intermittently driven with a waiting time at an appropriate position to match various timings such as a timing of attaching the electronic tag 10.

(Individual Information Sensor)

It is preferable that the individual information sensor 71 can detect all surfaces of the object 50. For this reason, when the object 50 is detected by the individual information sensor 71 while being conveyed by the conveyor 30, it is preferable to have the device configuration illustrated in FIG. 11, etc. In more detail, the electronic tag writing system 1 includes a first conveyor 31 that conveys the object 50 and a second conveyor 32 connected to the downstream side of the first conveyor 31 with a gap to receive and convey the object 50 sent from the first conveyor 31, and the individual information sensor 71 includes a lower sensor 71L that detects the individual information of the object 50 from below the object 50 through the gap between the first conveyor 31 and the second conveyor 32, and an upper sensor 71U that detects the individual information of the object 50 from above the object 50 on an upstream side of an attachable range of the robot 40.

As described above, not only the conveyor 30 is divided into the first conveyor 31 and the second conveyor 32, but also the individual information of the object 50 can be detected from above and below by utilizing a gap of a delivery part. Thus, it is possible to continuously process a plurality of types of attachment objects 50 in which positions of the individual information in the objects 50 are different from each other in a vertical direction without being aware of the vertical direction.

In particular, in a case where detection can be performed in a wide range using an image sensor for the individual information sensor 71, as illustrated in FIG. 12, by providing the upper sensor 71U that performs detection obliquely from above on one side in a cross direction (CD) across the conveyor 30, the upper sensor 71U that performs detection obliquely from above on the other side in the CD, and the lower sensor 71L that performs detection from immediately below the conveyor 30, four surfaces of the object 50 can be detected using the three sensors, which is preferable. That is, as illustrated in FIGS. 10(*a*), 10(*b*), and 10(*c*), it is possible to detect individual information on an upper surface, a side surface, and a lower surface of the object 50. Note that MD means a machine direction (conveyance direction), and the CD means a lateral direction orthogonal to the MD.

(Tag Supply Section)

The tag supply section 20 is not particularly limited, and any known supply mechanism (for example, those described in Patent Literatures 1 to 5) may be adopted as long as the electronic tag 10 can be supplied to the attachment sections 30 and 40. FIG. 13 illustrates an example of the tag supply section 20 used by attaching an electronic tag roll 23R thereto. The electronic tag roll 23R is a continuous belt shaped electronic tag sheet 15 wound into a roll, and the electronic tag sheet 15 has the electronic tags 10 repeatedly attached thereto at predetermined intervals in a continuous direction of the continuous belt shaped release sheet 16. The electronic tag roll 23R is rotatably supported by a rotating shaft (not illustrated).

In addition, the tag supply section 20 is intended for the case of attaching the electronic tag to the object 50 by the robot 40 described later, and includes a delivery section that transfers the electronic tag sheet 15 in a continuous direction thereof, peels off the electronic tags 10 in order from the downstream side in a transfer direction, and delivers the electronic tags 10 to the robot 40, and a winding shaft 23W that winds the continuous belt shaped release sheet 16 after the electronic tags 10 are peeled off. The delivery section includes a folding guide 23G (which may have a plate shape as in the illustrated figure or may be a rotating shaft or a non-rotating shaft) that guides the release sheet 16 so that the release sheet 16 is folded back to an opposite side from a side having the electronic tag 10, and the electronic tag sheet 15 is peeled off by folding back the release sheet 16. The winding shaft 23W is rotationally driven by a stepping motor (not illustrated), and winding is performed so that each time a leading electronic tag 10 is peeled off, a subsequent electronic tag 10 is moved to a leading position at an appropriate control timing (that is, one by one).

The electronic tag sheet 15 is unrolled from the electronic tag roll 23R and then folded back at an acute angle by the folding guide 23G. At the time of this folding back, the rigid electronic tag 10 is naturally peeled off from the release sheet 16, and thus can be delivered to the robot 40 directly or indirectly via a belt conveyor, etc. The release sheet 16 remaining after the electronic tag 10 is peeled off is wound around the winding shaft 23W.

The tag supply section 20 may include a printer 23P for printing predetermined additional information such as a retail store logo, a description related to the electronic tag 10, or a two-dimensional code for leading to an associated website on a surface (non-pressure sensitive adhesion surface 11) of the electronic tag 10 on the electronic tag sheet 15. In this way, the additional information can be successively printed on the electronic tag 10 as much as the additional information is used.

(Delivery of Electronic Tag to Robot)

When the electronic tag is attached to the object 50 by the robot 40, the robot 40 is not particularly limited as long as the robot 40 receives the electronic tag 10 supplied from the tag supply section 20 and is attached to the object 50 conveyed on the conveyor 30. However, as in the illustrated example, it is preferable that the robot 40 has a sucking section 41, which holds an object by suction of air, as an end effector, to suck the electronic tag 10 on the release sheet 16 by the sucking section 41, peels off the electronic tag 10 from the release sheet 16 by movement of the sucking section 41, and then attaches the electronic tag 10 to the object 50. The sucking section 41 in the illustrated example is a tubular body having a rubber cup attached to a tip portion. However, the sucking section 41 is not limited thereto, and it is possible to adopt a known structure and material.

As illustrated in FIG. 14(*a*), the electronic tag 10 can be delivered to the robot 40 having the sucking section 41 by raising the sucking section 41 in a state where the sucking section 41 of the robot 40 sucks a surface of the electronic tag 10 attached to the release sheet 16 to peel off the electronic tag 10 from the belt (for example, see Patent Literature 5). However, when the electronic tag 10 stuck on the release sheet 16 is peeled off due to upward movement of the sucking section 41, there is concern that the delivery may be uncertain.

Therefore, as illustrated in FIG. 14(*b*), there is a proposed delivery mechanism, by drive control of the robot 40, that causes the sucking section 41 to suck the electronic tag 10 on the release sheet 16 on a front side of a folding start position RP of the release sheet 16 in the delivery section, and then moves the sucking section 41 together with the release sheet 16 while sucking the electronic tag 10 up to the folding start position RP and moves the sucking section 41 at the same speed as that of the release sheet 16 in a tangential direction TD of a moving direction MD of the release sheet 16 while sucking the electronic tag 10 after the folding start position RP, thereby delivering the electronic tag 10 peeled off from the release sheet 16 by folding back of the release sheet 16 to the sucking section 41. In this case, mainly using a peeling force acting on the electronic tag 10 by folding back the release sheet 16 and hardly using a force due to the sucking section 41 peeling off from the release sheet 16, the electronic tag 10 can be held by the sucking section 41 and peeled off from the release sheet 16. Therefore, it is possible to reliably deliver the electronic tag 10 with a smaller sucking force even though the mechanism is significantly simple.

In the state where the sucking section 41 sucks the electronic tag 10, the sucking section 41, the electronic tag 10, and the release sheet 16 are integrated, so that the sucking section 41 may not be driven by a drive source and be simply supported so as to be freely movable in the moving direction of the release sheet 16, and the sucking section 41 may be moved using a moving force of the release sheet 16. However, to allow a more reliable operation, it is preferable that the robot 40 is driven to move the sucking section 41 together with the release sheet 16 while the electronic tag 10 is sucked up to the folding start position RP and move the sucking section 41 in the tangential direction TD of the moving direction MD of the release sheet 16 while the electronic tag 10 is sucked after the folding start position RP.

When the sucking section 41 sucks the electronic tag 10, it is preferable that the release sheet 16 and the electronic tag 10 attached thereto are stopped. However, the sucking section 41 may be sucked to the electronic tag 10 moving together with the release sheet 16 without stopping the release sheet 16.

In this delivery mechanism, as long as the sucking section 41 is movably supported, a supporting device may not be the robot 40, and may be a movable section that moves in a fixed cycle. Further, the sucking section 41 of this delivery mechanism may not attach the electronic tag 10 to the final attachment object 50 such as the product, and may attach the electronic tag 10 to another conveying device such as a conveyor, a temporary attachment base, or another sucking section.

(Writing Device)

As long as the writing device 60 can perform writing into the electronic tag 10 in a process until attachment to the object 50, an installation position thereof is not particularly limited. For example, as illustrated in FIGS. 11 and 12, the writing device 60 that writes the write information related to the object 50 into the electronic tag 10 may be installed between the tag supply section 20 and the conveyor 30 (side of the conveyor 30 in the illustrated example). As illustrated in FIG. 15, the robot 40 may receive the electronic tag 10 supplied from the tag supply section 20, move the electronic tag 10 to a writable position by the writing device 60, and hold the electronic tag 10 for a certain period of time. In the meantime, the writing device 60 may write the information related to the object 50 into the electronic tag 10. Then, as illustrated in FIG. 18, the robot 40 may move the electronic tag 10 from the writing device 60 to the object 50 and attach the electronic tag 10 to the object 50.

In addition, as illustrated in FIG. 21, the writing device 60 may be integrated with the sucking section 41 to allow writing into the electronic tag 10 sucked to the sucking section 41. In this case, information can be written into the electronic tag 10 at an appropriate stage after sucking the electronic tag 10 to the sucking section 41 until attaching the electronic tag 10 to the object 50 (during movement of the sucking section 41 or a state where the sucking section 41 is stopped).

In addition, as illustrated in FIG. 22, the writing device 60 can be installed in a conveyance path of the electronic tag 10 in the tag supply section 20, and information can be written into the electronic tag 10 before delivery to the robot 40. In the example illustrated in FIG. 22, the writing device 60 is provided below the electronic tag 10 to be sent next in the tag supply section 20. However, it is possible to make an appropriate change such as providing the writing device 60 laterally.

In the case of attaching the electronic tag 10 by the robot 40, it is desirable to designate an appropriate attachment position that differs depending on the type of the object 50 and attach the electronic tag 10 to the designated attachment position. In this way, for example, depending on the object 50, the electronic tag 10 can be attached to a position where it is unlikely to affect the product or a position where the communication quality is unlikely to deteriorate. In addition, even when the operator irregularly places the object 50 on the conveyor 30 without being aware of a position (including direction) of the object 50 on the conveyor 30, the electronic tag 10 can be attached to the designated attachment position of the object 50. When the attachment position of the electronic tag 10 is set to a position on the same surface as a detection surface of the individual information 51 and not overlapping the individual information 51 as illustrated in FIGS. 10(a) and 10(b), the individual information 51 is not hidden by the electronic tag 10 after the electronic tag 10 is attached, and thus it becomes easy to compare and confirm stored content of the electronic tag 10 and the individual information 51 of the object 50. However, the attachment position may be on a different surface from the detection surface of the individual information 51 as illustrated in FIG. 10(c) or set to a position partially or entirely overlapping the individual information 51 although not illustrated.

Specifically, an image pickup device 72 that picks up an image of the object 50 conveyed on the conveyor 30 is provided on the upstream side of the attachable range of the robot 40 in the conveyor 30, and the individual information sensor 71 is provided on the upstream side of the image pickup device 72. Further, the storage section 80 is provided in which image information of the object 50 and the designated attachment position on the object 50 are stored in association with each other. Further, the control section 90 compares imaging information obtained by the image pickup device 72 and image information of the object 50 stored in the storage section 80 by image recognition. When the object 50 is recognized on the conveyor 30, the control section 90 reads designated attachment position associated with the recognized object 50 from the storage section 80, detects a position of the object 50 on the conveyor 30, and causes the robot 40 to attach the electronic tag 10 to the designated attachment position on the object 50 conveyed on the conveyor 30 based on the designated attachment position and the position of the object 50. Here, of the position information of the object 50 on the conveyor 30, position coordinates in the MD can be calculated based on an image pickup timing by the image pickup device 72 and a conveyance speed of the conveyor 30, and position coordinates in a direction orthogonal to the MD and the direction can be obtained by image recognition from the imaging information obtained by the image pickup device 72. In addition, for example, the conveyance speed of the conveyor 30 can be detected by a rotary encoder (not illustrated) attached to a drive system (for example, a belt) of the conveyor 30. Therefore, the control section 90 can cause the robot 40 to attach the electronic tag 10 to the designated attachment position on the object 50 at a timing when the object 50 is in the attachable range by the robot 40 based on the position information.

Note that in order to attach the electronic tag 10 to the designated attachment position of the object 50 in this way, it is presumed that delivery from the tag supply section 20 to the robot 40 is reliable, and thus it is desirable to adopt the delivery mechanism.

Flow of Operation of Application Example 1

The electronic tag writing system 1 basically includes a step in which the operator places the object 50 at a supply position of the conveyor 30, a step of detecting the individual information of the object 50 conveyed by the conveyor 30 using the individual information sensor 71, a step of detecting position information of the object 50 conveyed by the conveyor 30, a step of writing write information including at least one of a part or all of the individual information detected by the individual information sensor 71 and related information acquired based on the detected individual information into the electronic tag 10, and a step of attaching the electronic tag 10 into which the information is written to the object 50 conveyed by the conveyor 30. As long as these steps can be executed, detailed control such as an operation timing of each section can be appropriately performed.

FIG. 24 is an example of an operation flow. When the operation of the electronic tag writing system 1 is started, the conveyor 30 is driven by the control section 90, and detection and imaging by the individual information sensor 71 and the image pickup device 72 are started. In addition, at the same time, as illustrated in FIG. 15, the robot 40 receives the electronic tag 10 from the tag supply section 20, moves the electronic tag 10 to the writable position by the writing device 60, and stands by. In this way, by making the electronic tag 10 stand by at the writable position by the writing device 60 in advance, it is possible to shorten a time from detection of the individual information to writing into the electronic tag 10. In this way, not only the attaching efficiency as a whole can be improved, but also a conveyance distance from the individual information sensor 71 to the attachment position can be shortened, and the device can be downsized. Alternatively, at the time of writing into the electronic tag 10 to be described later, it is possible to perform from reception of the electronic tag 10 to writing at once.

Nest, the operator places the object 50 at a supply position (upstream side of the individual information sensor 71) on the conveyor 30 and conveys the object 50. In this way, as illustrated in FIG. 16, the object 50 first passes through the detection position at the individual information sensor 71, and the individual information of the object 50 is detected at that time. Here, as in the illustrated example, a passage sensor 73 that detects passage of the object 50 is provided in front of the individual information sensor 71, and when the individual information is not detected by the individual information sensor 71 until a predetermined time (for example, about several seconds) elapses after detecting passage of the object 50 by the passage sensor 73, the control section 90 determines a detection error of the individual information and can stop at least the conveyor 30. In this case, naturally, the entire system 1 may be temporarily suspended. For example, such a situation occurs when the position of the target individual information (one-dimensional code, etc.) on the object 50 exists on a surface that may not be detected by the individual information sensor 71. In this case, after taking out the object 50, the operation can be restarted without wasting the electronic tag 10 by starting the device again. Note that when a detection error of the individual information occurs, only driving of the conveyor 30 may be continued for a time during which the object 50 can be discharged, and then the normal operation may be automatically restored. In any case, when such an individual information detection error occurs, writing into the electronic tag 10 becomes impossible. As the passage sensor 73, it is possible to use a known passage sensor 73 such as a photosensor in which a light emitting element and a light receiving element are disposed to face each other with a passage position of the object 50 on the conveyor 30 interposed therebetween, and light blocking of the light emitting element by passage of the object 50 is detected by a change in output of the light receiving element.

When the individual information of the object 50 is detected, the control section 90 acquires or creates write information including at least one of a part or all of the individual information detected by the individual information sensor 71 and related information acquired based on the detected individual information, and writes the write information into the electronic tag 10 to be attached to the object 50 subjected to detection of the individual information using the writing device 60. Meanwhile, as illustrated in FIG. 17, the object 50 advances further on the conveyor 30 and is imaged by the image pickup device 72, and imaging results obtained by the image pickup device 72 are continuously input to the control section 90. The control section 90 compares imaging information obtained by the image pickup device 72 and image information of the object 50 stored in the storage section 80 by image recognition. When the object 50 is recognized on the conveyor 30, the control section 90 reads designated attachment position associated with the recognized object 50 from the storage section 80, and detects a position of the object 50 on the conveyor 30. Then, the control section 90 causes the robot 40 to attach the electronic tag 10 to the designated attachment position on the object 50 at a timing when the object 50 is in the attachable range by the robot 40 as illustrated in FIG. 18 based on the designated attachment position and the position of the object 50. The object 50 to which the electronic tag 10 is attached advances further by the conveyor 30 as illustrated in FIG. 11, and is taken out by the operator. As illustrated in FIG. 11, referring to the conveyor 30, when a free roller conveyor 33 is provided on the most downstream side, the object 50 is pushed onto the free roller conveyor 33 and stopped, and thus a subsequent operation is facilitated. After the robot 40 attaches the electronic tag 10, the robot 40 returns to the start. Further, regardless of the presence or absence of the object 50 on the conveyor 30, the robot 40 receives the electronic tag 10 from the tag supply section 20, moves the electronic tag 10 to the writable position by the writing device 60, and stands by.

During writing into the electronic tag 10, a writing error may occur. In this case, since a writing error detection timing is during conveyance of the object 50, it is desirable to perform writing again as illustrated in the flow of FIG. 24 while continuing conveyance at a timing at which writing again is in time or by temporarily suspending conveyance when writing again is not in time. However, in a scheme of performing writing by bringing the electronic tag 10 received by the robot 40 close to the writing device 60 by the robot 40 as in the illustrated example, when a writing error of the electronic tag 10 occurs, a subsequent process may not be performed until the electronic tag 10 is released. Therefore, as illustrated in FIG. 11, etc., in addition to a conveyance space of the object 50 by the conveyor 30, a temporary attachment section 35 for attaching the electronic tag 10 to be discarded is provided, and when the writing error of the electronic tag 10 occurs, as illustrated in FIG. 19, it is preferable that the control section 90 attaches the electronic tag 10 received by the robot 40 to the temporary attachment section 35, and discharges the object 50, to which the electronic tag 10 has been scheduled to be attached, from the conveyor 30 without attaching the electronic tag 10 thereto. In the case of discharging the object 50 from the conveyor 30, the object 50 may be discharged as in the normal operation as illustrated in FIG. 19, or it is possible to provide a defective discharge section 36 such as a discharge chute on a side of the conveyor and an extruding device 37 such as an air cylinder for extruding the object 50 on the conveyor 30 to the defective discharge section 36 as illustrated in FIG. 20. In addition, when the writing error of the electronic tag 10 is repeated, the error is not solved by writing again in many cases. Thus, as illustrated in the flow of FIG. 24, the control section 90 can count writing errors, and at least suspend the conveyor 30 when the errors occur repeatedly a predetermined number of times. In this case, naturally, the entire system 1 may be temporarily suspended.

When the designated attachment position is read, a reading error of the designated attachment position may occur due to an image recognition error or since an image of the object 50 and the designated attachment position are not stored in the storage section 80. In this case, the robot 40 may not attach the electronic tag 10 previously received to the object 50. Moreover, as described above, in order to speed up processing, etc., when the electronic tag 10 is delivered to the robot 40 and the writing is completed before reading of the designated attachment position is completed, a subsequent process may not be performed until the electronic tag 10 is released. Therefore, the temporary attachment section 35 is provided, and when the designated attachment position is not read until the object 50 passes through the attachable range of the robot 40 after the individual information is detected by the individual information sensor 71, it is presumed that a reading error of the designated attachment position occurs, and as in the case of the writing error of the electronic tag 10 described above, the electronic tag 10 received by the robot 40 is attached to the temporary attachment section 35, and the object 50, to which the electronic tag 10 has been scheduled to be attached, is discharged from the conveyor 30 without attaching the electronic tag 10 thereto, which is preferable.

Here, "until the object 50 passes through the attachable range of the robot 40 after the individual information is detected by the individual information sensor 71" can be detected by, for example, a time elapsed after the object 50 is detected by a sensor (as this sensor, the above-mentioned passage sensor 73 or the individual information sensor 71 may be used, or a dedicated sensor may be provided) for detecting the object 50 located on the upstream side of the image pickup device 72. Naturally, the passage sensor 73 may be provided on the downstream side of the image pickup device 72, and a timing at which the object 50 passes through the attachable range of the robot 40 may be detected based on a detection result.

As another example, in a proposal, in a case where continuous processing of the same object 50 is selected by the input device 81, the control section 90 writes the write information including at least one of a part or all of the individual information detected by the individual information sensor 71 and related information acquired based on the detected individual information into the electronic tag 10 to be attached to the object 50 subjected to detection of the individual information using the writing device 60 when the electronic tag 10 is attached to the first object 50, and writes write information in the first object 50 into the electronic tag 10 to be attached to the object 50 subsequent to the first object 50 using the writing device 60 when the electronic tag 10 is attached to the same object 50 subsequent to the first object 50. In this case, when the operator selects continuous processing using the input device 81, it is possible to continuously process a plurality of the same objects 50 while the selection is effective. Thus, when a certain number of objects 50 are processed, writing of the information into the electronic tag 10 and attaching can be efficiently performed (semi-automatic). Further, the control becomes simpler when compared to the case of automatically recognizing the product, and there is no risk of erroneous recognition of the object 50.

Application Example 2

FIGS. 37 and 38 illustrate the electronic tag writing system 1 to which the first example described above is applied. The electronic tag writing system 1 includes the tag supply section 20 that successively supplies the electronic tags 10 having pressure sensitive adhesion surfaces 11, the conveyor 30 that conveys the object 50 that is an attachment target of the electronic tag 10, and the robot 40 that receives the electronic tag 10 supplied from the tag supply section 20 and attaches the electronic tag 10 to the object 50 conveyed on the conveyor 30.

(Conveyor)

As the conveyor 30, similarly to Application Example 1, any known conveyor can be appropriately used.

(Tag Supply Section)

The tag supply section 20 may be similar to that of Application Example 1. However, in the illustrated example, the tag supply section 20 is a new device incorporating an electronic tag folding device.

That is, as illustrated in FIGS. 25 to 31, the tag supply section 20 includes a first belt conveyor 21 having an endless first belt 21B and a second belt conveyor 22 having an endless second belt 22B which is adjacent to a side of the first belt conveyor 21 and moves with the first belt 21B while reducing a distance to the first belt 21B. In order to move the second belt 22B together with the first belt 21B, the first belt 21B and the second belt 22B can be driven synchronously and at the same speed by a common drive source (not illustrated) or an individual drive source. The first belt 21B and the second belt 22B move at least from a folding start position B1 to a folding completion position B2 away from the folding start position B1 by a predetermined distance.

In addition, the tag supply section 20 includes an electronic tag sending section 23 that attaches the electronic tag 10 across the first belt 21B and the second belt 22B so that a folding position 10p of the electronic tag 10 is parallel to a moving direction of the first belt 21B between the first belt 21B and the second belt 22B at the folding start position B1. The electronic tag sending section 23 is not particularly limited, and any known supply mechanism can be adopted. The electronic tag sending section 23 in the illustrated example is used by attaching the electronic tag roll 23R. The electronic tag roll 23R is a continuous belt shaped electronic tag sheet 15 wound into a roll, and the electronic tag sheet 15 has the electronic tags 10 repeatedly attached thereto at predetermined intervals in a continuous direction of the continuous belt shaped release sheet 16. The electronic tag roll 23R is rotatably supported by a rotating shaft (not illustrated).

In addition, the electronic tag sending section 23 includes the folding guide 23G having a tip close to upper surfaces of the first belt 21B and the second belt 22B, and the winding shaft 23W for winding the continuous belt shaped release sheet 16. The winding shaft 23W is driven to rotate by a stepping motor (not illustrated). The electronic tag sheet 15 is unrolled from the electronic tag roll 23R and then folded back at an acute angle by the tip of the folding guide 23G. Here, at the tip of the folding guide 23G, the rigid electronic tag 10 is naturally peeled off from the release sheet 16 and extruded onto the first conveyor and the second conveyor, thereby being attached to the first conveyor and the second conveyor. The release sheet 16 remaining after the electronic tag 10 is peeled off is wound around the winding shaft 23W.

As illustrated in FIGS. 27 and 28, the electronic tag 10 supplied to the first belt 21B and the second belt 22B by the electronic tag sending section 23 is attached to the first belt 21B and the second belt 22B by the pressure sensitive adhesion surface 11 on the back surface side, and thus moves from the folding start position B1 toward the folding completion position B2 together with the first belt 21B and the second belt 22B. In this instance, the first belt 21B and the second belt 22B move together (that is, at the same time and at the same speed), and a distance therebetween becomes narrower toward the folding completion position B2. For this reason, the electronic tag 10 attached over the first belt 21B and the second belt 22B is deformed to release a force applied to a portion of the electronic tag 10 located between the first belt 21B and the second belt 22B by reducing a distance between the first belt 21B and the second belt 22B from the folding start position B1 to the folding completion position B2. That is, the portion of the electronic tag 10 located between the first belt 21B and the second belt 22B gradually rises away from the first belt 21B and the second belt 22B and bends at the folding position 10p in a gradually rising part 10u, and both sides of the folding position 10p are bonded together. As a result, at the folding completion position B2, as illustrated in FIG. 29(c), it is possible to obtain a folded electronic tag 10 in which bonded parts of the electronic tag 10 on both sides of the folding position 10*p* becomes the non-pressure sensitive adhesion part 12, and a part or all of a part of the electronic tag 10 stuck to at least one of the first belt 21B and the second belt 22B becomes the remaining pressure sensitive adhesion part 13. A change in shape of this electronic tag is illustrated in FIG. 29. The electronic tags 10(*a*) to 10(*d*) illustrated in FIGS. 29(*a*) to 29(*d*) correspond to the electronic tags 10(*a*) to 10(*d*) illustrated in FIG. 28. In this way, in the tag supply section 20, when the electronic tag 10 supplied from the electronic tag sending section 23 is merely conveyed in a single state by being attached to the first belt conveyor 21 and the second belt conveyor 22, it is possible to fold the electronic tag 10 along the predetermined folding position 10*p* without requiring a complicated mechanism such as a suction mechanism for holding the electronic tag 10.

As can be easily understood from the above description, the tag supply section 20 fails to be folded when the pressure sensitive adhesion surface 11 of the electronic tag 10 is peeled off from the first belt 21B and the second belt 22B. For this reason, it is preferable to provide a pressing roller 24 that presses the electronic tag 10 against the first belt 21B and the second belt 22B between the folding start position B1 and the folding completion position B2. The pressing roller 24 in the illustrated example is a pair of rollers interposing the first belt 21B and the second belt 22B, respectively, and may be a roller arranged only on the first belt 21B and the second belt 22B. By providing such a pressing roller 24, the electronic tag 10 supplied from the electronic tag sending section 23 can be firmly attached to the first belt 21B and the second belt 22B. The pressing roller 24 can be provided at one place or a plurality of places in the conveyance direction of the electronic tag 10, and particularly preferably provided at least in the vicinity of the electronic tag sending section 23. In addition, the pressing roller 24 is preferably provided on both the first belt 21B and the second belt 22B, and may be provided only on one of the belts which is apt to have weak pressure sensitive adhesion.

In the tag supply section 20, even when a force applied to the electronic tag 10 is only a force applied by reducing the distance between the first belt 21B and the second belt 22B, the portion of the electronic tag 10 located between the first belt 21B and the second belt 22B is likely to gradually rise in a direction away from the first belt 21B and the second belt 22B. Therefore, in the tag supply section 20, it is unlikely that folding directions are opposite to each other at the folding start position B1. However, there is a risk of reverse folding (a folding manner such as being folded between the first belt 21B and the second belt 22B) accidentally or depending on the type of the electronic tag 10. Therefore, to allow normal folding even in such a case, it is desirable to provide reverse folding preventing means 25 that lifts the portion of the electronic tag 10 located between the first belt 21B and the second belt 22B in a predetermined gradually rising direction (not a direction toward a part between the first belt 21B and the second belt 22B, but a direction away from the first belt 21B and the second belt 22B). The reverse folding preventing means is not particularly limited. However, as in the illustrated example, it is preferable to provide a fixed body such as a plate which enters between parts on both sides of the folding position 10*p* on the pressure sensitive adhesion surface 11 side of the gradually rising part 10*u* as long as the electronic tag 10 is not folded backward, and is not in contact with the pressure sensitive adhesion surface 11 and is in contact with the electronic tag 10 when the electronic tag 10 is folded backward to push back the electronic tag 10 in a normally gradually rising direction. In addition, instead of such a fixed body, it is preferable to provide a rotating body such as a roller which rotates together with the electronic tag 10 when the rotating body comes into contact with the electronic tag 10. Further, as another reverse folding preventing means 25, it is preferable to inject air from the back surface side of the electronic tag 10 in a gradually rising direction. As in these examples, it is preferable that the pressure sensitive adhesion surface 11 of the electronic tag 10 is not touched as long as the electronic tag 10 is not folded backward, or the electronic tag 10 is not touched even when the electronic tag 10 is folded backward, so that hindrance to conveyance of the electronic tag 10 is suppressed even when the electronic tag 10 is folded back.

In addition, in the tag supply section 20, by a force applied by reduction in the distance between the first belt 21B and the second belt 22B, the electronic tag 10 bends at the folding position 10*p* in the gradually rising part 10*u*, and parts of the pressure sensitive adhesion surface 11 on both sides of the folding position 10*p* are bonded together. This bonding does not cause a problem immediately even when the bonding is slightly insufficient. However, it is desirable that the bonding is performed firmly over a wider range. Therefore, as in the illustrated example, it is preferable to provide a pair of pressing rollers 26 for pressing the gradually rising part 10*u* in a thickness direction between the folding start position B1 and the folding completion position B2. It is desirable that the pressing rollers 26 press almost the entire gradually rising part 10*u*. However, the pressing rollers 26 may press only a tip portion of the gradually rising part 10*u* or a part other than the tip portion. In particular, when the pressing rollers 26 press at least the tip portion of the gradually rising part 10*u*, it is possible to more reliably and firmly perform bending at the folding position 10*p* and bonding on both sides of the folding position 10*p*.

In addition, in the tag supply section 20, to stabilize the folding position 10*p* of the electronic tag 10, as illustrated in FIGS. 28 and 32, it is preferable that easy folding processing 10*m* is performed in advance at the folding position 10*p* of the electronic tag 10. The easy folding processing 10*m* is not particularly limited, and it is possible to adopt known processing such as perforation processing or embossing processing along the folding position 10*p*. In addition, in addition to or instead of this processing, it is preferable that a notch portion 10*c* is formed at least at an end portion on the downstream side in the conveyance direction at the folding position 10*p* of the electronic tag 10, particularly preferably at both end portions. When the easy folding processing 10*m* is performed on the electronic tag 10, the folding position 10*p* is determined, and it is possible to more reliably and firmly perform bending at the folding position 10*p* of the gradually rising part 10*u* and bonding on both sides of the folding position 10*p*.

In the electronic tag 10 obtained by the tag supply section 20, the remaining pressure sensitive adhesion part 13 stuck to the first belt 21B and the remaining pressure sensitive adhesion part 13 stuck to the second belt 22B are formed with the non-pressure sensitive adhesion part 12 interposed therebetween. Therefore, the electronic tag 10 can be attached to the object 50 using both the remaining pressure sensitive adhesion parts 13 (that is, in the state of FIG. 29(*c*)), or smaller one of the remaining pressure sensitive adhesion parts 13 can be attached to the other remaining pressure sensitive adhesion part 13 to form a part of the non-pressure sensitive adhesion part 12 (that is, the state illustrated in FIGS. 29(*e*) and 33).

In the former case, as illustrated in FIG. 30, an end point of a movement range of the first belt 21B and the second belt 22B can be used as the folding completion position B2. Further, it is preferable that the folding position 10p of the electronic tag 10 is located substantially in the center between the first belt 21B and the second belt 22B in an orthogonal direction XD in that the gradually rising part 10u is unlikely to fall in the orthogonal direction XD during a formation process. However, the folding position 10p may be shifted to the first belt 21B side or the second belt 22B side. In this example, both the widths (dimensions in the orthogonal direction) of the remaining pressure sensitive adhesion part 13 stuck to the first belt 21B and the remaining pressure sensitive adhesion part 13 stuck to the second belt 22B may be wide. Thus, sticking to the first belt 21B and the second belt 22B can be reliably performed, and it is possible to inhibit the electronic tag 10 from peeling off from the first belt 21B and the second belt 22B due to a reaction force during folding.

However, in a case where the folded electronic tag 10 is peeled from the state of being stuck to both the first belt 21B and the second belt 22B and attached to the object 50, since a sticking area of the electronic tag 10 is large, peeling may be difficult. Therefore, to facilitate peeling of the folded electronic tag 10, as illustrated in FIGS. 26 to 28, it is preferable that the end point of the movement range of the second belt 22B is set to the folding completion position B2, the end point of the movement range of the first belt 21B is located ahead of the end point of the movement range of the second belt 22B, the electronic tag 10 attached to the first belt 21B and the second belt 22B is peeled off from the second belt 22B by disappearing of the second belt 22B in a process of moving to the front of the end point of the movement range of the second belt 22B together with the first belt 21B after reaching the end point of the movement range of the second belt 22B together with the first belt 21B and the second belt 22B, and the electronic tag 10 is held only by the first belt 21B.

In this case, since the electronic tag 10 has a certain degree of rigidity, the non-pressure sensitive adhesion part 12 falls to the second belt 22B side (the second belt 22B is not present) as illustrated in the FIGS. 28 and 29(d) in the electronic tag 10 peeled off from the second belt 22B and held only by the first belt 21B. Therefore, as illustrated in the FIGS. 29(e) and 33, after peeling from the second belt 22B, smaller one of the remaining pressure sensitive adhesion parts 13 (the remaining pressure sensitive adhesion part 13 stuck to the second belt 22B in the illustrated example) can be attached to the other remaining pressure sensitive adhesion part 13 to form a part of the non-pressure sensitive adhesion part 12, and then attaching to the object 50 can be performed by the residual remaining pressure sensitive adhesion part 13 (most of the remaining pressure sensitive adhesion part 13 stuck to the first belt 21B in the illustrated example) as illustrated in FIG. 34. In this case, as in the illustrated example, when a pair of finishing rollers 27 that presses the non-pressure sensitive adhesion part 12 falling to the second belt 22B side in the thickness direction is provided between the end point of the movement range of the first belt 21B and the end point of the movement range of the second belt 22B, bonding of the pressure sensitive adhesion surface 11 in the non-pressure sensitive adhesion part 12 can be performed more reliably and more firmly.

However, when the remaining pressure sensitive adhesion part 13 stuck to the second belt 22B reaches and sticks to a side surface or a back surface of the first belt 21B, there is concern that peeling of the electronic tag 10 from the first belt 21B becomes difficult thereafter. That is, it is preferable that the folding position 10p is located substantially in the center between the first belt 21B and the second belt 22B in the orthogonal direction in that the gradually rising part 10u rarely falls in the orthogonal direction in a process of folding the electronic tag 10 by the first belt 21B and the second belt 22B. However, in this case, even when the electronic tag 10 is supplied to the first belt 21B and the second belt 22B so that the tip of the electronic tag 10 on the second belt 22B side is located at the end of the second belt 22B on the first belt 21B side as illustrated in FIG. 28 in order to minimize the width of the one of the remaining pressure sensitive adhesion parts 13 at the folding completion position B2, an interval D1 between the folding position 10p and the first belt 21B in the orthogonal direction XD becomes shorter than an interval D2 between the folding position 10p and the tip of the electronic tag 10 on the second belt 22B side in the orthogonal direction XD. Further, in such an arrangement, as described above, when the movement range of the first belt 21B is extended as compared with the second belt 22B, the electronic tag 10 is peeled off from the second belt 22B using movement of the first belt 21B, and the non-pressure sensitive adhesion part 12 falls, the remaining pressure sensitive adhesion part 13 stuck to the second belt 22B reaches and sticks to the side surface or the back surface of the first belt 21B as illustrated in FIG. 29(d), and there is concern that it may be difficult to peel off the electronic tag 10 from the first belt 21B thereafter.

Therefore, as in the example illustrated in FIGS. 25 to 27, it is one preferable mode to position the tip of the electronic tag 10 on the second belt 22B side to the end of the second belt 22B on the first belt 21B side by the electronic tag sending section 23, raise the non-pressure sensitive adhesion part 12 falling or to fall to the second belt 22B side between the end point of the movement range of the second belt 22B and the end point of the movement range of the first belt 21B, and provide erecting means 28 for setting an angle θ (see FIG. 29(e)) formed between the remaining pressure sensitive adhesion part 13 stuck to the first belt 21B and the non-pressure sensitive adhesion part 12 to be less than 180 degrees.

As the erecting means 28, it is possible to adopt a plate (illustrated example) or a roller (not illustrated) having an inclined surface located from a lower side to an upper side of an attachment surface of the electronic tag 10 of the first belt 21B toward the downstream side in the moving direction in a passage path of the non-pressure sensitive adhesion part 12 of the electronic tag 10 only by the first belt 21B, and coming into contact with the back surface of the non-pressure sensitive adhesion part 12 of the electronic tag 10 to push up the part. Further, as another erecting means 28, it is preferable to inject air from the back surface side of the non-pressure sensitive adhesion part 12 of the electronic tag 10 in an erecting direction.

When such an erecting means 28 is provided, the angle θ formed between the remaining pressure sensitive adhesion part 13 stuck to the first belt 21B and the non-pressure sensitive adhesion part 12 can be raised to less than 180 degrees before or after the non-pressure sensitive adhesion part 12 falls and comes into contact with the first belt 21B. As a result, the remaining pressure sensitive adhesion part 13 stuck to the second belt 22B does not reach the first belt 21B or peels off even when the remaining pressure sensitive adhesion part 13 reaches and sticks to the first belt 21B. Therefore, peeling of the electronic tag 10 from the first belt 21B does not become difficult. Note that when the finishing rollers 27 are provided, it is desirable to provide the finishing rollers 27 between the end point of the movement range of the second belt 22B and the erecting means 28 as in the illustrated example.

Naturally, as illustrated in FIG. 31, the electronic tag 10 may be supplied to the first belt 21B and the second belt 22B by the electronic tag sending section 23 so that the interval D1 between the folding position 10p and the first belt 21B in the orthogonal direction XD becomes longer than the interval D2 between the folding position 10p and the tip of the electronic tag 10 on the second belt 22B side in the orthogonal direction XD. In this case, even when the non-pressure sensitive adhesion part 12 falls, the first belt 21B is not touched.

In the illustrated example, the surface of the first belt 21B on which the electronic tag 10 is attached and the surface of the second belt 22B on which the electronic tag 10 is attached are substantially flush with each other. However, the surfaces may have an angle.

Means for moving the electronic tag 10 is not limited to the belt conveyor having the endless belt (corresponding to a moving section) that moves as in the illustrated example as long as the means includes at least a first moving section that moves from the folding start position B1 to the folding completion position B2 a predetermined away from the folding start position B1, and a second moving section which is adjacent to the first moving section in the orthogonal direction XD orthogonal to the moving direction of the first moving section and moves together with the first moving section at least from the folding start position B1 to the folding completion position B2 while reducing the distance to the first moving section. For example, a plate conveyor can be used instead of the belt conveyor of the illustrated example. In addition, the moving section to which the electronic tag 10 is attached may only reciprocate between the folding start position B1 and the folding completion position B2, and the moving section to which the electronic tag 10 may rotatably move through the folding start position B1 and the folding completion position B2.

The tag supply section 20 may perform a continuous process of supplying the next electronic tag 10 from the electronic tag sending section 23 to the first belt 21B and the second belt 22B before folding of one electronic tag 10 is completed, or perform a batch process of supplying the next electronic tag 10 from the electronic tag sending section 23 to the first belt 21B and the second belt 22B after folding of the electronic tag 10 is completed or after the folded electronic tag 10 is peeled off from the first belt 21B and the second belt 22B.

The folded electronic tag 10 may be manually peeled off from the first belt 21B, etc. by the operator and attached to the object 50. However, from a viewpoint of automation, it is desirable that the folded electronic tag 10 is delivered to an attaching machine such as the robot 40, etc. and attached to the object 50. Therefore, next, a description will be given of an example of the electronic tag writing system 1 and an example of the delivery mechanism of the electronic tag 10.

(Delivery of Electronic Tag to Robot)

When the electronic tag is attached to the object 50 by the robot 40, the robot 40 is not particularly limited as long as the robot 40 receives the electronic tag 10 supplied from the tag supply section 20 and is attached to the object 50 conveyed on the conveyor 30. However, as in the illustrated example, it is preferable that the robot 40 has a sucking section 41, which holds an object by suction of air, as an end effector, to suck the electronic tag 10 attached on the first belt 21B of the first belt conveyor 21 by the sucking section 41, peels off the electronic tag 10 from the belt by movement of the sucking section 41, and then attaches the electronic tag 10 to the object 50. The sucking section 41 in the illustrated example is a tubular body having a rubber cup attached to a tip portion. However, the sucking section 41 is not limited thereto, and it is possible to adopt a known structure and material.

As illustrated in FIG. 35(a), the electronic tag 10 can be delivered to the robot 40 having the sucking section 41 by raising the sucking section 41 in a state where the sucking section 41 of the robot 40 sucks a surface of the electronic tag 10 attached on the first belt 21B of the first belt conveyor 21 to peel off the electronic tag 10 from the belt (for example, see JP 2008-62965 A). However, when the electronic tag 10 stuck on the belt is peeled off due to upward movement of the sucking section 41, there is concern that the delivery may be uncertain.

Therefore, as illustrated in FIGS. 35(b) and 36, there is a proposed delivery mechanism that causes the sucking section 41 to suck the electronic tag 10 attached to the first belt 21B on a front side of a folding start position B3 of the first belt 21B at an end point of the first belt conveyor 21 by drive control of the robot 40, and then moves the sucking section 41 together with the first belt 21B while sucking the electronic tag 10 up to the folding start position B3 and moves the sucking section 41 at the same speed as that of the first belt 21B in a tangential direction TD of a moving direction MD of the first belt 21B while sucking the electronic tag 10 after the folding start position B3, thereby delivering the electronic tag 10 peeled off from the first belt 21B by folding back of the first belt 21B to the sucking section 41. In this case, mainly using a peeling force acting on the electronic tag 10 by folding back the first belt 21B and hardly using a force due to the sucking section 41 peeling off from the first belt 21B, the electronic tag 10 can be held by the sucking section 41 and peeled off from the belt. Therefore, it is possible to reliably deliver the electronic tag 10 with a smaller sucking force even though the mechanism is significantly simple.

In the state where the sucking section 41 sucks the electronic tag 10, the sucking section 41, the electronic tag 10, and the first belt 21B are integrated, so that the sucking section 41 may not be driven by a drive source and be simply supported so as to be freely movable in the moving direction of the first belt 21B, and the sucking section 41 may be moved using a moving force of the first belt 21B. However, to allow a more reliable operation, it is preferable that the robot 40 is driven to move the sucking section 41 together with the first belt 21B while the electronic tag 10 is stuck up to the folding start position B3 and move the sucking section 41 in the tangential direction TD of the moving direction MD of the first belt 21B while the electronic tag 10 is stuck after the folding start position B3.

When the sucking section 41 sucks the electronic tag 10, it is preferable that the first belt 21B and the electronic tag 10 attached thereto are stopped. However, the sucking section 41 may suck the electronic tag 10 moving together with the first belt 21B without stopping the first belt 21B.

On the other hand, in a case where the electronic tag 10 is attached to the first belt 21B and conveyed as in the tag supply section 20 described above, when the electronic tag 10 is peeled off from the first belt 21B, the conveyance fails. For this reason, in the tag supply section 20, it is preferable to provide a pressing roller 24 that presses the electronic tag 10 against the first belt 21B between a start point and an end point in the first belt conveyor 21. However, in this case, the electronic tag 10 is less likely to be peeled off from the first belt 21B at the time of delivery to the sucking section 41. Therefore, the delivery mechanism is particularly significant in such a case.

The delivery mechanism is not limited to the tag supply section 20 having the above-mentioned folding mechanism as long as the delivery mechanism delivers the electronic tag 10 having the pressure sensitive adhesion surface 11 from the conveyor that conveys the electronic tag 10 by attaching the electronic tag 10 to the endless moving section to the movably supported sucking section 41. For example, the delivery mechanism may deliver the electronic tag 10 from the conveyor that conveys the electronic tag 10 without folding to the sucking section 41. In addition, in this delivery mechanism, as long as the sucking section 41 is movably supported, a supporting device may not be the robot 40, and may be a movable section that moves in a fixed cycle. Further, the sucking section 41 of this delivery mechanism may not attach the electronic tag 10 to the final attachment object 50 such as the product, and may attach the electronic tag 10 to another conveying device such as a conveyor, a temporary attachment base, or another sucking section.

(Writing Device)

As illustrated in FIGS. 37 and 38, the writing device 60 that writes the write information related to the object 50 into the electronic tag 10 may be installed between the tag supply section 20 and the conveyor 30. The robot 40 may receive the electronic tag 10 supplied from the tag supply section 20 as illustrated in FIG. 39(a), move the electronic tag 10 to a writable position by the writing device 60 as illustrated in FIG. 39(b), and hold the electronic tag 10 for a certain period of time. In the meantime, the writing device 60 may write the information related to the object 50 into the electronic tag 10. Then, as illustrated in FIG. 39(c), the robot 40 may move the electronic tag 10 from the writing device 60 to the object 50 and attach the electronic tag 10 to the object 50.

In addition, as illustrated in FIG. 40, the writing device 60 may be integrated with the sucking section 41 to allow writing into the electronic tag 10 sucked to the sucking section 41. In this case, information can be written into the electronic tag 10 at an appropriate stage after sucking the electronic tag 10 to the sucking section 41 until attaching the electronic tag 10 to the object 50 (during movement of the sucking section 41 or a state where the sucking section 41 is stopped).

In addition, as illustrated in FIGS. 41 and 42, the writing device 60 can be installed in a conveyance path of the electronic tag 10 in the tag supply section 20, and information can be written into the electronic tag 10 before delivery to the robot 40. In an example illustrated in FIG. 41, the writing device 60 is provided at a position facing the next electronic tag 10 to be sent out in the electronic tag sending section 23. In an example illustrated in FIG. 42, the writing device 60 is provided at a position facing the electronic tag 10 in the first belt conveyor 21 that conveys the electronic tag 10 to the delivery position.

In these examples, information is written into the electronic tag 10 in a process of being attaching to the object 50 in this system 1. However, after attaching the electronic tag 10 to the object 50 flowing on the conveyor 30, information can be written into the electronic tag 10 by the writing device 60 facing the electronic tag 10 of the object 50. For example, as illustrated in FIG. 43, it is possible to provide a first robot 40A for attaching the electronic tag 10 delivered from the tag supply section 20 to the object 50 on the conveyor 30, and a second robot 40B for writing information can be provided by bringing the writing device 60 close to the object 50 to which the electronic tag 10 on the conveyor 30 is attached.

The system 1 can automatically and individually attach the electronic tag 10 in which information is written to a plurality of types of attachment objects 50. Specifically, as illustrated in FIG. 37, the individual information sensor 71 for optically reading identification information displayed on the appearance of the object 50 conveyed on the conveyor 30 is provided on the upstream side of the attachable range of the robot 40 in the conveyor 30. In addition, the storage section 80 in which the identification information and the write information related to the object 50 corresponding thereto are stored in association with each other is provided. When identification information is read by the individual information sensor 71, write information corresponding to the identification information is read from the storage section 80. Further, the control section 90 that performs writing into the electronic tag 10 in the process until attachment to the object 50 using the writing device 60 is provided. In this way, the control section 90 can successively and automatically recognize the objects 50 based on a reading result of the individual information sensor 71, and the corresponding write information associated in advance can be written into the electronic tag 10. Thus, even when a plurality of types of objects 50 are placed on the conveyor 30 in random order and in random intervals, it is possible to attach the electronic tag 10 into which appropriate information is automatically written. For example, in the case of attaching the electronic tag 10 at the retail store, it is possible to attach the electronic tag 10 into which information is individually written to the product (object 50) merely by successively placing incoming merchandise of different types (sizes, packaging, etc.), quantities, etc. (small quantity and large variety) on the conveyor 30 without the operator being aware of the order or intervals. The information written into the electronic tag 10 is not particularly limited. For example, in the case of the electronic tag 10 attached to a product, it is possible to write a product name, manufacturing information, truck loading information, inventory information, sales information, loss information, delivery information, expiration date information, consumption information, etc.

In a case where the electronic tag writing system 1 automatically attaches the electronic tag 10 into which information is individually written to a plurality of types of attachment objects 50, it is preferable that after the control section 90 controls the robot 40 to cause the robot 40 to receive the electronic tag 10 supplied from the tag supply section 20 when identification information is read by the individual information sensor 71, the control section 90 brings the electronic tag 10 close to the writing device 60 to perform writing, and then attaches the electronic tag 10 to the object 50. In this way, by writing information into the electronic tag 10 immediately before attachment, useless writing can be suppressed, and efficient information writing and attaching can be performed.

The individual information sensor 71 can be appropriately set according to the identification information of the object 50. For example, when a barcode or a two-dimensional code is used as the identification information of the object 50, a code reader can be used. Further, when the identification information of the object 50 is a shape or color, a pattern, characters such as a product name, etc. that appear in the appearance, an image pickup device such as a CCD camera can be used. In the latter case, the individual information sensor 71 can directly transmit imaging information to the control section 90, and the control section 90 can execute an image recognition program to recognize identification information from the imaging information. As the control section 90, it is possible to use a known industrial control device such as a personal computer.

As another example, it is proposed that an input device 81 that selects the object 50 stored in the storage section 80 is included, and the control section 90 reads write information related to the object 50 selected by the input device 81 from the storage section 80, and successively writes the write information into the electronic tag 10 without changing the write information until a new object 50 is selected by the input device 81. In this case, when the operator selects the object 50 using the input device 81, it is possible to continuously process a plurality of the same objects 50. Thus, when a certain number of objects 50 are processed, writing of the information into the electronic tag 10 and attaching can be sufficiently efficiently performed (semi-automatic). Further, the control becomes simpler when compared to the case of automatically recognizing the product, and there is no risk of erroneous recognition of the object 50. The input device 81 may be a keyboard, a mouse, or a dedicated switch. It is preferable to include the display device 82 that displays information (for example, identification information of the object 50 such as a product name) for specifying the object 50 stored in the storage section 80 in order for the operator to select the object 50. In this case, it is particularly preferable that a touch panel in which the input device 81 and the display device 82 are integrated is provided, and the object 50 is selected and input by touching information for identifying the object 50 displayed on the display device 82. In addition, although not illustrated, to the control section 90, a mobile terminal such as a smartphone having the display device 82 and the input device 81 may be connectable to the control section 90 by a network, short-range wireless communication, or wired communication, and the display device 82 and the input device 81 of the mobile terminal may be used to select the object 50.

Further, similarly to Application Example 1, it is preferable to use the robot 40 having four or more degrees of freedom to attach the electronic tag 10 to the designated attachment position (including the direction) of the object 50. In this case, the individual information sensor 71 of Application Example 2 may also be used as the image pickup device 72 of Application Example 1, or the image pickup device 72 of Application Example 1 may be separately added.

Other Examples

Some of the configurations in the first to seventh examples and Application Examples 1 and 2 can be applied to other examples as long as basic configurations of the other examples are not impaired.

INDUSTRIAL APPLICABILITY

The invention can be used to write information related to an object such as a product into an electronic tag when the electronic tag is attached to the object.

REFERENCE SIGNS LIST

1 ELECTRONIC TAG WRITING SYSTEM
10 ELECTRONIC TAG
10a, 10i INLET
10a ANTENNA
10i IC CHIP
11 PRESSURE SENSITIVE ADHESION SURFACE
12 NON-PRESSURE SENSITIVE ADHESION PART
13 REMAINING PRESSURE SENSITIVE ADHESION PART
15 ELECTRONIC TAG SHEET
16 RELEASE SHEET
20 TAG SUPPLY SECTION
21 FIRST BELT CONVEYOR
21B FIRST BELT
23G FOLDING GUIDE
23R ELECTRONIC TAG ROLL
23W WINDING SHAFT
30, 40 ATTACHMENT SECTION
30 CONVEYOR
31 FIRST CONVEYOR
32 SECOND CONVEYOR
33 FREE ROLLER CONVEYOR
35 TEMPORARY ATTACHMENT SECTION
36 DEFECTIVE DISCHARGE SECTION
37 EXTRUDING DEVICE
40 ROBOT
41 SUCKING SECTION
50 OBJECT
51 INDIVIDUAL INFORMATION
60 WRITING DEVICE
70 INFORMATION ACQUISITION SECTION
71 INDIVIDUAL INFORMATION SENSOR
71L LOWER SENSOR
71U UPPER SENSOR
72 IMAGE PICKUP DEVICE
73 PASSAGE SENSOR
80 STORAGE SECTION
81 INPUT DEVICE
82 DISPLAY DEVICE
90 CONTROL SECTION
E1 FIRST DEVICE
E2 SECOND DEVICE
E0 SINGLE DEVICE
E3 THIRD DEVICE
P1 FIRST PROCESS
P2 SECOND PROCESS
P3 THIRD PROCESS

The invention claimed is:
1. An electronic tag writing system comprising:
a writing device that writes write information into an electronic tag;
an information acquisition section that acquires write information related to an object associated with the electronic tag;
a conveyor for conveying the object;
a tag supply section that successively supplies electronic tags having pressure sensitive adhesion sections; and
a robot that receives the electronic tag supplied from the tag supply section and attaches the electronic tag to the object conveyed on the conveyor;
wherein after causing the robot to receive the electronic tag supplied from the tag supply section, the electronic tag is brought to close the writing device to perform writing of the write information acquired by the information acquisition section, and then attached to the object; and
wherein in addition to a conveyance space of the object by the conveyor, a temporary attachment section is provided for attaching the electronic tag that is received by the robot and that is to be discarded.

2. The electronic tag writing system according to claim 1,
wherein the information acquisition section includes an individual information sensor that detects individual information of the object and is provided on an upstream side of an attachable range of the robot in the conveyor;
wherein the write information includes at least one of a part or all of the individual information detected by the individual information sensor and related information acquired based on the detected individual information;
wherein the electronic tag writing system further comprises a passage sensor that detects passage of the object on an upstream side of the individual information sensor in the conveyor; and
wherein when the individual information is not detected by the individual information sensor until a predetermined time elapses after detecting passage of the object by the passage sensor, at least the conveyor is stopped.

3. The electronic tag writing system according to claim 1,
wherein the information acquisition section includes an individual information sensor that detects individual information of the object and is provided on an upstream side of an attachable range of the robot in the conveyor,
wherein the write information includes at least one of a part or all of the individual information detected by the individual information sensor and related information acquired based on the detected individual information,
wherein prior to detecting the individual information of the object by the individual information sensor, the robot is caused to receive the electronic tag from the tag supply section, and the electronic tag is caused to stand by at a writable position by the writing device, and
after the individual information of the object is detected by the individual information sensor, writing by the writing device is performed.

4. The electronic tag writing system according to claim 1,
wherein the information acquisition section reads write information related to the object conveyed on the conveyor from a storage section in which identification information of the object and write information related to the object are stored in association with each other.

5. The electronic tag writing system according to claim 4, further comprising
an individual information sensor provided on an upstream side of an attachable range of the robot in the conveyor to optically read identification information displayed on an appearance of the object conveyed on the conveyor,
wherein when the identification information is read by the individual information sensor, write information corresponding to the identification information is read from the storage section and written into an electronic tag in a process until attachment to the object by the writing device.

6. The electronic tag writing system according to claim 1, wherein when a writing error of the electronic tag occurs, the electronic tag received by the robot is attached to the temporary attachment section, and the object to which the electronic tag has been scheduled to be attached is discharged from the conveyor without attaching the electronic tag thereto.

7. The electronic tag writing system according to claim 1,
wherein the tag supply section has an electronic tag sheet including a continuous belt shaped release sheet and electronic tags repeatedly attached at a predetermined interval in a continuous direction, and a delivery section that transfers the electronic tag sheet in the continuous direction, peels off the electronic tags in order from a downstream side in a transfer direction, and delivers the electronic tags to the robot,
wherein the delivery section includes a folding guide that guides the release sheet so that the release sheet is folded back to an opposite side from a side having the electronic tags,
wherein an end effector of the robot is a sucking section that holds an electronic tag by suction,
wherein the robot sucks an electronic tag on the release sheet by the sucking section, peels off the electronic tag from the release sheet by movement of the sucking section, and then attaches the electronic tag to the object,
wherein after causing the sucking section to suck the electronic tag on the release sheet on a front side of a folding start position of the release sheet in the delivery section, and
wherein the sucking section is moved together with the release sheet while sucking the electronic tag up to the folding start position, and moved at a same speed as that of the release sheet in a tangential direction of a moving direction of the release sheet while sucking the electronic tag after the folding start position, thereby delivering, to the sucking section, the electronic tag peeled off from the release sheet by folding back the release sheet.

8. An electronic tag writing system comprising:
a writing device that writes write information into an electronic tag;
an information acquisition section that acquires write information related to an object associated with the electronic tag;
a conveyor for conveying the object;
a tag supply section that successively supplies electronic tags having pressure sensitive adhesion sections;
a robot that receives the electronic tag supplied from the tag supply section and attaches the electronic tag to the object conveyed on the conveyor, the robot having six or more degrees of freedom;
an image pickup device that picks up an image of the object conveyed on the conveyor on an upstream side of an attachable range of the robot in the conveyor; and
a storage section in which image information of the object and the designated attachment position on the object are stored in association with each other;
wherein after causing the robot to receive the electronic tag supplied from the tag supply section, the electronic tag is brought close to the writing device to perform writing of the write information acquired by the information acquisition section, and then attached to the object; and
wherein imaging information obtained by the image pickup device is compared with the image information of the object stored in the storage section by image recognition, and when the object is recognized on the conveyor, a designated attachment position associated with the recognized object is read from the storage section, and a position of the object on the conveyor is detected, and
wherein the robot attaches the electronic tag to the designated attachment position on the object based on the designated attachment position and the position of the object, regardless of irregular positioning of the object on the conveyer.

9. An electronic tag writing system comprising:
a tag supply section that successively supplies electronic tags having pressure sensitive adhesion sections,
a robot that receives an electronic tag supplied from the tag supply section and attaches the electronic tag to an object conveyed on the conveyor,
a conveyor for conveying the object,
an image pickup device that picks up an image of the object conveyed on the conveyor on an upstream side of an attachable range of the robot in the conveyor,
an individual information sensor that detects individual information of the object and is provided on an upstream side of the image pickup device and the attachable range of the robot in the conveyor,
a writing device that writes write information including at least one of a part or all of the individual information detected by the individual information sensor and related information acquired based on the detected individual information, into an electronic tag to be attached to the object subjected to detection of the individual information,
wherein after causing the robot to receive the electronic tag supplied from the tag supply section, the electronic tag is brought close to the writing device to perform writing, and then attached to the object,
the electronic tag writing system further comprising a storage section in which image information of the object and a designated attachment position on the object are stored in association with each other,
wherein imaging information obtained by the image pickup device is compared with the image information of the object stored in the storage section by image recognition, and when the object is recognized on the conveyor, a designated attachment position associated with the recognized object is read from the storage section, and a position of the object on the conveyor is detected, and the robot attaches the electronic tag to the designated attachment position on the object conveyed on the conveyor based on the designated attachment position and the position of the object, and
wherein before reading of the designated attachment position is completed, the robot ends an operation from receiving to writing of the electronic tag,
the electronic tag writing system further comprising a temporary attachment section for attaching an electronic tag to be discarded other than a conveyance space of the object by the conveyor,
wherein when the designated attachment position is not read until the object passes through the attachable range of the robot after the individual information is detected by the individual information sensor, the electronic tag received by the robot is attached to the temporary attachment section, and the object to which the electronic tag has been scheduled to be attached is discharged from the conveyor without attaching the electronic tag.

* * * * *